(12) United States Patent
Tokuda

(10) Patent No.: US 10,232,590 B2
(45) Date of Patent: Mar. 19, 2019

(54) PLATED STEEL SHEET WITH QUASICRYSTAL

(71) Applicant: NIPPON STEEL & SUMITOMO METAL CORPORATION, Tokyo (JP)

(72) Inventor: Kohei Tokuda, Sodegaura (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 212 days.

(21) Appl. No.: 15/128,009

(22) PCT Filed: Mar. 28, 2014

(86) PCT No.: PCT/JP2014/059103
§ 371 (c)(1),
(2) Date: Sep. 21, 2016

(87) PCT Pub. No.: WO2015/145721
PCT Pub. Date: Oct. 1, 2015

(65) Prior Publication Data
US 2017/0100915 A1    Apr. 13, 2017

(51) Int. Cl.
*B32B 15/01*    (2006.01)
*C23C 2/26*    (2006.01)
(Continued)

(52) U.S. Cl.
CPC ............ *B32B 15/013* (2013.01); *C22C 18/00* (2013.01); *C22C 23/04* (2013.01); *C23C 2/04* (2013.01); *C23C 2/06* (2013.01); *C23C 2/26* (2013.01)

(58) Field of Classification Search
None
See application file for complete search history.

(56) References Cited

U.S. PATENT DOCUMENTS 5,888,661 A * 3/1999 Dubois ................. C22C 21/003
148/403
6,030,724 A    2/2000 Sawa et al.
(Continued)

FOREIGN PATENT DOCUMENTS

CN    101636517 A    1/2010
CN    101713042 A    5/2010
(Continued)

OTHER PUBLICATIONS

Extended European Search Report issued in European Application No. 14887561.0 dated Sep. 25, 2017.
(Continued)

*Primary Examiner* — Katie L. Hammer
(74) *Attorney, Agent, or Firm* — Birch, Stewart, Kolasch & Birch, LLP

(57) ABSTRACT

A plated steel sheet with a quasicrystal includes a steel sheet and a plated-metal-layer arranged on a surface of the steel sheet. The plated-metal-layer includes, as a chemical composition, Mg, Zn, and Al, and satisfies 25%≤Zn+Al in atomic %. The plated-metal-layer includes, as a metallographic structure, a quasicrystal phase. A Mg content, a Zn content, and an Al content in the quasicrystal phase satisfy 0.5≤Mg/(Zn+Al)≤0.83 in atomic %. In addition, an average equivalent circle diameter of the quasicrystal phase is larger than 1 μm and equal to or smaller than 200 μm.

20 Claims, 4 Drawing Sheets

(51) Int. Cl.
*C23C 2/06* (2006.01)
*C23C 2/04* (2006.01)
*C22C 23/04* (2006.01)
*C22C 18/00* (2006.01)

(56) References Cited

U.S. PATENT DOCUMENTS

| | | | |
|---|---|---|---|
| 7,309,412 B2* | 12/2007 | Minevski | C25D 5/50 205/104 |
| 2004/0256236 A1* | 12/2004 | Minevski | C25D 5/50 205/109 |
| 2008/0032151 A1 | 2/2008 | Raffy et al. | |
| 2009/0087682 A1* | 4/2009 | Hishida | B23K 35/0244 428/650 |
| 2010/0018612 A1 | 1/2010 | Tokuda et al. | |
| 2011/0315282 A1 | 12/2011 | Somekawa et al. | |
| 2013/0039805 A1 | 2/2013 | Somekawa et al. | |

FOREIGN PATENT DOCUMENTS

| | | |
|---|---|---|
| CN | 102933730 A | 2/2013 |
| EP | 1997927 A1 | 12/2008 |
| JP | 8-176762 A | 7/1996 |
| JP | 2004-267878 A | 9/2004 |
| JP | 2005-113235 A | 4/2005 |
| JP | 2007-525596 A | 9/2007 |
| JP | 2008-69438 A | 3/2008 |
| JP | 2008-255464 A | 10/2008 |
| JP | 2009-191327 A | 8/2009 |
| JP | 2010-248541 A | 11/2010 |
| JP | 2010-270352 A | 12/2010 |
| JP | 2011-219823 A | 11/2011 |
| WO | WO 95/17531 A1 | 6/1995 |
| WO | WO 2008/111688 A1 | 9/2008 |

OTHER PUBLICATIONS

International Search Report for PCT/JP2014/059103 dated Jun. 17, 2014.
Office Action for TW 103111763 dated May 5, 2015.
Written Opinion of the International Searching Authority for PCT/JP2014/059103 (PCT/ISA/237) dated Jun. 17, 2014.
Korean Notice of Allowance, dated Oct. 31, 2017, for counterpart Application No. 10-2016-7027036, along with an English translation.

* cited by examiner

PLATED STEEL SHEET WITH QUASICRYSTAL

TECHNICAL FIELD OF THE INVENTION

The present invention relates to a surface-treated steel sheet which is excellent in corrosion resistance. Particularly, the present invention relates to a plated steel sheet containing a quasicrystal.

RELATED ART

The quasicrystal is the crystal structure which was firstly discovered in 1982 by Dr. Daniel Shechtman, and has an atomic arrangement with a polyhedron with 20 faces (icosahedron). The quasicrystal is known as the crystal structure which has unique rotational symmetry not to be obtained by general metals and alloys, is a non-periodic crystal structure having fivefold symmetry for example, and is equivalent to a non-periodic structure represented by a three-dimensional Penrose Pattern.

After the discovery of the new arrangement of metallic atoms, that is new crystal structure, the quasicrystal having the quasi-periodic structure and having the unique rotational symmetry has received a lot of attention. The quasicrystal has been generally obtained by a liquid quenching method in the past, although it is found that the quasicrystal can be obtained by a crystal growth method in recent years. The shape thereof has been restricted to powder, foil, and chip, and thus, it has been very rare to apply the quasicrystal to a product.

Patent documents 1 and 2 disclose high strength Mg based alloys and producing methods thereof. The Mg based alloys have a metallographic structure in which the hard quasicrystal phase having a grain size of tens to hundreds of nm is dispersedly precipitated, and thus, the Mg based alloys are excellent in strength and elongation. The patent documents 1 and 2 utilize the properties such that the quasicrystal is hard.

Patent document 3 discloses a thermoelectric material using Al based quasicrystal. The patent document 3 utilizes the properties such that the quasicrystal is excellent in thermoelectric property. Patent document 4 discloses a heat-resistant catalyst whose precursor is a quasicrystalline Al alloy (Al based quasicrystal) and a producing method thereof. The patent document 4 utilizes, the properties such that the quasicrystal without a periodic crystal structure is brittle and fracturable. As described above, in the prior inventions, the fine particles of the quasicrystal may be dispersed or consolidated.

As another application different from the above inventions, patent document 8 discloses a metallic coating for cookware containing the quasicrystal. In the patent document 8, the coating excellent in wear resistance and corrosion resistance to salt is applied to the cookware by plasma-spraying the alloy powder containing the quasicrystal which consists of Al, Fe, and Cr and which is excellent in corrosion resistance.

As described above, the Mg based quasicrystal is utilized as the materials excellent in strength, and the Al based quasicrystal is utilized as members which is excellent in strength, thermoelectric materials, coatings for cookwares. However, the utilization is limited, and the quasicrystal is not always utilized in many fields.

The quasicrystal has excellent characteristics derived from the unique crystal structure. However, the characteristics thereof are only partially investigated, and the quasicrystal is not widely applied to industrial fields at the moment. The present inventors have tried to improve the corrosion resistance by applying the quasicrystal which is hardly utilized in the industrial field to a plated-metal-layer of a surface-treated steel sheet.

In general, in order to prolong a useful life of steel sheet, the steel sheet is subjected to surface treatment such as metallic plating, paint coating, conversion coating, or organic film laminating in order to ensure an anticorrosive function to a certain extent. In the many steel materials used in fields of automobiles, consumer electronics, building materials or the like, the metallic plating is mainly applied. The plated-metal-layer provides, at a low cost, both barrier protection in which a base metal (steel substrate) is shielded from outside environment and sacrificial protection in which the layer is preferentially corroded as compared with the base metal.

There are various methods to industrially form the plated-metal-layer. In order to make the plated-metal-layer thick, spraying, hot-dip plating or the like is preferable. In order to uniformly form the plated-metal-layer, sputtering, ion plating, evaporating, electro plating or the like is preferable. Among these methods, the hot-dip plating is widely applied, because it is possible to massively and economically produce the steel materials with the plated-metal-layer.

In the electro plating, deposited metals are limited, and thus, the elements included in the plated-metal-layer are limited in general. In the methods such as the spraying and the evaporating in which the plated-metal-layer is formed by using reactions such as melting, evaporation, deposition, and solidification of metals, it is possible to form the plated-metal-layer as with that formed by the hot-dip plating in theory. However, each metal has specific melting point and boiling point, and thus, the difference between chemical compositions of the used alloy and the formed plated-metal-layer tends to occur in the spraying and the evaporating.

Since it is possible for the hot-dip plating to form the plated-metal-layer whose chemical composition is about the same as that of the used alloy for the hot-dip bath, the hot-dip plating is well suitable for forming the plated-metal-layer which has predetermined chemical composition as compared with other forming methods.

At present, conventional surface-treated steel sheets which are industrially available are mainly those with the plated-metal-layer of Zn-based alloy or Al-based alloy. The plated-metal-layer of Zn-based alloy includes Zn as main element and a small amount of Al, Mg, or the like, and the metallographic structure thereof includes Zn phase, Al phase, $Mg_2Zn$ phase, or the like. The plated-metal-layer of Al-based alloy includes Al as main element and a small amount of Si, Fe, or the like, and the metallographic structure thereof includes Al phase, Si phase, $Fe_2Al_5$ phase, or the like.

As the plated steel materials in which the chemical composition of plated alloy is quite different from that of the conventional surface-treated steel sheets, the present inventors disclosed the steel sheets with the plated layer containing Mg-based alloy in patent documents 5 to 7. Based on the above plated steel materials, the present inventors have tried to further improve the corrosion resistance by focusing the quasicrystal which has hardly been considered for the improvement of the corrosion resistance of the plated layer (plated-metal-layer).

PRIOR ART DOCUMENT

Patent Document

[Patent Document 1] Japanese Unexamined Patent Application, First Publication No. 2005-113235

[Patent Document 2] Japanese Unexamined Patent Application, First Publication No. 2008-69438
[Patent Document 3] Japanese Unexamined Patent Application, First Publication No. H08-176762
[Patent Document 4] Japanese Unexamined Patent Application, First Publication No. 2004-267878
[Patent Document 5] Japanese Unexamined Patent Application, First Publication No. 2008-255464
[Patent Document 6] Japanese Unexamined Patent Application, First Publication No. 2010-248541
[Patent Document 7] Japanese Unexamined Patent Application, First Publication No. 2011-219823
[Patent Document 8] Published Japanese Translation No. 2007-525596 of the PCT International Publication

DISCLOSURE OF THE INVENTION

Problems to be Solved by the Invention

An object of the present invention is to provide the plated steel sheet which is further excellent in the corrosion resistance requested for applying building materials, automobiles, consumer electronics or the like.

In particular, an object of the present invention is to provide the plated steel sheet having both excellent corrosion resistance and excellent sacrificial protection by focusing the quasicrystal which has hardly been considered for the improvement of the corrosion resistance of the plated layer and by clarifying the morphology of the metallographic structure which maximally improve the corrosion resistance. Specifically, the corrosion resistance and the sacrificial protection of the plated steel sheet is to be improved by clarifying the preferable morphology of the quasicrystal in plated-metal-layer (the plated layer) which has hardly been considered but which is expected to improve the corrosion resistance and by clarifying the processes to preferably form the quasicrystal in the plated-metal-layer.

Means for Solving the Problem

An aspect of the present invention employs the following.
(1) A plated steel sheet with a quasicrystal according to an aspect of the present invention includes a steel sheet and a plated-metal-layer arranged on a surface of the steel sheet, wherein: the plated-metal-layer includes, as a chemical composition, by atomic %,
20% to 60% of Zn,
0.3% to 15% of Al,
0% to 3.5% of Ca,
0% to 3.5% of Y,
0% to 3.5% of La,
0% to 3.5% of Ce,
0% to 0.5% of Si,
0% to 0.5% of Ti,
0% to 0.5% of Cr,
0% to 2% of Fe,
0% to 0.5% of Co,
0% to 0.5% of Ni,
0% to 0.5% of V,
0% to 0.5% of Nb,
0% to 0.5% of Cu,
0% to 0.5% of Sn,
0% to 0.2% of Mn,
0% to 0.5% of Sr,
0% to 0.5% of Sb,
0% to 0.5% of Pb, and
a balance of Mg and impurities;

a zinc content and an aluminum content expressed in atomic % in the chemical composition of the plated-metal-layer satisfy 25%≤Zn+Al;
the plated-metal-layer includes, as a metallographic structure, a quasicrystal phase;
a magnesium content, a zinc content, and an aluminum content expressed in atomic % in the quasicrystal phase satisfy $0.5 \le Mg/(Zn+Al) \le 0.83$; and
an average equivalent circle diameter of the quasicrystal phase is larger than 1 µm and equal to or smaller than 200 µm.

(2) In the plated steel sheet with the quasicrystal according to (1),
a calcium content, an yttrium content, a lanthanum content, and a cerium content expressed in atomic % in the chemical composition of the plated-metal-layer may satisfy $0.3\% \le Ca+Y+La+Ce \le 3.5\%$.

(3) In the plated steel sheet with the quasicrystal according to (1) or (2),
a silicon content, a titanium content, and a chromium content expressed in atomic % in the chemical composition of the plated-metal-layer may satisfy $0.005\% \le Si+Ti+Cr \le 0.5\%$.

(4) In the plated steel sheet with the quasicrystal according to any one of (1) to (3),
a zinc, content and an aluminum content expressed in atomic % in the chemical composition or the plated-metal-layer may satisfy $30\% \le Zn+Al \le 50\%$ and $3 \le Zn/Al \le 12$.

(5) In the plated steel sheet with the quasicrystal according to any one of (1) to (4),
when viewed in a cross section, whose cutting direction is parallel to a thickness direction of the plated-metal-layer,
the metallographic structure of the plated-metal-layer may be a bimodal structure which comprises a fine domain composed of a grain having an equivalent circle diameter of 1 µm or smaller and a coarse domain composed of a grain having an equivalent circle diameter of larger than 1 µm,
the coarse domain may include the quasicrystal phase, and
the fine domain may include at least one selected from a $Mg_{51}Zn_{20}$ phase, a $Mg_{32}(Zn, Al)_{49}$ phase, a MgZn phase, a $MgZn_2$ phase, and a Zn phase.

(6) In the plated steel sheet with the quasicrystal according to any one of (1) to (5),
an area fraction of the coarse domain in the metallographic St equal to or more than 5% and equal to or less than 80%, and
an area fraction of the fine domain in the metallographic structure may be equal to or more than 20% and equal to or less than 95%.

(7) In the plated steel sheet with the quasicrystal according to any one of (1) to (6),
an area fraction of the quasicrystal phase included in the coarse domain may be equal to or more than 80% and less than 100% in the coarse domain, and
an area fraction in total of the $Mg_{51}Zn_{20}$ phase, the $Mg_{32}(Zn, Al)_{49}$ phase, the MgZn phase, the $MgZn_2$ phase, and the Zn phase included in the fine domain may be equal to or more than 80% and less than 100% in the fine domain.

(8) In the plated steel sheet with the quasicrystal according to any one of (1) to (7), when viewed in the cross section and when a thickness of the plated-metal-layer is regarded as D, an area from a surface of the plated-metal-layer toward the steel sheet in the thickness direction to 0.3×D is regarded as a surface area of the plated-metal-layer, and an area from an interface between the steel sheet and the plated-metal-layer toward the plated-metal-layer in the thickness direction to 0.3×D is regarded as a deep area of the plated-metal-layer, an area fraction of the coarse domain in the surface area of the plated-metal-layer may be equal to or more than 10% and less than 100% and an area fraction of the coarse domain in the deep area of the plated-metal-layer may be equal to or more than 10% and less than 100%, and when an area except for the surface area and the deep area in the plated-metal-layer is regarded as a center area of the plated-metal-layer, an area fraction of the fine domain in the center area of the plated-metal-layer may be equal to or more than 50% and less than 100%.

(9) In the plated steel sheet with the quasicrystal according to any one of (1) to (8), a Mg phase may be absent in the metallographic structure of the plated-metal-layer.

(10) The plated steel sheet with the quasicrystal according to any one of (1) to (9) may further include a Fe—Al containing alloy layer, wherein: the Fe—Al containing alloy layer is arranged between the steel sheet and the plated-metal-layer;

the Fe—Al containing alloy layer includes at least one selected from $Fe_5Al_2$ and $Al_{3.2}Fe$; and a thickness of the Fe—Al containing alloy layer is equal to or more than 10 nm and equal to or less than 1000 nm.

(11) A method of producing a plated steel sheet with a quasicrystal according to an aspect of the present invention, which is the method of producing the plated steel sheet with the quasicrystal according to any one of (1) to (10), includes:

a hot-dip-plating process of dipping a steel sheet into a hot-dip-plating bath having an adjusted composition in order to form a plated-metal-layer on a surface of the steel sheet;

a first cooling process of cooling the steel sheet after the hot-dip-plating process under conditions such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and a second cooling process of cooling the steel sheet after the first cooling process under conditions such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

(12) In the method of producing the plated steel sheet with the quasicrystal according to (11), in the hot-dip-plating process:

an oxide in the hot-dip-plating bath may be 1 g/l or less;

an oxygen concentration of an atmosphere at dipping the steel sheet may be 100 ppm or less in volume ratio;

a plating tub to hold the hot-dip-plating bath may be a steel tub;

a dross in the hot-dip-plating bath may be removed by a metal pump;

$T_{bath}$ which is a temperature of the hot-dip-plating bath may be equal to or higher than 10° C. and equal to or lower than 100° C. higher than the $T_{melt}$; and a time for dipping the steel sheet into the hot-dip-plating bath may be equal to or longer than 1 sec and equal to or shorter than 10 sec.

Effects of the Invention

According to the above aspects of the present invention, it is possible to provide the plated steel sheet which is further excellent in the corrosion resistance requested for applying building materials, automobiles, consumer electronics or the like. Therefore, it s possible to prolong the useful life of the materials as compared with the conventional surface-treated steel sheets.

EMBODIMENTS OF THE INVENTION

Figure 1:
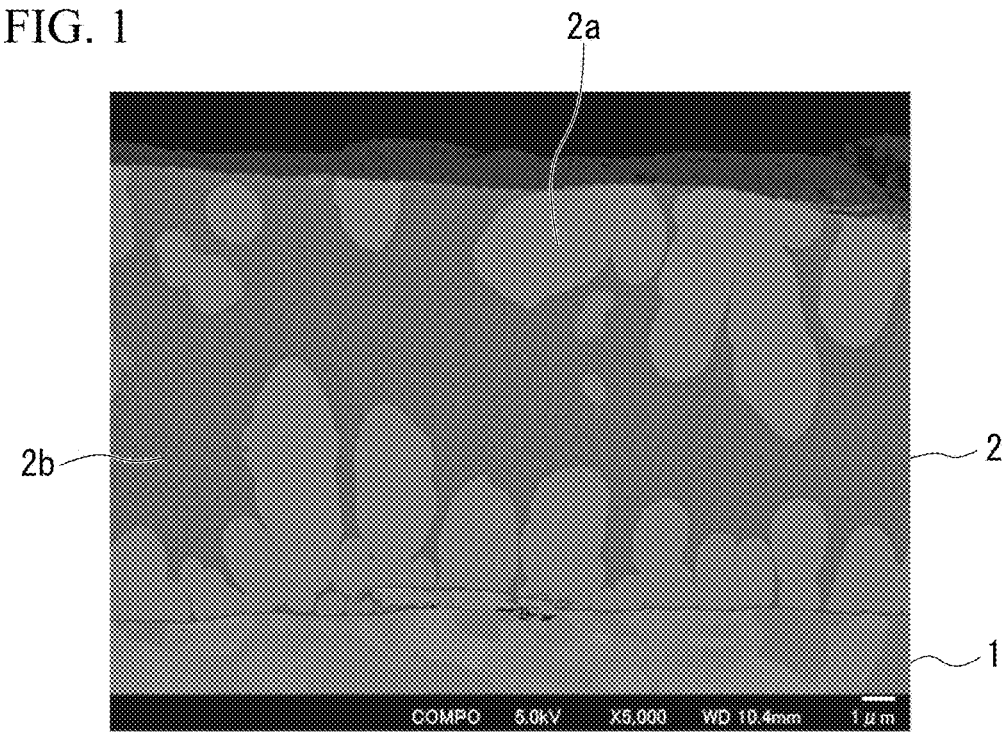
FIG. 1 is a SEM micrograph of a plated steel sheet according to an embodiment of the present invention and a metallographic micrograph obtained by observing a cross section whose cutting direction is parallel to a thickness direction of the plated steel sheet.

Hereinafter, a preferable embodiment of the present invention will be described in detail. However, the present invention is not limited only to the configuration which is disclosed in the embodiment, and various modifications are possible without departing from the aspect of the present invention.

The plated steel sheet according to the embodiment includes a steel sheet (base metal) and a plated-metal-layer (plated layer) arranged on a surface of the steel sheet. The plated-metal-layer whose shape is thin film is the alloy which has adhesion to the base metal, equips the steel sheet with a function such as anticorrosion, and does not harm the properties of the base metal such as strength or rigidity. Specifically, the plated steel sheet according to the embodiment is the composite material in which two types of metal-alloy-materials that are the steel sheet and the plated-metal-layer are layered. In the interface between the steel sheet and the plated-metal-layer, an interface alloy layer (Fe—Al containing alloy layer) or a diffused area formed by mutual diffusion of metal atoms may exist as a result of the composition, and thereby, the interface adherence may be increased due to atomic bonding of metal. First, the properties requested to the plated-metal-layer of the plated steel sheet according to the embodiment will be described.

The plated-metal-layer of the plated steel sheet is required to be excellent in anticorrosion performance. The anticorrosion performance is classified into the corrosion resistance and the sacrificial protection. In general, the corrosion resistance of the plated-metal-layer corresponds to the corrosive resistivity of the plated-metal-layer itself, and is usually evaluated by the corrosion loss of the plated-metal-layer after a predetermined time in various corrosion tests.

When the corrosion loss is small, the plated-metal-layer remains for a long time as a protective layer of the steel sheet (base metal), and thus, the corrosion resistance is excellent. When the corrosion loss is evaluated by using pure metals, the corrosion resistance of Zn tends to be better than that of Mg, and the corrosion resistance of Al tends to be better than that of Zn in general.

On the other hand, the sacrificial protection of the plated-metal-layer corresponds to the protective function for the steel sheet in which the plated-metal-layer is preferentially corroded instead of the steel sheet when the steel sheet is accidentally exposed in corrosive environment. When the sacrificial protection is evaluated by using pure metals, the metal which is electrochemically less-noble and which tends to be corroded is excellent in the sacrificial protection. Thus, the sacrificial protection of Zn tends to be better than that of Al, and the sacrificial protection of Mg tends to be better than that of Zn in general.

The steel sheet plated the Zn—Mg alloy according to the embodiment includes a large amount of Mg in the plated-metal-layer, and thus, is excellent in the sacrificial protection. On the other hand, the point to be improved is to reduce the corrosion loss of the plated-metal-layer, which is to improve the corrosion resistance of the plated-metal-layer.

The present inventors have investigated, the constituent phase of the metallographic structure of the plated-metal-layer in order to preferably reduce the corrosion loss of the plated-metal-layer in the steel sheet plated the Zn—Mg alloy. As a result, it is found that the corrosion resistance is drastically improved by including the quasicrystal phase in the plated-metal-layer.

The metallographic structure of the plated-metal-layer is the main characteristic of the plated steel sheet according to the embodiment. In a case where the plated steel sheet is produced based on a chemical composition within a specific range, which will be described later, under specific production conditions, a quasicrystal phase is formed in the plated-metal-layer, and corrosion resistance can be significantly improved. In the embodiment, an average equivalent circle diameter (diameter) of the quasicrystal phase formed in the plated-metal-layer is larger than 1 μm and equal to or smaller than 200 μm.

The plated-metal-layer of the plated steel sheet according to the embodiment contains the aforementioned quasicrystal phase. Therefore, the corrosion resistance thereof is further improved compared to the corrosion resistance of a plated-metal-layer not containing a quasicrystal phase. Furthermore, the plated-metal-layer of the plated steel sheet according to the embodiment contains a large amount of Mg. Therefore, the plated-metal-layer also exhibits excellent sacrificial protection with respect to the steel sheet. That is, the plated steel sheet according to the embodiment includes an ideal plated-metal-layer excellent in both of the corrosion resistance and the sacrificial protection.

Hereinafter, regarding the plated steel sheet according to the embodiment, the chemical composition of the plated-metal-layer, the metallographic structure of the plated-metal-layer, and the production conditions will be specifically described in this order.

Generally, when constitutive equations of metallic phases or intermetallic compounds such as Zn, Al, $Mg_2Zn$, and $Fe_2Al_5$ are described, an atomic ratio is used instead of a mass ratio. The embodiment will be described using an atomic ratio because the embodiment is focused on a quasicrystal phase. That is, unless otherwise specified, "%" showing a chemical composition in the following description means atomic %.

First, regarding the chemical composition of the plated-metal-layer, the way the numerical ranges are limited and why the numerical ranges are limited will be described.

The plated-metal-layer of the plated steel sheet according to the embodiment contains Zn and Al as basic components, optional components as necessary, and Mg and impurities as a balance.

Zn (Zinc): 20% to 60%

In order to obtain a quasicrystal phase as a metallographic structure of the plated-metal-layer, the plated-metal-layer must contain Zn within the above range. Therefore, a Zn content in the plated-metal-layer needs to be 20% to 60%. In a case where the Zn content is less than 20%, the quasicrystal phase cannot be formed in the plated-metal-layer. Likewise, in a case where the Zn content is greater than 60%, the quasicrystal phase cannot be formed in the plated-metal-layer. Furthermore, in order to preferably control the formation of the quasicrystal phase and the formation of an intermetallic compound, which will be described later, the lower limit and the upper limit of the Zn content may be set to be 25% and 52% respectively. More preferably, the lower limit and the upper limit of the Zn content may be set to be 30% and 45% respectively.

In order to further improve the corrosion resistance by preferably forming the quasicrystal, the Zn content is preferably set to be equal to or greater than 33%. If the Zn content is equal to or greater than 33%, a compositional range is established in which the quasicrystal phase easily grows as a primary phase, and a Mg phase does not easily grow. That is, an amount (area fraction) of the quasicrystal phase in the plated-metal-layer can be increased, and an amount of the Mg phase deteriorating corrosion resistance can be reduced as much as possible. More preferably, the Zn content is set to be equal to or greater than 35%. Generally, if the plated steel sheet is produced within the above compositional range by the production method according to the embodiment, the Mg phase practically does not exist.

Al (aluminum): 0.3% to 15%

Al is an element improving the corrosion resistance of a planar portion of the plated-metal-layer. Furthermore, Al is an element accelerating the formation of the quasicrystal phase. In order to obtain these effects, an Al content in the plated-metal-layer is set to be equal to or greater than 0.3%. In order to preferably control an average equivalent circle diameter of the quasicrystal phase, the Al content in the plated-metal-layer may be set to be equal to or greater than 5%. When the Al content is equal to or greater than 5%, the average equivalent circle diameter of the quasicrystal phase easily becomes larger than 1 μm, and when the Al content is equal to or greater than 10%, the average equivalent circle diameter of the quasicrystal phase easily becomes larger than 2 μm. If the average equivalent circle diameter of the quasicrystal phase is controlled and becomes larger than 2 μm, the corrosion resistance of the planar portion is further improved. In a case where the Zn content is smaller than the values within the above range, in order to preferably form the quasicrystal phase in the plated-metal-layer, it is preferable to control the Zn content and the Al content in combination. Specifically, the Zn content and the Al content, expressed in atomic %, in the chemical composition of the plated-metal-layer preferably satisfy 25%≤Zn+Al, and more, preferably satisfy 28.5%≤Zn+Al. The upper limit of Zn+Al is not particularly limited and is preferably 50%. In contrast, if the plated-metal-layer contains a large amount of Al, red rust easily occurs, the quasicrystal phase is not easily formed, and thus the corrosion resistance deteriorates. Therefore, the upper limit of the Al content in the plated-metal-layer needs to be set to be 15%. In addition, it is preferable that the element Al is contained in the plated-metal-layer by forming a Fe—Al interface alloy layer which will be described later.

In order to more preferably form the quasicrystal phase in the plated-metal-layer, it is preferable to control the Zn content and the Al content as below. That is, the Zn content and the Al content, expressed in atomic %, in the chemical composition of the plated-metal-layer preferably satisfy 30%≤Zn+Al≤50% and 3≤Zn/Al≤12. When the Zn content and the Al content satisfy the above conditions, the quasicrystal phase is formed in the plated-metal-layer at a preferred area fraction. It is preferable that the Zn content and the Al content satisfy the above conditions, because then the quasicrystal phase is formed in the plated-metal-layer at an area fraction of about 30% to 80% with respect to the total area of the plated-metal-layer. The technical reason is unclear. However, the formation of the quasicrystal phase at the aforementioned area fraction is considered to be related to the facts that the quasicrystal phase in the embodiment has a crystal structure mainly composed of Zn and Mg, the formation of the quasicrystal phase is accelerated by the substitution of Al with Zn, and there is an optimal value of the amount of Al substituted. Because the quasicrystal phase is preferably formed in the plated-metal-layer, the corrosion resistance is improved particularly in a processed portion, and it takes a long time until red rust starts to occur in a base metal. Presumably, these effects result from a fact that the quasicrystal phase is preferably dispersed in the plated-metal-layer because the contents of Zn and Al are precisely controlled.

Mg (magnesium) is a main element which constitutes the plated-metal-layer similarly to Zn and Al and improves the sacrificial protection. Furthermore, Mg is an important element accelerating the formation of the quasicrystal phase. In the embodiment, a content of Mg in the plated-metal-layer does not need to be particularly specified and is equal to the aforementioned balance minus a content of impurities. That is, the Mg content may be greater than 25% and less than 79.7%. However, the Mg content in the balance is preferably equal to or greater than 50%, and more preferably equal to or greater than 55%. In the embodiment, although the plated-metal-layer must contain M order to improve the corrosion resistance, it is preferable to inhibit Mg contained in the plated-metal-layer from being precipitated as a Mg phase in the plated-metal-layer. That is, because the Mg phase deteriorates the corrosion resistance, it is preferable that Mg is contained in the plated-metal-layer is in the form of a quasicrystal phase or a constituent of other intermetallic compounds.

The plated-metal-layer of the plated steel sheet according to the embodiment contains impurities in addition to the aforementioned basic components. Herein, the impurities mean elements such as C, N, O, P, S, and Cd that are mixed in from raw materials of steel and plated alloys, the production environment, or the like when the plated steel sheet is industrially produced. Even if these elements are contained as impurities in an amount of about 0.1% respectively, the aforementioned effects are not impaired.

The plated-metal-layer of the plated steel sheet according to the embodiment may further contain, instead of a portion of Mg described above as a balance, at least one or more optional components selected from Ca, Y, La, Ce, Si, Ti, Cr, Fe, Co, Ni, V, Nb, Cu, Sn, Mn, Sr, Sb, and Pb. The plated-metal-layer may contain these optional components according to the purpose. Therefore, the lower limit of the content of these optional components does not need to be limited and may be 0%. Even if these optional components are contained as impurities, the aforementioned effects are not impaired.

Ca (calcium): 0% to 3.5%
Y (yttrium): 0% to 3.5%
La (lanthanum): 0% to 3.5%
Ce (cerium): 0% to 3.5%

In order to improve workability of hot-dip plating, Ca, Y, La, and Ce may be contained in the plated-metal-layer as necessary. In a case where the plated steel sheet according to the embodiment is produced, a highly oxidative hot-dip Mg alloy is held in the atmosphere as a plating bath. Therefore, it is preferable to take a certain measure to prevent the oxidation of Mg. Ca, Y, La, and Ce are more easily oxidized compared to Mg and prevent the oxidation of Mg in the bath by forming a stable oxide layer on the surface of the plating bath in a molten state. Accordingly, in the plated-metal-layer, a Ca content may be set to be 0% to 3.5%, a Y content may be set to be 0% to 3.5%, a La content may be set to be 0% to 3.5%, and a Ce content may be set to be 0% to 3.5%. More preferably, the lower limit and the upper limit of each of the Ca content, the Y content, the La content, and the Ce content may be set to be 0.3% and 2.0% respectively.

It is preferable that the plated-metal-layer contain at least one element selected from Ca, Y, La, and Ce in an amount of equal to or greater than 0.3% in total, because then the plating bath with a high Mg content can be held in the atmosphere without being oxidized. In contrast, Ca, Y, La, and Ce are easily oxidized and negatively affect the corrosion resistance in some cases. Therefore, the upper limit of the total content of Ca, Y, La, and Ce is preferably set to be 3.5°. That is, it is preferable that the Ca content, the Y content, the La content, and the Ce content, expressed in atomic %, in the chemical composition of the plated-metal-layer satisfy 0.3%≤Ca+Y+La+Ce≤3.5%.

In order to preferably generate the quasicrystal phase in the plated-metal-layer, it is preferable that the total content of Ca, Y, La, and Ce is set to be equal to or greater than 0.3% and equal to or less than 2.0%. Although these elements are considered to be substituted with Mg constituting the quasicrystal phase, in a case where the plated-metal-layer contains a large amount of these elements, the formation of the quasicrystal phase is hindered in some cases. If the plated-metal-layer contains these elements in an appropriate amount, the effect of suppressing red rust of the quasicrystal phase is improved. Presumably, this effect may result from a fact that the elution timing of the quasicrystal phase affects retentivity of white rust. That is, presumably, after the quasicrystal phase in the plated-metal-layer is eluted, the aforementioned elements may be incorporated into the formed white rust, and accordingly, the rustproofness of white rust is improved, and it takes a long time until red rust occurs due to the corrosion of the base metal.

The obtained effects (antioxidation and the formation of the quasicrystal phase, phase) described above become relatively strong when the plated-metal-layer contains Ca, La, Ce among the aforementioned elements. In contrast, it was revealed that the aforementioned effects brought about when the plated-metal-layer contains Y is weaker than the effects brought about when the plated-metal-layer contain Ca, La, and Ce. Presumably, this may be related to the fact that Ca, La, and Ce are elements that are more easily oxidized and have higher reactivity compared to Y. When the chemical composition of the quasicrystal phase is analyzed through Energy Dispersive X-ray Spectroscopy (EDX), Y is not detected in many cases. Therefore, Y is presumed not to be easily incorporated into the quasicrystal. In contrast, Ca, La, and Ce tend to be detected from the quasicrystal phase at a high concentration compared to the concentration thereof contained in the plated-metal-layer. That is, the plated-metal-layer does not necessarily contain Y. In a case where the plated-metal-layer does not contain Y, $0.3\% \leq Ca+La+Ce \leq 3.5\%$ or $0.3\% \leq Ca+La+Ce \leq 2.0\%$ may be satisfied.

In a case where the atmosphere contacting the plating bath is purged with an inert gas (for example, Ar) or vacuated, that is, in a case where an oxygen blocking device is installed in the production facilities, Ca, Y, La, and Ce are not necessarily added.

The total content of Al, Ca, La, Y, and Ce is preferably controlled as below. That is, the Al content, the Ca content, the La content, the Y content, and the Ce content, expressed in atomic %, in the chemical composition of the plated-metal-layer preferably satisfy $6\% \leq Al+Ca+La+Y+Ce \leq 18.5\%$, and more preferably satisfy $6.5\% \leq Al+Ca+La+Y+Ce \leq 18.5\%$. If the total content of Al, Ca, La, Y, and Ce satisfies the aforementioned conditions, a quasicrystal phase having a preferred average equivalent circle diameter is formed in the plated-metal-layer. If the aforementioned conditions are satisfied, the average equivalent circle diameter of the quasicrystal phase can be controlled and become equal to or greater than 3 μm. Furthermore, it is possible to secure a certain degree of corrosion resistance due to the quasicrystal phase and to further improve powdering properties (peeling resistance against a compressive stress) of the plated layer to a certain degree. Presumably, Ca, La, Y, Ce, and the like added in a trace amount in addition to Al may be precipitated in the grain boundary of the quasicrystal phase, and hence the grain boundary may be strengthened. In contrast, if the total content of Al, Ca, La, Y, and Ce is greater than 18.5%, the powdering properties tend to deteriorate.

Si (silicon); 0% to 0.5%
Ti (titanium): 0% to 0.5%
Cr (chromium): 0% to 0.5%

The plated-metal-layer may contain Si, Ti, and Cr, as necessary, such that the quasicrystal phase is preferably formed. If the plated-metal-layer contains Si, Ti, and Cr in a trace amount, the quasicrystal phase is easily formed or the structure of the quasicrystal phase is stabilized. It is considered that Si may become an origin (nuclear) of the formation of the quasicrystal phase by means of forming fine $Mg_2Si$ by being bonded to Mg, and Ti and Cr, which exhibit poor reactivity with respect to Mg, may become the origin of the formation of the quasicrystal phase by means of forming a fine metallic phase. Furthermore, generally, the formation of the quasicrystal phase is affected by a cooling rate at the time of production. If the plated-metal-layer contains Si, Ti, and Cr, the cooling rate tends to become less dependent on the formation of the quasicrystal phase. Therefore, in the plated-metal-layer, a Si content may be set to be 0% to 0.5%, a Ti content may be set to be 0% to 0.5%, and a Cr content may be set to be 0% to 0.5%. More preferably, the lower limit and the upper limit of each of the Si content, the Ti content, and the Cr content may be set to be 0.005% and 0.1% respectively.

It is preferable that the plated-metal-layer contains at least one element selected from Si, Ti, and Cr in an amount of 0.005% to 0.5% in total, because then the structure of the quasicrystal is further stabilized. That is, the Si content, the Ti content, and the Cr content, expressed in atomic %, in the chemical composition of the plated-metal-layer preferably satisfy $0.005\% \leq Si+Ti+Cr \leq 0.5\%$. Furthermore, if these elements are contained in an appropriate amount, the quasicrystal is preferably formed in a large amount, and the corrosion resistance of the surface of the plated-metal-layer is improved. In addition, the corrosion resistance in a humid environment is improved, and the occurrence of white rust is inhibited.

Co (cobalt): 0% to 0.5%
Ni (nickel): 0% to 0.5%
V (vanadium): 0% to 0.5%
Nb (niobium): 0% to 0.5%

Co, Ni, V, and Nb have the same effects as those of Si, Ti, and Cr described above. In order to obtain the aforementioned effects, a Co content may be set to be 0% to 0.5%, a Ni content may be set to be 0% to 0.5%, a V content may be set to be 0% to 0.5%, and a Nb content may be set to be 0% to 0.5%. More preferably, the lower limit and the upper limit of each of the Co content, the Ni content, the V content, and the Nb content may be set to be 0.05% and 0.1% respectively. Here, the corrosion resistance improving effects of these elements are weaker than that of Si, Ti, and Cr.

In some cases, the elements constituting a steel sheet, which is a base metal, are mixed into the plated-metal-layer from the steel sheet. Particularly, during hot-dip plating, due to the mutual diffusion of elements in which the elements are diffused from the steel sheet to the plated-metal-layer and from the plated-metal-layer to the steel sheet, the adherence is improved. Therefore, the plated-metal-layer contains a certain amount of Fe (iron) in some cases. For example, Fe is contained in an amount of around 2% in the entire chemical composition of the plated-metal-layer in some cases. However, Fe diffused to the plated-metal-layer frequently forms an intermetallic compound by reacting with Al and Zn in the vicinity of the interface between the steel sheet and the plated-metal-layer. Therefore, Fe is less likely to affect the corrosion resistance of the plated-metal-layer. Consequently, an Fe content in the plated-metal-layer may be set to be 0% to 2%. Similarly, the elements constituting the steel sheet that have been diffused to the plated-metal-layer (elements other than the elements described above in the embodiment that have been diffused to the plated-metal-layer from the steel sheet) are less likely to affect the corrosion resistance of the plated-metal-layer.

Cu (copper): 0% to 0.5%
Sn (tin): 0% to 0.5%

In order to improve the adherence between the steel sheet and the plated-metal-layer, the steel sheet having not yet been subjected to a hot-dip plating process is preliminarily plated with Ni, Cu, Sn, or the like in some cases. In a case where the plated steel sheet is produced using the preliminarily plated steel sheet, the plated-metal-layer contains the aforementioned elements approximately in an amount of up to 0.5% in some cases. Among Ni, Cu, and Sn, Cu and Sn do not have the aforementioned effects that Ni has. However, even if Cu and Sn are contained in an amount of about 0.5% in the plated-metal-layer, they are less likely to affect the quasicrystal formation behavior or the corrosion resistance of the plated-metal-layer. Therefore, in the plated-metal-layer, a Cu content may be set to be 0% to 0.5%, and a Sn content may be set to be 0% to 0.5%. More preferably, the lower limit and the upper limit of each of the Cu content and the Sn content may be set to be 0.005% and 0.4% respectively.

Mn (manganese): 0% to 0.2%

In recent years, as a steel sheet which is a base metal of a plated steel sheet, high tensile strength steel (high strength steel) has been used. In a case where a plated steel sheet is produced using the high tensile strength steel, the elements such as Si and Mn contained in the high tensile strength steel are diffused in the plated-metal-layer in some cases. Between Si and Mn, Mn does not have the aforementioned effects that Si has. However, even if the Mn is contained in an amount of about 0.2% in the plated-metal-layer, the elements is not likely to affect the quasicrystal formation behavior or the corrosion resistance of the plated-metal-layer. Therefore, a Mn content in the plated-metal-layer may be set to be 0% to 0.2%. More preferably, the lower limit and the upper limit of the Mn content may be set to be 0.005% and 0.1% respectively.

Sr (strontium): 0% to 0.5%
Sb (antimony): 0% to 0.5%
Pb (lead): 0% to 0.5%

Sr, Sb, and Pb are elements improving the appearance of plating and effective for improving antiglare properties. In order to obtain the effect, in the plated-metal-layer, a Sr content may be set to be 0% to 0.5%, a Sb content may be set to be 0% to 0.5%, and a Pb content may be set to be 0% to 0.5%. In a case where the Sr content, the Sb content, and the Pb content are within the above range, the elements practically do not affect the corrosion resistance. More preferably, the lower limit and the upper limit of each of the Sr content, the Sb content, and the Pb content may be set to be 0.005% and 0.4% respectively.

The aforementioned chemical composition of the plated-metal-layer is measured using Inductively Coupled Plasma Atomic Emission Spectrometry (ICP-AES), Inductively Coupled Plasma Mass Spectrometry (ICP-MS), or the like. The plated steel sheet is dipped in 10% hydrochloric acid, to which an inhibitor added, for about 1 minute such that the plated-metal-layer portion is peeled off, thereby preparing a solution in which the plated-metal-layer is dissolved. By analyzing the solution through ICP-AES, ICP-MS, or the like, the average chemical composition of the whole plated-metal-layer is obtained.

During the hot-dip plating, a plated-metal-layer having substantially the same chemical composition as the chemical composition of the hot-dip plating bath is formed. Therefore, regarding the elements that undergo mutual diffusion between the steel sheet and the plated-metal-layer to a negligible extent, the chemical composition of the plating bath may be measured, and the measured value may be adopted as the chemical composition of the plated-metal-layer. From the plating bath, a small ingot is collected, drill, dust is then collected, and a solution obtained by dissolving the drill dust in an acid is prepared. By analyzing the solution through ICP or the like, the chemical composition of the plating bath is obtained. The measured value of the chemical composition of the plating bath may be used as the chemical composition of the plated-metal-layer.

Next, the metallographic structure of the plated-metal-layer will be described.

The plated-metal-layer of the plated steel sheet according to the embodiment contains a quasicrystal phase as a metallographic structure. The quasicrystal phase is defined as a quasicrystal phase in which the contents of Mg, Zn, and Al, expressed in atomic %, contained in the quasicrystal phase satisfy $0.5 \leq Mg/(Zn+Al) \leq 0.83$. That is, the quasicrystal phase is defined as a quasicrystal phase in which Mg:(Zn+Al), a ratio of the number of Mg atoms to the total number of Zn atoms and Al atoms, is 3:6 to 5:6. Theoretically, the ratio of Mg:(Zn+Al) is considered to be 4:6. The chemical composition of the quasicrystal phase is preferably calculated by quantitative analysis based on Transmission Electron Microscope-Energy Dispersive X-ray Spectroscopy (TEM-EDX) or by quantitative analysis based on Electron Probe Micro-Analyzer (EPMA) mapping. It is not easy to define the quasicrystal by using an accurate chemical formula just as an intermetallic compound. This is because a repeating lattice unit of the quasicrystal phase cannot be defined unlike a unit lattice of a crystal, and it is difficult to identify the atomic position of Zn and Mg.

In the embodiment, an average equivalent circle diameter of the quasicrystal phase contained in the plated-metal-layer is larger than 1 μm and equal to or smaller than 200 μm. The lower limit of the average equivalent circle diameter of the quasicrystal phase is not particularly limited, but in view of the constitution of the metallographic structure of the plated-metal-layer that will be described later, the lower limit of the average equivalent circle diameter of the quasicrystal phase is preferably larger than 1 μm. In addition, in order to further improve the corrosion resistance of the plated-metal-layer, the lower limit of the average equivalent circle diameter of the quasicrystal phase is preferably set to be 1.5 μm, more preferably set to be larger than 2.0 μm, and most preferably set to be larger than 5 μm. It is not easy to form a quasicrystal phase having an average equivalent circle diameter of larger than 200 μm. Therefore, the upper limit of the average equivalent circle diameter of the quasicrystal phase is set to be 200 μm. As the quasicrystal phase, it is possible to identify a quasicrystal phase having an average equivalent circle diameter of about up to 0.01 μm by using an electron micrograph and an electron diffraction pattern obtained by TEM.

It is preferable that in a case where a cross section whose cutting direction is parallel to a thickness direction of the plated-metal-layer is viewed, the metallographic structure of the plated-metal-layer is a bimodal structure which consists of a coarse domain composed of a grain having an equivalent circle diameter of larger than 1 μm and a fine domain composed of a grain having an equivalent circle diameter 1 μm or smaller. Furthermore, it is preferable that the coarse domain includes the quasicrystal phase, and the fine domain includes at least one or more kinds of phase selected from a $Mg_{51}Zn_{20}$ phase, a $Mg_{32}(Zn, Al)_{49}$ phase, a MgZn phase, a $MgZn_2$ phase, and a Zn phase. If the metallographic structure of the plated-metal-layer is controlled to become a biomodal structure consisting of the coarse domain and the fine domain as described above, the corrosion resistance is preferably improved. The upper limit of the equivalent circle diameter of the grain included in the coarse domain and the lower limit of the equivalent circle diameter of the grain included in the fine domain are not particularly limited. The upper limit may be set to be 500 μm, 300 μm, or 200 μm, and the lower limit may be set to be larger than 0 μm or 0.01 μm or larger as necessary.

Generally, a biomodal structure means a structure in which a frequency distribution of the equivalent circle diameter of the grain included in the metallographic structure becomes double-peak distribution. In the plated steel sheet according to the embodiment, it is preferable that the frequency distribution of the equivalent circle diameter of the grain included in the metallographic structure of the plated-metal-layer is a double-peak distribution. Here, in the plated steel sheet according to the embodiment, the frequency distribution is not necessarily a double-peak distribution, and the aforementioned effects are obtained even if the frequency distribution is a broad distribution. That is, in the embodiment, the biomodal structure means that the frequency distribution of the equivalent circle diameter of the grain included in the metallographic structure of the plated-metal-layer is not a normal distribution, and the metallographic structure of the plated-metal-layer consists of the fine domain composed of a grain having an equivalent circle diameter of 1 μm or smaller and the coarse domain composed of a grain having an equivalent circle diameter of larger than 1 μm.

As described above, the average equivalent circle diameter of the quasicrystal phase contained in the metallographic structure of the plated-metal-layer of the plated steel sheet according to the embodiment is larger than 1 μm and equal to or smaller than 200 μm. That is, in a case where each grain of the quasicrystal phase is separately considered, a quasicrystal phase having an equivalent circle diameter of larger than 1 μm and a quasicrystal phase having an equivalent circle diameter of 1 μm or smaller are contained in the metallographic structure of the plated-metal-layer. He e, because the average equivalent circle diameter of the quasicrystal phase is larger than 1 μm and equal to or smaller than 200 μm, the quasicrystal phase is mainly included in the coarse domain of the plated-metal-layer.

The average equivalent circle diameter of the $Mg_{51}Zn_{20}$ phase, the $Mg_{32}(Zn, Al)_{49}$ phase, the MgZn phase, the $MgZn_2$ phase, and the Zn phase other than the quasicrystal phase is preferably set to be 0.01 μm to 1 μm. In this case, the metallographic structure of the plated-metal-layer contains grains of the aforementioned phases having an equivalent circle diameter of 1 μm or smaller and grains of the aforementioned phases having an equivalent circle diameter of larger than 1 μm. Here, because the average equivalent circle diameter of these phases is preferably 0.01 μm to 1 μm, the $Mg_{51}Zn_{20}$ phase, the $Mg_{32}(Zn, Al)_{49}$ phase, the MgZn phase, the $MgZn_2$ phase, and the Zn phase are mainly included in the fine domain. That is, in the metallographic structure of the plated-metal-layer of the plated steel sheet according to the embodiment, it is preferable that the quasicrystal phase is mainly included in the coarse domain, at least one or more kinds of phase among the $Mg_{51}Zn_{20}$ phase, the $Mg_{32}(Zn, Al)_{49}$ phase, the MgZn phase, the $MgZn_2$ phase, and the Zn phase are mainly included in the fine domain.

FIG. 1 is an electron micrograph of a plated steel sheet according to the embodiment, which is a metallographic micrograph obtained by observing a cross section whose cutting direction is parallel to a thickness direction of the plated steel sheet. This cross-sectional image is a backscattered electron compositional image (COMPO image) obtained by observation using a Scanning Electron Microscope (SEM). In FIG. 1, 1 indicates a steel sheet, and 2 indicates a plated-metal-layer. Furthermore, in FIG. 1, 2a indicates a coarse domain, and 2b indicates a fine domain. The quasicrystal phase is included in the coarse domain 2a, and at least one or more kinds of phase among the $Mg_{51}Zn_{20}$ phase, the $Mg_{32}(Zn, Al)_{49}$ phase, the MgZn phase, the $MgZn_2$ phase, and the Zn phase are included in the fine domain 2b. FIG. 1 shows that the metallographic structure of the plated-metal-layer is a bimodal structure.

In a strict sense, fine intermetallic compounds or metal phases having an equivalent circle diameter of 1 μm or smaller are diffused in the coarse domain 2a in some cases. However, fine grains present in the coarse domain 2a are not regarded as being the fine domain 2b. In the embodiment, the fine domain 2b refers to a domain in which a plurality of fine grains having an equivalent circle diameter 1 μm or smaller is continuously piled up and which is found to be an equivalent area when being observed at an SEM level.

Figure 2:
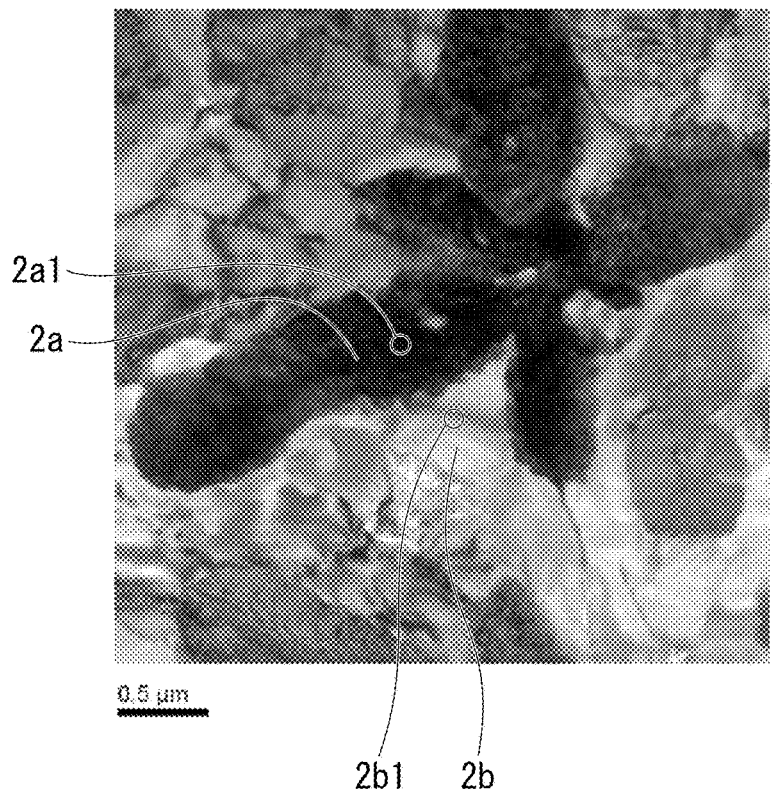
FIG. 2 is a TEM micrograph of a plated-metal-layer of the plated steel sheet according to the embodiment and a metallographic micrograph obtained by observing the cross section whose cutting direction is parallel to the thickness direction of the plated steel sheet.

FIG. 2 is an electron micrograph of the plated-metal-layer of the plated steel sheet according to the same embodiment, which is a metallographic micrograph obtained by observing the cross section whose cutting direction is parallel to the thickness direction of the plated steel sheet. This cross-sectional image is obtained by observation using TEM and is a bright field image. In FIG. 2, 2a indicates a coarse domain, and 2b indicates a fine domain. Similarly to FIG. 1, FIG. 2 shows that the metallographic structure of the plated-metal-layer is a biomodal structure.

Figure 3A:
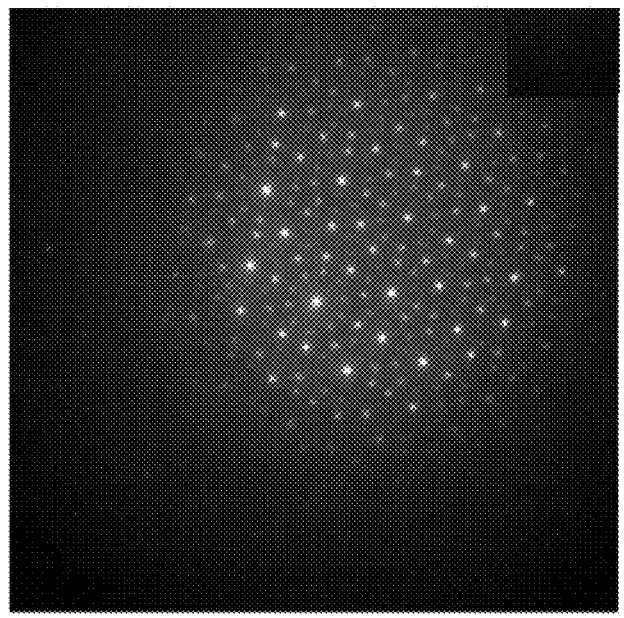
FIG. 3A is an electron diffraction pattern obtained from a local area 2a1 in a coarse domain 2a shown in FIG. 2.
Figure 3B:
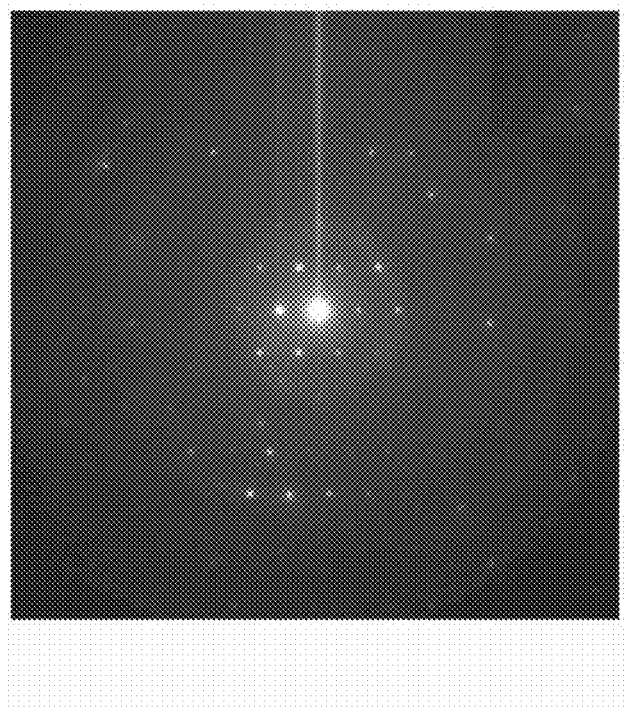
FIG. 3B is an electron diffraction pattern obtained from a local area 2b1 in a fine domain 2b shown in FIG. 2.

FIG. 3A is an electron diffraction pattern obtained from a local area 2a1 in the coarse domain 2a shown in FIG. 2. FIG. 3B is an electron diffraction pattern obtained from a local area 2b1 in the fine domain 2b shown in FIG. 2. FIG. 3A shows an electron diffraction pattern of a radial regular decagon resulting from an icosahedron structure. The electron diffraction pattern shown in FIG. 3A is obtained from only a quasicrystal and cannot be obtained from any other crystal structures. From the electron diffraction pattern shown in FIG. 3A, it can be confirmed that the quasicrystal phase is included in the coarse domain 2a. FIG. 3B shows an electron diffraction pattern resulting from the $Mg_{51}Zn_{20}$ phase. From the electron diffraction pattern shown in FIG. 3B, it can be confirmed that the $Mg_{51}Zn_{20}$ phase is included in the fine domain 2b. Furthermore, it was confirmed that the $Mg_{32}(Zn, Al)_{49}$ phase, the MgZn phase, the $MgZn_2$ phase, and the Zn phase are included in the fine domain 2b in some cases, although such cases are not shown in the drawing.

In the fine domain 2b, a large amount of $Mg_{51}Zn_{20}$ is observed in a case where the Mg content is high, and a large amount of $Mg_{32}(Zn, Al)_{49}$ phase is observed in a case where the Mg content is low. The presence of inter metallic compounds or metal phases such as the $Mg_{51}Zn_{20}$ phase, the $Mg_{32}(Zn, Al)_{49}$ phase, the MgZn phase, the $MgZn_2$ phase, and the Zn phase can be confirmed using an electron diffraction pattern obtained by TEM as described above or confirmed using an X-Ray Diffractometer (XRD).

The $Mg_{51}Zn_{20}$ phase is defined as a constituent phase which can be identified by a JCPDS card: PDF #00-008-0269, #00-065-4290, or a non-patent document "Journal of solid state chemistry 36, 225-233 (1981), Yamato et al." Furthermore, the $Mg_{32}(Zn, Al)_{49}$ phase is defined as a constituent phase which can be identified by JCPDS card: PDF #00-019-0029 or #00-039-0951.

The chemical composition of the aforementioned intermetallic compounds or metallic phases can be quantitatively analyzed in a simple manner through TEM-EDX or EPMA. From the result of the quantitative analysis, whether each grain in a constituent phase is one of the quasicrystal phase, the $Mg_{51}Zn_{20}$ phase, the $Mg_{32}(Zn, Al)_{49}$ phase, the $Mg_4Zn_7$ phase, the $MgZn_2$ phase, the Mg phase, and the Zn phase or other phases can be identified in a simple manner.

The non-patent document "Journal of solid state chemistry 36, 225-233 (1981), Yamato et al." reports that $Mg_{51}Zn_{20}$ has a unit lattice close to a cubical crystal and has an atomic structure in which an icosahedron is formed in the unit lattice. The unit lattice of $Mg_{51}Zn_{20}$ is different from the icosahedron structure of the quasicrystal, and accordingly, in a strict sense, $Mg_{51}Zn_{20}$ s a phase different from the quasicrystal. However, it is considered that, because the crystal structure of $Mg_{51}Zn_{20}$ is similar to that of the quasicrystal, the $Mg_{51}Zn_{20}$ phase may affect the formation of the quasicrystal phase. $Mg_{32}(Zn, Al)_{49}$ is also called a Frank-Kasper phase and has a complicated atomic configuration (rhombic triacontahedron). Presumably, the $Mg_{32}(Zn, Al)_{49}$ phase may also be closely related to the formation of the quasicrystal phase similarly to the $Mg_{51}Zn_{20}$ phase.

The MgZn phase, the $MgZn_2$ phase, and the Zn phase included in the fine domain 2b in some cases have a chemical composition and a crystal structure that are greatly different from those of the quasicrystal phase. It is possible to make a conclusion that the MgZn phase, the $MgZn_2$ phase, and the Zn phase sufficiently cause elemental diffusion at a high temperature at the time of producing the plated steel sheet and hence stable phases are formed. From the viewpoint of improving corrosion resistance, it is preferable that a fraction of these stable phases is low.

The corrosion resistance of the constituent phases of the plated-metal-layer tends to be excellent in order of the quasicrystal phase>the $Mg_{32}(Zn, Al)_{49}$ phase>the $Mg_{51}Zn_{20}$ phase>the MgZn phase=the $MgZn_2$ phase>the Zn phase>>the Mg phase. In a case where these constituent phase are mixed together, increasing a fraction of the phase having high corrosion resistance favors the corrosion resistance of the plated-metal-layer. That is, in the plated steel sheet according to the embodiment, it is preferable that the area fraction of the quasicrystal phase is the highest among all of the constituent phases included in the metallographic structure of the plated-metal-layer. In other words, it is preferable that the quasicrystal phase is a main phase in the metallographic structure of the plated-metal-layer of the plated steel sheet according to the embodiment.

Here, in a case where various metallic phases or intermetallic compounds coexist in the plated-metal-layer, due to the formation of a coupling cell, the corrosion resistance further deteriorates than in a case where a single phase exists in the plated-metal-layer. Generally, if a plurality of phases is mixed into the plated-metal-layer, portions that are noble and less noble in terms of electric energy formed in the plated-metal-layer, and hence a coupling cell reaction occurs. The less noble portions corrode first, and hence the corrosion resistance deteriorates. Here, in the plated steel sheet according to the embodiment, in a case where the plated-metal-layer has the aforementioned biomodal structure, the deterioration of corrosion resistance resulting from the formation of the coupling cell is practically not observed and negligible, and rather, the corrosion resistance is markedly improved because the plated-metal-layer contains the quasicrystal.

Generally, an intermetallic compound has poor plastic deformation properties. If a fraction of a coarse intermetallic compound having poor plastic workability is reduced, only fine cracks occur in the plated-metal-layer at the time of processing the plated steel sheet. Accordingly, an exposed area of the steel sheet (base metal) is reduced, and the corrosion resistance is preferably improved. Furthermore, because the peeling of the plated-metal-layer is inhibited, it takes a long time until red rust occurs in the processed portion, and hence the corrosion resistance is preferably improved.

The quasicrystal phase is a non-equilibrium phase and thermally unstable. Therefore, if exposed to a high temperature environment with a temperature of around 250° C. to 330° C. for a long period of time, the quasicrystal phase undergoes phase decomposition, and hence the Mg phase having poor corrosion resistance is formed in addition to the $Mg_{51}Zn_{20}$ phase in some cases. Consequently, the corrosion resistance as the overall plated steel sheet is likely to deteriorate. Care is required in a case where the plated steel sheet is used in a high temperature environment.

Figure 4:
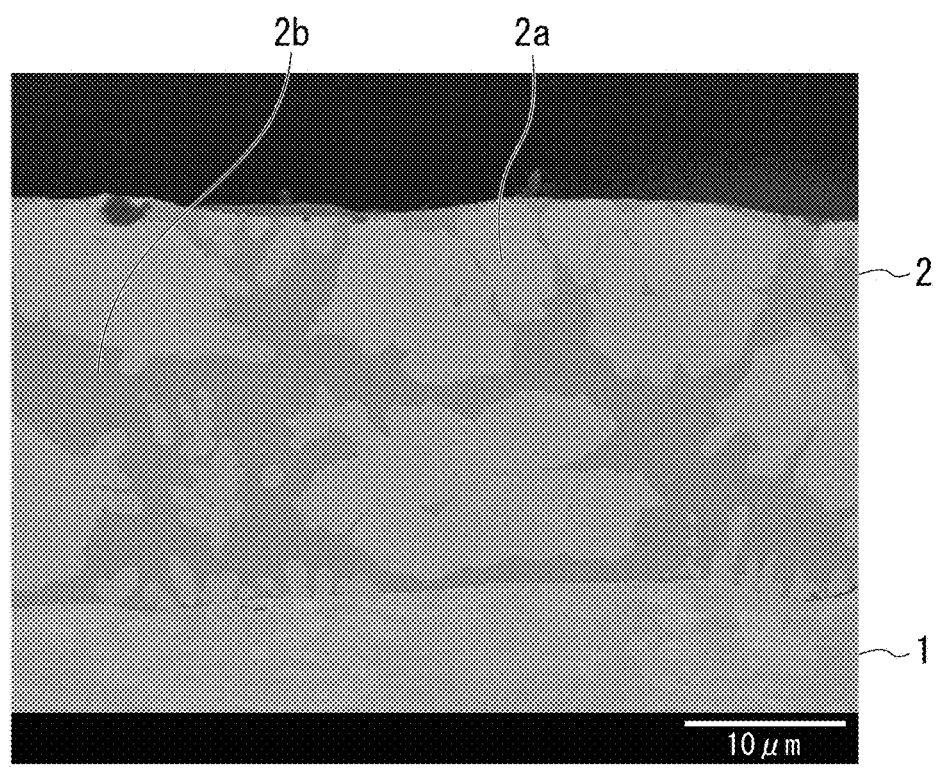
FIG. 4 is a SEM micrograph of the plated steel sheet according to the embodiment and a metallographic micrograph obtained by observing the cross section whose cutting direction is parallel to the thickness direction of the plated steel sheet.

In the plated-metal-layer of the plated steel sheet according to the embodiment, an area fraction of the coarse domain in the metallographic structure of the entirety of the plated-metal-layer (area of coarse domain/area of plated-metal-layer) is preferably 5% to 80%, and an area fraction of the fine domain in the metallographic structure of the entirety of the plated-metal-layer (area of fine domain/area of plated-metal-layer) is preferably 20% to 95%. If the above conditions are satisfied, the corrosion resistance of the plated-metal-layer is further improved. FIG. 4 is a SEM micrograph of the plated steel sheet according to the embodiment, which is a metallographic micrograph obtained by observing the cross section whose cutting direction is parallel to the thickness direction of the plated steel sheet. FIG. 4 shows a plated-metal-layer in which an area fraction of the coarse domain is 63% and an area fraction of the fine domain is 37%. In was confirmed that the corrosion resistance of the plated-metal-layer is further improved in the plated steel sheet.

In a case where further improvement of the corrosion resistance of the plated-metal-layer is prioritized, the lower limit of the area fraction of the coarse domain may be set to be 10%, 15%, or 25%, and the upper limit of the area fraction of the fine domain may be set to be 90%, 85%, or 75%. In contrast, in a case where the inhibition of peeling at the time of bending is prioritized more than the corrosion resistance of the plated-metal-layer, the upper limit of the area fraction of the coarse domain may be set to be 50%, 35%, or 25%, and the lower limit of the area fraction of the fine domain may be set to be 50%, 65%, or 75%.

In the plated-metal-layer of the plated steel sheet according to the embodiment, an area fraction of the quasicrystal phase included in the coarse domain is preferably 80% to less than 100% as compared with the coarse domain (area of quasicrystal phase in coarse domain/area of coarse domain), and an area fraction in total of the $Mg_{51}Zn_{20}$ phase, the $Mg_{32}(Zn, Al)_{49}$ phase, the MgZn phase, the $MgZn_2$ phase, and the Zn phase included in the fine domain is preferably 80% to less than 100% as compared with the fine domain (total area of respective constituent phases in fine domain/area of fine domain). When the above conditions are satisfied, the corrosion resistance of the plated-metal-layer is further improved. Presumably, there may be a certain correlation between the fraction of the quasicrystal phase or the size of the coarse domain in the plating structure (plated-metal-layer) and the electrochemical properties. For example, as the fraction of the quasicrystal phase increases, a corrosion potential of the plated-metal-layer shifts to a noble potential (−1.0 V to −0.8 V vs. Ag/AgCl reference electrode) from a less noble potential (−1.3 V to −1.1 V vs. Ag/AgCl reference electrode), a cathode current value and an anode current value at the corrosion potential decrease, and hence a corrosion current density decreases. Presumably, this is because the quasicrystal phase has a unique potential or properties close to those of a passive state. It is considered that, as a result, the corrosion resistance of the plated-metal-layer is improved. The balance of the coarse domain and the balance of the fine domain include an intermetallic compound or a metallic phase other than the above in some cases, but even in these cases, the effects of the embodiment are not impaired. The potential of the coarse domain can be measured using, for example, a scanning Kelvin probe method, and the mapping of the structure can be measured. Generally, as the fraction of the quasicrystal and $Mg_{32}(Zn, Al)_{49}$ increases, the potential is closer to a value of around −0.8 V which is noble. In contrast, $Mg_{51}Zn_{20}$ has a potential of about −1.1 V. The potential or the corrosion current density varies with the amount of these phases and is generally within a range of −1.3 V to −0.8 V. Usually, the closer the potential to −0.8 V, the further the corrosion current density tends to be reduced.

It is preferable that the metallographic structure f the plated-metal-layer in the plated steel sheet according to the embodiment does not contain the Mg phase. The Mg phase contained in the plated-metal-layer deteriorates the corrosion resistance in both the coarse domain and the fine domain. Therefore, it is preferable to suppress the precipitation of the Mg phase as much as possible. Whether or not the Mg phase exists may be determined and confirmed through TEM-EDX, SEM-EDX, XRD, or the like. For example, in a case where a diffraction intensity from a (110) surface of the Mg phase is equal to or less than 1% of a diffraction intensity at a diffraction angle (2θ=36.496°) of the $Mg_{51}Zn_{20}$ phase (or $Mg_7Zn_3$ phase) in an XRD diffraction pattern, it can be said that the metallographic structure of the plated-metal-layer does not contain the Mg phase. Likewise, in a case where a number fraction of grains of the Mg phase is equal to or less than 3% when 100 or more grains are randomly sampled ma TEM diffraction pattern, it can be said that the metallographic structure of the plated-metal-layer does not contain the Mg phase. The number fraction of grams of the Mg phase is more preferably less than 2%, and most preferably less than 1%.

In the plated-metal-layer, the Mg phase is easily formed as a primary phase at a temperature immediately below the melting point. Whether the Mg phase will be formed as a primary phase generally depends on the chemical composition of the plated-metal-layer and the production conditions. In a case where the Mg content is higher than in a eutectic composition (Mg 72%-Zn 28%) of an equilibrium state diagram of a binary Mg—Zn system, the Mg phase is likely to be crystallized as a primary phase. In contrast, in a case where the Mg content is lower than the above, in principle, the Mg phase is less likely to be crystallized as a primary phase. The production process according to the embodiment is a process for forming a quasicrystal as a primary phase. Therefore, if the Mg content is higher than in the eutectic composition, it is extremely difficult for the Mg phase to be formed, and even if the formation of the Mg phase could be confirmed, the Mg phase is less likely to present as a main phase. The grain of the Mg phase is present at a number fraction of about up to 3%. The present inventors confirmed that when the Zn content is 28.5% or greater, a proportion of the grain of the Mg phase in grains contained in the metallographic structure of the plated-metal-layer tends to be less than 2% in terms of a number fraction. Furthermore, when the Zn content is 33% or greater, a proportion of the grain of the Mg phase in the grains contained in the metallographic structure of the plated-metal-layer tends to be less than 1% in terms of a number fraction. If the Mg phase is present in the plated-metal-layer, the surface of the plated-metal-layer turns black with the passage of time particularly in a humid environment, and hence the appearance of the plating becomes defective in some cases. In this respect, it is preferable to avoid mixing of the Mg phase into the surface layer of the plated-metal-layer in particular. By storing the plated steel sheet in a thermohygrostat tank for a certain period of time, the occurrence of appearance defectiveness, a phenomenon in which the surface of the plated-metal-layer turns black, can be determined.

In the plated-metal-layer of the plated steel sheet according to the embodiment, an area fraction of the quasicrystal phase include in the coarse domain is preferably 80% to less than 100% as compared with the coarse domain (area of quasicrystal phase in coarse domain/area of coarse domain), and an area fraction of the $Mg_{51}Zn_{20}$ phase included in the fine domain is preferably 80% to less than 100% as compared with the fine domain (area of $Mg_{51}Zn_{20}$ phase in fine domain/area of fine domain). When the above conditions are satisfied, a fraction of the $Mg_{51}Zn_{20}$ phase having excellent corrosion resistance is increased, and hence the corrosion resistance of the plated-metal-layer is further improved.

Regarding the plated-metal-layer of the plated steel sheet according to the embodiment, when a cross section whose cutting direction is parallel to a thickness direction of the plated-metal-layer is viewed and when a thickness of the plated-metal-layer in the thickness direction is regarded as D in a unit of μm, an area from a surface of the plated-metal-layer toward the steel sheet in the thickness direction to 0.3×D is regarded as a surface area of the plated-metal-layer, and an area from an interface between the steel sheet and the plated-metal-layer toward the plated-metal-layer in the thickness direction to 0.3×D is regarded as a deep area of the plated-metal-layer, an area fraction of the coarse domain in the surface area of the plated-metal-layer (area of coarse domain in surface area of plated-metal-layer/area of surface area of plated-metal-layer) is preferably 10% to less than 100% and an area fraction of the coarse domain in the deep area of the plated-metal-layer (area of coarse domain in deep area of plated-metal-layer/area of deep area of plated-metal-layer) is preferably 10% to less than 100%, Furthermore, when an area except for the surface area and the deep area in the plated-metal-layer is regarded as a center area of the plated-metal-layer, an a fraction of the fine domain in the center area of the plated-metal-layer (area of fine domain in center area of plated-metal-layer, and an area of center area of plated-metal-layer) is preferably 50% to less than 100%. If the above conditions are satisfied, the constituent phases contained in the plated-metal-layer are preferably arranged, and hence the corrosion resistance of the plated-metal-layer is further improved. In addition, the adherence of the plated-metal-layer tends to be improved. In a case where the grains in the coarse domain are present in a position that extends across the surface area and deep area of the plated-metal-layer, or in a case where the grains in the coarse domain are present in a position that extends across the deep area and center area of the plated-metal-layer, the aforementioned area fraction may be calculated using the area of the grains included in the surface area or deep area of the plated-metal-layer. Likewise, in a case where the grains in the fine domain are present in a position that extends across the surface area and deep area of the plated-metal-layer, or in a case where the grains in the fine domain are present in a position that extends across the deep area and center area of the plated-metal-layer, the aforementioned area fraction may be calculated using the area of grains included in the center area of the plated-metal-layer.

The plated steel sheet according to the embodiment preferably further has a Fe—Al containing alloy layer. The Fe—Al containing alloy layer is preferably arranged between the steel sheet and the plated-metal-layer and preferably contains at least one or more kinds of compound between $Fe_5Al_2$ and $Al_{3.2}Fe$, and a thickness of the Fe—Al containing alloy layer in a thickness direction thereof is preferably 10 nm to 1,000 nm. If the Fe—Al containing alloy layer satisfying the above conditions is arranged in an interface between the steel sheet and the plated-metal-layer, peeling of the plated-metal-layer is preferably inhibited. Furthermore, if the Fe—Al containing alloy layer is formed, the adherence of the plated-metal-layer tends to be improved.

The thickness D of the plated-metal-layer of the plated steel sheet according to the embodiment is not particularly limited, and may be controlled as necessary. Generally, the thickness D is set to be 35 μm smaller in many cases.

The metallographic structure of the plated-metal-layer is observed as below. A sample is collected by cutting the plated steel sheet such that the cross section whose cutting direction is parallel to the thickness direction of the plated steel sheet is observed. The cross section is polished or processed by using a Cross Section Polisher (CP). In a case where the cross section is polished, the cross section is etched with nital. The cross section is then observed using an optical microscope or SEM, and a metallographic micrograph thereof is captured. If the cross section observed with SEM is a COMPO image as shown in FIG. 1, due to a difference in a chemical composition between the coarse domain and the fine domain, a sharp contrast is made, and hence the boundary between the coarse domain and the fine domain can be easily discerned. The chemical composition of the constituent phases can be measured by analysis based on EDX or EPMA. From the result of the chemical analysis, the constituent phases can be simply identified. The metallographic micrograph is binarized through, for example, image analysis; an area ratio of a white portion or black portion of the plated-metal-layer is measured; and in this way, area fractions of the constituent phases can be measured. Furthermore, from the determined area of each coarse domain, an average equivalent circle diameter can be determined by calculation. Alternatively, by observing the metallographic structure of the plated-metal-layer by an Electron Back Scattering Diffraction Pattern (EBSD) method, the constituent phases may be identified, and the area fraction and the average equivalent circle diameter of the constituent phases may be determined.

In order to more specifically identify the constituent phases, the metallographic structure of the plated-metal-layer is observed as below. A thin sample is collected by cutting the plated steel sheet such that the cross section whose cutting direction is parallel to the thickness direction of the plated steel sheet is observed. The thin sample is subjected to ion milling. Alternatively, a thin sample is collected by processing the plated steel sheet with a Focused Ion Beam (FIB) such that the cross section whose cutting direction is parallel to the thickness direction of the plated steel sheet is observed. These thin samples are observed with TEM, and the metallographic micrograph thereof is captured. The constituent phases can be accurately identified using an electron diffraction pattern. By performing image analysis on the metallographic micrograph, the area fractions and the average equivalent circle diameters of the constituent phases can be determined.

From XRD diffraction peaks of the plated-metal-layer, the existence of the constituent phases can be confirmed in the simplest way, although how the constituent phases exist in a space cannot be ascertained in this way. Here, because the diffraction peak positions of the quasicrystal phase, $Mg_{51}Zn_{20}$, and $Mg_{32}(Zn, Al)_{49}$ overlap each other, the existence of theses phases can be confirmed, but it is difficult to distinguish them from each other.

The steel sheet as a base metal of the plated steel sheet according to the embodiment is not particularly limited. As the steel sheet, it is possible to use Al killed steel, ultra low carbon steel, high carbon steel, various high tensile strength steel, steel containing Ni or Cr, and the like.

Next, a method of producing a plated steel sheet according to the embodiment will be described.

The method of producing a plated steel sheet according to the embodiment includes a hot-dip-plating process of dipping the steel sheet into a hot-dip-plating bath having an adjusted composition in order to form a plated-metal-layer on a surface of the steel sheet; a first cooling process of cooling the steel sheet after the hot-dip-plating process under conditions such that an average cooling rate of the plated-metal-layer is 15° C./sec to 50° C./sec in a temperature range where a temperature of the plated-metal-layer is from $T_{melt}$ to $T_{solid\text{-}liquid}$ in a unit of ° C., when $T_{melt}$ is regarded as a liquidus temperature of the plated-metal-layer and when $T_{solid\text{-}liquid}$ is a temperature range where the plated-metal-layer is in a coexistence state of a solid phase and a liquid phase and where a volume ratio of the solid phase to the plated-metal-layer (volume of solid phase/volume of plated-metal-layer) is 0.3 to 0.8; and a second cooling process of cooling the steel sheet after the first cooling process under conditions such that an average cooling rate of the plated-metal-layer is 100° C./sec to 3000° C./sec in a temperature range where a temperature of the plated-metal-layer is from a temperature at finishing the first cooling process to 250° C.

Figure 5:
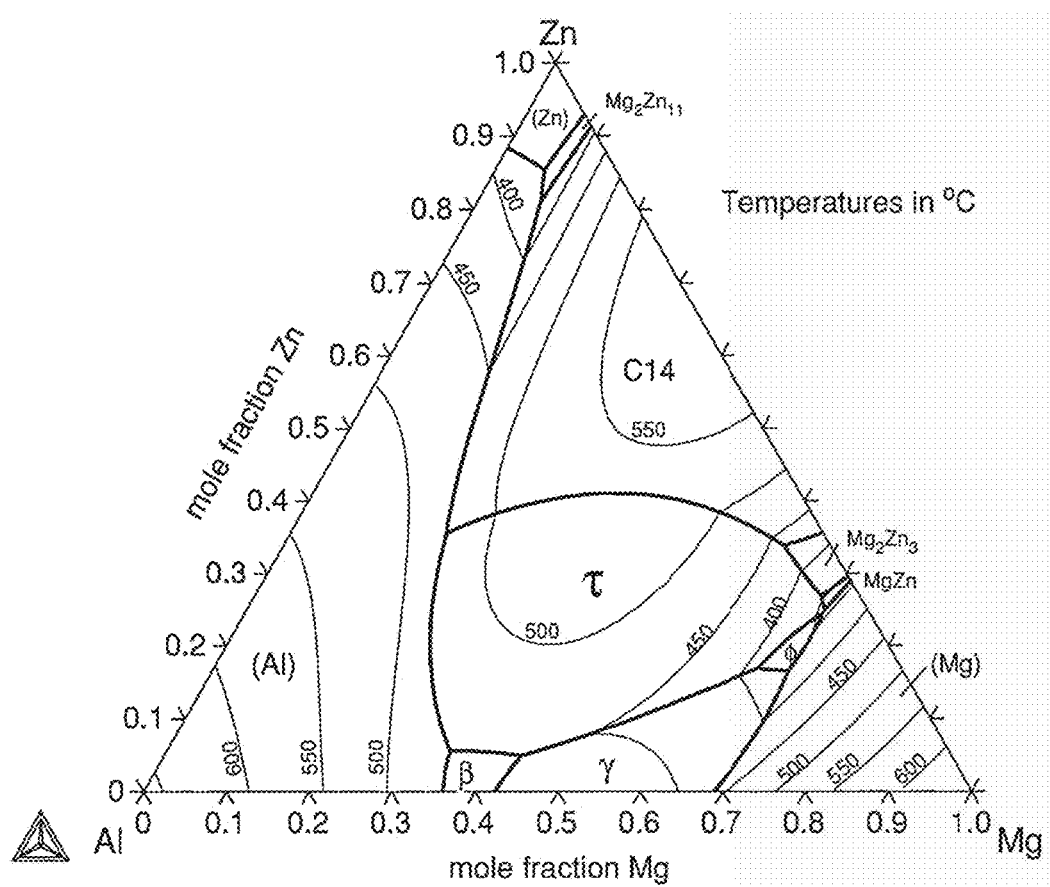
FIG. 5 is a liquidus surface phase diagram of a ternary Zn—Al—Mg system.

A value of $T_{melt}$ which is a liquidus temperature of the plated-metal-layer can be determined using, for example, liquidus temperatures (liquidus surface temperatures) disclosed in a non-patent document (Liang, P., Tarfa, T., Robinson, J. A., Wagner, S., Ochin, P., Harmelin, M. G., Seifert, H. J., Lukas, H. L., Aldinger, F., "Experimental Investigation and Thermodynamic Calculation of the Al—Mg—Zn system", Thermochim. Acta, 314, 87-110 (1998)) written by Liang et al, as shown in FIG. 5. In this way, a value of $T_{melt}$ substantially can be estimated by using the fraction of Zn, Al, and Mg contained in the plated-metal-layer.

A value of $T_{solid\text{-}liquid}$ can be accurately determined from an alloy phase diagram. Specifically, by using the chemical composition of the plated-metal-layer and the corresponding alloy phase diagram, a volume ratio (volume fraction) between a plurality of coexisting phases can be determined based on lever rule. That is, by using the alloy phase diagram, a temperature at which a volume ratio of a solid phase becomes 0.3 and a temperature at which a volume ratio of the solid phase becomes 0.8 may be determined. In the method of producing a plated steel sheet according to the embodiment, the value of $T_{solid\text{-}liquid}$ may be determined using the alloy phase diagram. At this time, as the alloy phase diagram, a calculated phase diagram based on a thermodynamic calculation system may be used. Here, because the alloy phase diagram merely shows an equilibrium phase, the ratio between the constituent phases determined from the alloy phase diagram does not necessarily totally agree with an actual ratio between the constituent phases in the plated-metal-layer which is being cooled. Regarding $T_{solid\text{-}liquid}$ as a temperature range where the plated-metal-layer that is being cooled is in a coexistence state of a solid phase and a liquid phase and a volume ratio of the solid phase to the plated-metal-layer is 03 to 0.8, the inventors of the present invention conducted intensive investigation. As a result, they found that, by the following expression, $\{345+0.35\times(T_{melt}-345)\}-5 \leq T_{solid\text{-}liquid} \leq \{345+0.35\times(T_{melt}-345)\}+5$, $T_{solid\text{-}liquid}$ can be empirically determined. Therefore, in the method of producing a plated steel sheet according to the embodiment, a value of $T_{solid\text{-}liquid}$ may be determined by the above expression.

In the hot-dip-plating process, the chemical composition of the plating bath is adjusted such that the chemical composition, by atomic %, of the plated-metal-layer formed on the surface of the steel sheet contains Zn: 20% to 60%, Al: 0.3% to 15%, Ca: 0% to 3.5%, Y: 0% to 3.5%, La: 0% to 3.5%, Ce: 0% to 3.5%, Si: 0% to 0.5%, Ti: 0% to 0.5%, Cr: 0% to 0.5%, Fe: 0% to 2%, Co: 0% to 0.5%, Ni: 0% to 0.5%, V: 0% to 0.5%, Nb: 0% to 0.5%, Cu: 0% to 0.5%, Sn: 0% to 0.5%, Mn: 0% to 0.2%, Sr: 0% to 0.5%, Sb: 0% to 0.5%, and Pb: 0% to 0.5%, the balance consists of Mg and impurities, and a Zn content and an Al content expressed in atomic % in the chemical composition of the plated-metal-layer satisfy 25%≤Zn+Al.

In the embodiment, the hot-dip-plating process is selected for example. However, the method of forming the plated-metal-layer on the surface of the steel sheet is not limited as long as the plated-metal-layer having the aforementioned chemical composition can be formed on the surface of the steel sheet. In addition to the hot-dip-plating, spraying, sputtering, ion plating, evaporating, or electroplating may be applied.

Immediately after being pulled up out of the plating bath, the plated-metal-layer formed on the surface of the steel sheet by the hot-dip-plating process is in a molten state (liquid phase). By cooling the plated-metal-layer in the molten state by a first cooling process and a second cooling process unique to the embodiment, the plated-metal-layer can be controlled to have the aforementioned metallographic structure containing a quasicrystal.

In a case where a plated-metal-layer forming method other than the hot-dip-plating process is selected, by reheating the plated steel sheet, on which the plated-metal-layer is formed, by using a heating furnace so as to melt only the plated-metal-layer, and then cooling the plated-metal-layer by the first cooling process and the second cooling process unique to the embodiment, the plated-metal-layer can be controlled to have the aforementioned metallographic structure containing a quasicrystal.

A melting point of the plated-metal-layer containing Mg and Zn as main components is totally different from a melting point of the steel sheet as a base metal. Therefore, those skilled in the related art can easily determine an optimized temperature at which only the plated-metal-layer is melted and an optimized melting time.

For example, if being heated to 700° C., the plated-metal-layer is completely melted while the steel sheet as a base metal is not melted. Particularly, rapid heating in a high-temperature atmosphere is preferable because the plated-metal-layer of the plated steel sheet contacting the atmosphere is preferentially heated.

In the hot-dip-plating process, an amount of an oxide in the plating bath is preferably 0 g/l to 1 g/l; an oxygen concentration of the atmosphere at the time of dipping the steel sheet is preferably 0 ppm to 100 ppm in a volume ratio; a plating tub holding the plating bath is preferably a steel tub; a dross in the plating bath is preferably removed by a metal pump; $T_{bath}$ which is a temperature of the plating bath is preferably 10° C. to 200° C. higher than $T_{melt}$; and a time to dip the steel sheet into the plating bath is preferably 1 sec. to 10 sec.

When the amount, of the oxide in the plating bath is 1 g/l or less, a quasicrystal is preferably formed in the metallographic structure of the plated-metal-layer. The amount of the oxide in the plating bath is more preferably 0.1 g/l or less. When the oxygen concentration is 100 ppm or less in a volume ratio, oxidation of the plating bath can be preferably inhibited. The oxygen concentration is more preferably 50 ppm or less in a volume ratio. When the plating tub is a steel tub, an amount of inclusions in the plating bath is reduced, and hence a quasicrystal is preferably formed in the metallographic structure of the plated-metal-layer. Furthermore, in a case where the plating tube is a steel tub, wearing of the inner walls of the plating tub can be further inhibited than in a case where the plating bath is a ceramic bath. In a case where the dross in the plating bath is removed by a metal pump, the amount of inclusions in the plating bath is reduced, and hence a quasicrystal is preferably formed in the metallographic structure of the plated-metal-layer. When $T_{bath}$ which is a temperature of the plating bath is 10° C. to 100° C. higher than $T_{melt}$, the plated-metal-layer is preferably formed on the surface of the steel sheet, and a Fe—Al containing alloy layer is formed between the steel sheet and the plated-metal-layer. $T_{bath}$ which is a temperature of the plating bath is more preferably 30° C. to 50° C. higher than $T_{melt}$. When the time to dip the steel sheet into the plating bath is 1 sec to 10 sec, the plated-metal-layer is preferably formed on the surface at the steel sheet, and a Fe—Al containing alloy layer is formed between the steel sheet and the plated-metal-layer. The time to dip the steel sheet into the plating bath is more preferably 2 sec to 4 sec.

In the first cooling process, it is important to control the average cooling rate of the plated-metal-layer at the time when the temperature of the plated-metal-layer reaches $T_{solid-liquid}$, which is a temperature range where a volume ratio of a solid phase to the plated-metal-layer (liquid phase+solid phase) is 0.3 to 0.8, from $T_{melt}$ as a liquidus temperature of the plated-metal-layer. In the first cooling process, the steel sheet on which the plated-metal-layer is formed is cooled by controlling the average cooling rate within a range of 15° C./sec to 50° C./sec.

By the cooling performed in the first cooling process, the crystallization of a quasicrystal is crystallized as a primary phase in the plated-metal-layer that is in a molten state (liquid phase) before the beginning of cooling. It is preferable that the crystallized quasicrystal slowly grows at a cooling rate that is within a controlled range and finally becomes a quasicrystal phase having an average equivalent circle diameter of larger than 1 μm included in the coarse domain.

If the average cooling rate in the first cooling process is less than 15° C./sec, a quasicrystal is not easily formed because the average cooling rate does not reach a cooling rate of a quasicrystal phase that is originally formed as a non-equilibrium phase. In contrast, if the average cooling rate in the first cooling process is higher than 50° C./sec, a quasicrystal phase having an average equivalent circle diameter of less than 1 μm are formed too much, and hence the average equivalent circle diameter of the quasicrystal phase does not become larger than 1 μm. Furthermore, in some cases, the coarse domain mainly including the quasicrystal phase is not formed, and the aforementioned biomodal structure is not established. In a case where the cooling rate is extremely high, a constituent phase such as an amorphous phase is formed. Therefore, the upper limit of the average cooling rate in the first cooling process is set to be 50° C./sec.

In the first cooling process, in a case where the average cooling rate of the plated-metal-layer is controlled to satisfy the aforementioned conditions from a temperature lower than $T_{melt}$, the primary phase crystallized in the plated-metal-layer cannot become a quasicrystal phase. An Al phase, a Zn phase, a Mg phase, and the like that are constituent phases other than a quasicrystal may be crystallized as a primary phase, or an incomplete quasicrystal that does not grow into a predetermined size may be crystallized. In these cases, the area fraction of the coarse domain cannot be preferably controlled. Furthermore, in a case where the control of the average cooling rate to satisfy the aforementioned conditions is stopped at a temperature higher than $T_{solid-liquid}$, or in a case where the average cooling rate is controlled to satisfy the aforementioned conditions down to a temperature lower than $T_{solid-liquid}$. The average equivalent circle diameter and the area fraction of the quasicrystal phase cannot be preferably controlled. In addition, in some cases, the metallographic structure cannot be controlled to become a biomodal structure consisting of the coarse domain and the fine domain described above. Particularly, in some cases, a specific phase grows within the fine domain, and hence the aforementioned biomodal structure is not established. In a case where the cooling of the first cooling process is performed based on a temperature at which a volume ratio of a solid phase to the plated-metal-layer does not become 0.3 to 0.8, the average equivalent circle diameter and the area fraction of the quasicrystal phase cannot be preferably controlled. Moreover, in some cases, the metallographic structure cannot be controlled to become a biomodal structure consisting of the coarse domain and the fine domain described above. As described so far, in order for the crystallized quasicrystal to stably grow without disappearing, the specific cooling conditions described above are required.

In the second cooling process, it is important to control the average cooling rate of the plated-metal-layer at the time when the temperature of the plated-metal-layer reaches 250° C. from a temperature at a point in time when the first cooling process ends, that is from a temperature at finishing the first cooling process that is within $T_{solid-liquid}$. The steel sheet having undergone the first cooling process is cooled by controlling the average cooling rate to become 100° C./sec to 3,000° C./sec. The lower limit of the temperature range is preferably 200° C., more preferably 150° C., and most preferably 100° C.

By the cooling in the second cooling process, in the plated-metal-layer in which a quasicrystal is crystallized as a primary phase and a solid phase and a liquid phase is in a coexistence state, at least one kind of phase among a $Mg_{51}Zn_{20}$ phase, a $Mg_{32}(Zn, Al)_{49}$ phase, a MgZn phase, a $MgZn_2$ phase, and a Zn phase is crystallized. It is preferable that the crystallized $Mg_{51}Zn_{20}$ phase, $Mg_{32}(Zn, Al)_{49}$ phase, MgZn phase, $MgZn_2$ phase, and Zn phase finally become constituent phases included in the fine domain.

In the second cooling process, in a case where the average cooling rate is controlled to satisfy the aforementioned conditions from a temperature higher or lower than $T_{solid-liquid}$, the average equivalent circle diameter and the area fraction of the quasicrystal phase cannot be preferably controlled. Furthermore, in some cases, the metallographic structure cannot be controlled to become a biomodal structure consisting of the coarse domain and the fine domain described above. In addition, in a case where the control of the average cooling rate to satisfy the aforementioned conditions is stopped at a temperature higher than 250° C., the quasicrystal phase as a non-equilibrium phase, the $Mg_{51}Zn_{20}$ phase, and the $Mg_{32}(Zn, Al)_{49}$ phase undergo phase decomposition in some cases. Moreover, in some cases, the metallographic structure cannot be controlled to become a bimodal structure consisting of the coarse domain and the fine domain described above. In a case where the average, cooling rate in the second cooling process is less than 100° C./sec, the $Mg_{51}Zn_{20}$ phase, the $Mg_{32}(Zn, Al)_{49}$ phase, the MgZn phase, the $MgZn_2$ phase, or the Zn phase is not formed, or a metallographic structure containing an extremely large amount of Mg phase is established. In addition, the $Mg_{51}Zn_{20}$ phase, the $Mg_{32}(Zn, Al)_{49}$ phase, the MgZn phase, the $MgZn_2$ phase, or the Zn phase does not becomes the fine domain in some cases. In a case where the average cooling rate in the second cooling process is greater than 3,000° C./sec, a constituent phase such as an amorphous phase is formed, and hence be metallographic structure cannot be controlled to become the aforementioned biomodal structure in some cases.

As described above, $T_{melt}$ as a liquidus temperature of the plated-metal-layer may be determined from a liquidus surface phase diagram of a ternary Zn—Al—Mg system. $T_{solid-liquid}$ as a temperature range in which a volume ratio of a solid phase to the plated-metal-layer becomes 0.3 to 0.8 may be determined from the following expression, $\{345+0.35\times(T_{melt}-345)\}-5 \leq T_{solid-liquid} \{345+0.35\times(T_{melt}-345)\}+5$. Because the amount of solid phase explosively increases around the temperature range in which the volume ratio of a solid phase to the plated-metal-layer becomes 0.3 to 0.8, the cooling of the first cooling process is finished in the temperature range. By controlling the cooling at least within a range of ±5° C. based on $\{345+0.35\times(T_{melt}-345)\}$, the average equivalent circle diameter and the area fraction of the quasicrystal phase can be preferably controlled. In this way, in order to form the aforementioned plated-metal-layer, the temperature needs to be accurately controlled.

In a method for actually measuring a temperature of the plated-metal-layer at the time of producing the plated steel sheet according to the embodiment, a contact-type thermocouple (K-type) may be used. By mounting the contact-type thermocouple on an original sheet, an average temperature of the whole plated-metal-layer can be monitored all the time. If a pull-up rate and a thickness are mechanically controlled, and a preheating temperature of the steel sheet, a temperature of the hot-dip plating bath, and the like are standardized, it is possible to substantially accurately monitor a temperature of the whole plated-metal-layer at the point in time under the production conditions. Consequently, the cooling in the first cooling process and the second cooling process can be accurately controlled. A surface temperature of the plated-metal-layer may be measured using a noncontact-type radiation thermometer, although the noncontact-type thermometer is not as accurate as a contact-type.

A relationship between a surface temperature of the plated-metal-layer and an average temperature of the whole plated-metal-layer may be determined by cooling simulation for analyzing thermal conductivity. Specifically, based on each of the production conditions such as a preheating temperature of the steel sheet, a temperature of the hot-dip plating bath, a rate at which, the steel sheet is pulled up out of the plating bath, a thickness of the steel sheet, a thickness of the plated-metal-layer, an amount of heat exchanged between the plated-metal-layer and the production facilities, and an amount of heat radiated from the plated-metal-layer, a surface temperature of the plated-metal-layer and an average temperature of the whole plated-metal-layer may be determined, and a relationship between the surface temperature of the plated-metal-layer and the average temperature of the whole plated-metal-layer may be determined. As a result, by actually, measuring the surface temperature of the plated-metal-layer at the time of producing the plated steel sheet, the average temperature of the whole plated-metal-layer at the point in time under the production conditions can be inferred. Consequently, the cooling in the first cooling process and the second cooling process can be accurately controlled.

The cooling method in the first cooling process and the second cooling process is not particularly limited. As the cooling method, cooling using a rectified high-pressure gas, mist cooling, or submersion cooling may be performed. Here, in order to preferably control the surface condition of the plated-metal-layer or the formation of the quasicrystal, it is preferable to perform cooling using a rectified high-pressure gas. If $H_2$ or He is used, the cooling rate is increased.

As the hot-dip plating applied in the embodiment, all of the known plating methods such as a sendzimir method, a pre-plating method, a two-step plating method, and a flux method can be used. As pre-plating, displacement plating, electroplating, evaporating, and the like can be used.

In the method of producing a plated steel sheet according to the embodiment, steel used as a base metal of the plated steel sheet is not particularly limited. The aforementioned effects are not affected by the chemical composition of steel, and Al killed steel, ultra low carbon steel, high carbon steel, various high tensile strength steel, steel containing Ni or Cr, and the like can be used.

In the method of producing a plated steel sheet according to the embodiment, each of the processes such as a steel making process, a hot rolling process, a pickling process, and a cold rolling process that precede the hot-dip plating process is not particularly limited. That is, the production conditions of the steel sheet supplied in the hot-dip plating process or the material of the steel sheet is not particularly limited.

Here, the steel sheet supplied in the hot-dip plating process preferably has a temperature difference between a surface temperature and an internal temperature. Specifically, it is preferable that a surface temperature of the steel sheet immediately before being dipped into the plating bath is higher than an internal temperature thereof. For example, a surface temperature of the steel sheet immediately before being dipped into the plating bath is preferably 10° C. to 50° C. higher than a temperature of the center of the steel sheet in the thickness direction thereof. In this case, immediately after being pulled up out of the plating bath, the plated-metal-layer undergoes heat extraction due to the steel sheet, and accordingly, the plated-metal-layer can be preferably controlled to have the aforementioned metallographic structure containing a quasicrystal. A method for making a temperature difference between the surface temperature and the internal temperature in the steel sheet immediately before being dipped into the plating bath is not particularly limited. For example, the steel sheet immediately before being dipped into the plating bath may be rapidly heated in a high-temperature atmosphere such that only the surface temperature of the steel sheet is controlled to become a temperature preferable for performing hot-dip plating. In this case, because only the surface area of the steel sheet is heated preferentially, the steel sheet can be dipped into the plating bath in a state of having a temperature difference between the surface temperature and the internal temperature.

For evaluating the corrosion resistance of the plated-metal-layer, an exposure test is most preferable which makes it possible to evaluate the corrosion resistance of the plated-metal-layer in a real environment. By evaluating a corrosion loss of the plated-metal-layer for a predetermined period of time, whether the corrosion resistance is excellent or poor can be evaluated.

In a case where plated-metal-layers having high corrosion resistance are compared with each other in terms of corrosion resistance, t is preferable to perform a long-term corrosion resistance test. The corrosion resistance is evaluated based on the time taken for red rust to occur. Furthermore, at the time of evaluating the corrosion resistance, it is important to consider a time period during which the steel sheet is under protection.

In order to evaluate the corrosion resistance in a simpler way, it is possible to use a combined cycle corrosion test or an accelerated corrosion test such as a salt spray test. By evaluating a corrosion loss or a period of time during which the red rust resistance lasts, whether the corrosion resistance is excellent or poor can be determined. In a case where plated-metal-layers having high corrosion resistance are compared with each other in terms of corrosion resistance, it is preferable to use a combined cycle corrosion test using a high-concentration aqueous NaCl solution with a concentration of around 5%. If a low-concentration (1% or less) aqueous NaCl solution is used, it is difficult to determine whether the corrosion resistance is excellent or poor.

The plated-metal-layer may also be subjected to conversion coating using an organic or inorganic material. The plated-metal-layer according to the embodiment contains Zn in an amount of equal to or greater than a certain level. Therefore, the plated-metal-layer according to the embodiment can be subjected to the same conversion coating as performed on a Zn group-plated steel sheet. The same will be applied to painting performed on a film having undergone conversion coating. Furthermore, the plated-metal-layer according to the embodiment can also be used as a base sheet of a laminated steel sheet.

It is considered that the plated steel sheet according to the embodiment can be used particularly in places in a severely corrosive environment. The plated steel sheet according to the embodiment can be used as a substitute for various plated steel sheets used in the fields of building materials, automobiles, consumer electronics, energy, and the like.

Example 1

Next, effects of an aspect of the present invention will be specifically described based on examples. The conditions in the examples are merely an example adopted for checking a possibility of embodying the present invention and effects thereof, and the present invention is not limited to the example conditions. As long as the object of the present invention is achieved, the present invention can adopt various conditions without departing from the gist of the present invention.

Through a hot-dip plating process, a first cooling process, and a second cooling process under the production conditions shown in Tables 1 to 5, a plated steel sheet containing a quasicrystal was produced. A plating bath was obtained by dissolving a predetermined amount of pure metal ingot. The plating bath was covered with a sealing box and then purged with an Ar gas such that an oxygen concentration thereof was controlled to reach a predetermined level.

As a base sheet for plating (steel sheet as a base metal of the plated steel sheet), a hot rolled steel sheet having a thickness of 0.8 mm (carbon content: 0.2% by mass) was used. The steel sheet was cut in 100 mm×200 mm. For hot-dip plating, a batch-type hot-dip plating tester was used. During production, a temperature of a center area of the plated steel sheet was monitored.

Before the steel sheet was dipped into the plating bath, the surface of the sheet heated to 800° C. was reduced using a $N_2$-5% $H_2$ gas in a furnace in which an oxygen concentration was controlled. The steel sheet was air-cooled using a $N_2$ gas until a surface temperature of the steel sheet reached a temperature which is 20° C. higher than a temperature of the plating bath, and the steel sheet was dipped into the plating bath for a predetermined time. After being dipped into the plating bath, the steel sheet was pulled up at a pull-up rate of 100 mm/sec. When the steel sheet was pulled up, a rectified high-pressure $N_2$ gas or a mixed gas of $H_2$ and $N_2$ was blown to the steel sheet from an outlet that was a parallel slit, thereby controlling an adhered amount (thickness of a plated-metal-layer) and a cooling rate.

20 (C direction: transverse direction) mm×15 (L direction: rolling direction) mm samples were collected from 10 random sites in the prepared plated steel sheet. By dipping the samples into a 10% aqueous HCl solution for 1 second, an oxide film was removed. A metallographic structure of a cross section (whose cutting direction was parallel to a thickness direction of the plated steel sheet) of each sample was observed with SEM, an equivalent circle diameter or an area fraction of each constituent phase (each grain) was measured, and an average thereof was calculated. The equivalent circle diameter or the area fraction of each constituent phase was determined through image analysis. A chemical composition of each constituent phase was measured through analysis using EPMA.

The metallographic structures of three random samples out of the ten samples were observed with an optical microscope (1,000× magnification), and a Vickers indentation was left at a target site. Base on the Vickers indentation, a 8 mm×8 mm sample was cut off. From each sample, a sample for TEM observation was prepared by cryo-ion milling.

By analyzing an electron diffraction pattern of a main grain observed with TEM, the constituent phase (a quasicrystal, $MgZn_{20}$, $Mg_{32}(Zn, Al)_{49}$, MgZn, Zn, or the like) contained in the metallographic structure was identified. Furthermore, an equivalent circle diameter or an area fraction of each constituent phase was determined through image analysis, and a chemical composition of each constituent phase was measured through analysis using EDX as necessary. Whether or not the Mg phase exists was determined and checked by XRD. In a case where diffraction intensity of the Mg phase in the XRD diffraction pattern was smaller than a prescribed value, it was determined that the metallographic structure of the plated-metal-layer does not contain the Mg phase.

The corrosion resistance, sacrificial protection, antiglare effect, and appearance of the plated steel sheet and the adherence of the plated-metal-layer ere evaluated. As corrosion resistance, a corrosion loss, the occurrence of red rust, the occurrence of white rust, and the occurrence of red rust in a processed portion were evaluated.

The corrosion lost was evaluated by a Combined cycle Corrosion Test (CCT) based on a JASO (M609-91) cycle. Specifically, for evaluating the corrosion loss, a 50 mm (C direction)×100 mm (L direction) sample was cut off from the prepared plated steel sheet and subjected to the combined cycle corrosion test. The combined cycle corrosion test (CCT) was performed using a 0.5% aqueous NaCl solution, and a corrosion loss after 150 cycles was evaluated.

In the corrosion lost evaluation, a plated steel sheet resulting in a corrosion loss of less than 20 g/m$^2$ as determined as being "Excellent", a plated steel sheet resulting in a corrosion loss of equal to or greater than 20 g/m$^2$ and less than 30 g/was determined as being "Good", and a plated steel sheet resulting in a corrosion loss of equal to or greater than 30 g/m$^2$ as determined as being "Poor". "Excellent" shows that the plated steel sheet is the best in the corrosion loss evaluation.

The occurrence of red rust was evaluated by the aforementioned combined cycle corrosion test (CCT). Specifically, the produced plated steel sheet was subjected to the combined cycle corrosion test (CCT) by using a 5% aqueous NaCl solution, and the number of test cycles in which red rust occurred in an area of greater than 5% of a planar portion of the plated steel sheet was investigated.

In the evaluation of the occurrence of red rust, a plated steel sheet in which the red rust was not confirmed after 300 cycle as determined as being "Excellent", an plated steel sheet in which the red rust was not confirmed after 150 cycles was determined as being "Very. Good", a plated steel sheet in which the red rust was not confirmed after 100 cycles was determined as being "Good", and a plated steel sheet in which the red rust was confirmed before the 100th cycle was determined as being "Poor". "Excellent" shows that the plated steel sheet is the best in the evaluation of the occurrence of red rust.

The occurrence of white rust was evaluated by a Salt Spray Test (SST) based on JIS Z2371: 2000. Specifically, the produced plated steel sheet was subjected to the salt spray test (SST) by using a 5% aqueous NaCl solution, and a time taken for white rust to occur in an area of greater than 5% of a planar portion of the plated steel sheet during the test was investigated.

In the evaluation of the occurrence of white rust, a plated steel sheet in which the white rust was not confirmed after 120 hours was determined as being "Excellent, a plated steel sheet in which the white rust was not confirmed after 24 hours was determined as being "Good", and a plated steel sheet in which the white rust was confirmed before 24 hours passed was determined as being "Poor". "Excellent" shows that the plated steel sheet is the best in the evaluation of the occurrence of white rust.

The occurrence of red rust in a processed portion was evaluated by performing the aforementioned salt spray test (SST) on the plated steel sheet having undergone bulging. Specifically, the produced plated steel sheet was subjected to bulging based on JIS Z2247: 2006 under the condition of an indentation depth (movement distance of a punch) of 7 mm. The plated steel sheet was subjected to the salt spray test (SST) by using a 5% aqueous NaCl solution, and a time taken for red rust to occur in an area of greater than 5% of a top area (45 mm×45 mm region in which the top is regarded as being the center of a diagonal line of a square) after bulging during the test was investigated.

In the evaluation of the occurrence of red rust in a processed portion, a plated steel sheet in which the red rust was not confirmed after 600 hours was determined as being "Excellent", a plated steel sheet in which the red rust was not confirmed after 240 hours was determined as being "Good", and a plated steel sheet in which the red rust was confirmed before 240 hours passed was determined as being "Poor". "Excellent" shows that the plated steel sheet is the best in the evaluation of the occurrence of red rust, in a processed portion.

The sacrificial protection was valuated by an electrochemical technique. Specifically, The produced plated steel sheet was dipped into a 0.5% aqueous NaCl solution, and a corrosion potential of the produced plated steel sheet was measured using a Ag/AgCl reference electrode. In this case, a corrosion potential of Fe is about −0.62 V.

In the evaluation of sacrificial protection, a plated steel sheet in which a corrosion potential was −0.9 V to −0.62 V with respect to the Ag/AgCl reference electrode was determined as being "Excellent", a plated steel sheet in which a corrosion potential was equal to or greater than −1.0 V and less than 0.9 V was determined as being "Very Good", a plated steel sheet in which a corrosion potential was equal to or greater than −1.3 V and less than −1.0 V was determined as being "Good", and a plated steel sheet in which a corrosion potential was −1.3 V to −0.62 V was determined as being "Poor". "Excellent" shows that a difference in a potential between the plated steel sheet and Fe is small, and an excellent sacrificial protection performance is appropriately demonstrated.

The antiglare effect was evaluated by a spectro-colorimetric method. Usually, it is preferable to visually evaluate the antiglare effect. In this example, it was confirmed in advance that there is a correlation between the result of visual observation and an L* value obtained by a colorimeter, and then the antiglare effect was evaluated by a specular component inclusion (SCI) method by using a spectral colorimeter (D65 light source, 10° visual field). Specifically, an L* value of the produced plated steel sheet was investigated by using a spectral colorimeter CM2500d manufactured by Konica Minolta, Inc under the conditions of a measurement diameter of 8φ, 10° visual field, and a D65 light source.

In the evaluation of the antiglare effect, a plated steel sheet having an L* value of less than 75 was determined as being "Excellent", and a plated steel sheet having an L* value of equal to or greater than 75 was determined as being "Poor". "Excellent" shows that the antiglare effect of the plated steel sheet is excellent.

The appearance of the plated steel sheet was evaluated by a test in which the plated steel sheet is stored in a thermohygrostat tank. Specifically, the produced plated steel sheet was stored for 72 hours in a thermohygrostat tank with a temperature of 40° C. and a humidity of 95%, and an area (%) of a portion, which turned black, in a planar portion of the plated steel sheet after storage was investigated.

In the appearance evaluation, a plated steel sheet in which an area of less than 1% of the evaluation area (45 mm×70 mm) turned black was determined as being "Excellent", a plated steel sheet in which an area of equal to or greater than 1% and less than 3% turned black was determined as being "Good", and a plated steel sheet in which an area of equal to or greater than 3% turned black was determined as being "Poor". "Excellent" shows that the plated steel sheet is the best in the appearance evaluation.

The adherence of the plated-metal-layer was evaluated by a 4 T bending test (180° bending test). Specifically, a 20 mm×80 mm sample was cut of from the produced plated steel sheet and subjected to a 4 T bending test (180° bending test). T means a thickness of the plated steel sheet, which is about 0.8 mm. The bending direction is the C direction of the steel sheet. A tape peeling test was performed on the inside of the bend of the sample having undergone the bending test, and the peeling state of the plated-metal-layer was investigated.

In the adherence evaluation of the plated-metal-layer, the plated steel sheet from which the plated-metal-layer was not peeled oft was determined as being "Excellent", a plated steel sheet from which the plated-metal-layer was peeled off in an area of less than 5 mm$^2$ was determined as being "Very Good", a plated steel sheet from which the plated-metal-layer was peeled off in an area of equal to or greater than 5 mm$^2$ and less than 10 mm$^2$ was determined as being "Good", and a plated steel sheet from which the plated-metal-layer was peeled off in an area of equal to or greater than 10 mm$^2$ was determined as being "Poor". "Excellent" shows that the plated steel sheet is the best in the adherence evaluation.

The post-powdering corrosion resistance of the plated steel sheet was evaluated by a test performed under the following conditions. Specifically, from the produced plated steel sheet (thickness: 0.8 mm, plating thickness: 10 μm), a sample having a size of 300 mm×600 mm was cut off. The center area of the sample was subjected to bending such that a portion bent at 90° was formed. The sample having undergone bending was subjected to a salt spray test (SST) by using a 5% aqueous NaCl solution, and the state where red rust occurred in the inner surface of the bent portion was investigated. At the time of performing the salt spray test, a tape was attached to the periphery of the sample having undergone bending, and the sample was made stand at a height of 300 mm.

In the evaluation of the post-powdering corrosion resistance, a plated steel, sheet in which the red rust was not confirmed 720 hours after the beginning of the salt spray test was determined as being "Excellent", a plated steel sheet in which the red rust was not confirmed after 480 hours was determined as being "Good", and a plated steel sheet in which the red rust was confirmed at a point in time when 480 hours passed was determined as being "Poor". "Excellent" shows that the plated steel sheet is the best in the evaluation of the post-powdering corrosion resistance.

The production conditions, the production effects, and the evaluation results described above are shown in Tables 1 to 30. In the tables, an underlined numerical value is a value outside the range of the present invention, and a blank shows that the alloy element was not added intentionally.

All of the plated steel sheets of Examples Nos. 1 to 58 satisfied the range of the present invention and were excellent in the corrosion resistance and the sacrificial protection. In contrast, the plated steel sheets of Comparative Example Nos. 1 to 25 do not satisfy the conditions of the present invention and hence the corrosion resistance or the sacrificial protection thereof was insufficient.

TABLE 1

| | | Production conditions | | | | | | | | |
|---|---|---|---|---|---|---|---|---|---|---|
| | | Hot-dip-plating process | | | | | | First cooling process Temperature dependent on chemical composition of plated-metal-layer | | |
| | | | | | | | | | Temperature range in which volume ratio of solid phase becomes 0.3 to 0.8 $T_{solid\text{-}liquid}$ | |
| | | Oxide in plating bath g/l | Atmospheric oxygen concentration ppm | Material of plating tub | Whether or not dross is removed by a metal pump | Temperature of plating bath $T_{bath}$ °C. | Time to dip steel sheet Sec | Liquidus temperature $T_{melt}$ °C. | Upper limit °C. | Lower limit °C. |
| Classification | No. | | | | | | | | | |
| Comparative Example | 1 | 0 | 20 | Steel | Removed | 410 | 3 | 360 | 355 | 345 |
| Comparative Example | 2 | 0 | 20 | Steel | Removed | 480 | 3 | 450 | 387 | 377 |
| Example | 1 | 0 | 20 | Steel | Removed | 410 | 3 | 380 | 362 | 352 |
| Example | 2 | 0 | 20 | Steel | Removed | 420 | 3 | 375 | 361 | 351 |
| Example | 3 | 0 | 20 | Steel | Removed | 420 | 3 | 380 | 362 | 352 |
| Example | 4 | 0 | 20 | Steel | Removed | 420 | 3 | 405 | 371 | 361 |
| Example | 5 | 0 | 20 | Steel | Removed | 420 | 3 | 405 | 371 | 361 |
| Example | 6 | 0 | 20 | Steel | Removed | 430 | 3 | 400 | 369 | 359 |
| Comparative Example | 3 | 0.1 | 20 | Steel | Not removed | 400 | 3 | 370 | 359 | 349 |
| Example | 7 | 0 | 20 | Steel | Removed | 410 | 3 | 350 | 352 | 342 |
| Example | 8 | 0 | 20 | Steel | Removed | 420 | 3 | 355 | 354 | 344 |
| Example | 9 | 0 | 20 | Steel | Removed | 420 | 3 | 350 | 352 | 342 |
| Example | 10 | 0 | 20 | Steel | Removed | 420 | 3 | 350 | 352 | 342 |
| Example | 11 | 0 | 20 | Steel | Removed | 450 | 3 | 370 | 359 | 349 |
| Example | 12 | 0 | 20 | Steel | Removed | 450 | 3 | 400 | 369 | 359 |
| Comparative Example | 4 | 0 | 20 | Steel | Removed | 460 | 3 | 380 | 362 | 352 |
| Comparative Example | 5 | 0.1 | 20 | Steel | Removed | 420 | 3 | 350 | 352 | 342 |

| | | Production conditions | | | | |
|---|---|---|---|---|---|---|
| | | First cooling process | | | Second cooling process | |
| Classification | No. | Temperature actually measured at the beginning of cooling in first cooling process °C. | Temperature actually measured at the end of cooling in first cooling process °C. | Average cooling rate of plated-metal-layer °C./sec | Temperature actually measured at the end of cooling in second cooling process °C. | Average cooling rate of plated-metal-layer °C./sec |
| Comparative Example | 1 | 365 | 350 | 25 | 25 | 1,000 |
| Comparative Example | 2 | 455 | 380 | 25 | 25 | 250 |
| Example | 1 | 385 | 360 | 20 | 25 | 250 |
| Example | 2 | 380 | 355 | 20 | 25 | 200 |
| Example | 3 | 385 | 360 | 20 | 25 | 100 |
| Example | 4 | 410 | 370 | 25 | 25 | 150 |
| Example | 5 | 410 | 370 | 25 | 25 | 125 |
| Example | 6 | 405 | 365 | 25 | 25 | 175 |
| Comparative Example | 3 | 375 | 355 | 20 | 25 | 200 |
| Example | 7 | 355 | 345 | 20 | 25 | 225 |
| Example | 8 | 360 | 350 | 20 | 25 | 200 |
| Example | 9 | 355 | 345 | 20 | 25 | 225 |
| Example | 10 | 355 | 345 | 20 | 25 | 250 |
| Example | 11 | 375 | 355 | 20 | 25 | 300 |
| Example | 12 | 405 | 365 | 20 | 25 | 1,000 |
| Comparative Example | 4 | 385 | 355 | 20 | 25 | <u>15</u> |
| Comparative Example | 5 | 355 | 345 | 20 | 25 | 350 |

TABLE 2

| | | Production conditions | | | | | | | | |
|---|---|---|---|---|---|---|---|---|---|---|
| | | Hot-dip-plating process | | | | | | First cooling process Temperature dependent on chemical composition of plated-metal-layer | | |
| | | | | | | | | | Temperature range in which volume ratio of solid phase becomes 0.3 to 0.8 $T_{solid-liquid}$ | |
| Classification | No. | Oxide in plating bath g/l | Atmospheric oxygen concentration ppm | Material of plating tub | Whether or not dross is removed by a metal pump | Temperature of plating bath $T_{bath}$ °C. | Time to dip steel sheet Sec | Liquidus temperature $T_{melt}$ °C. | Upper limit °C. | Lower limit °C. |
| Example | 13 | 0 | 20 | Steel | Removed | 480 | 3 | 430 | 380 | 370 |
| Example | 14 | 0 | 20 | Steel | Removed | 470 | 3 | 415 | 375 | 365 |
| Example | 15 | 0 | 20 | Steel | Removed | 470 | 3 | 430 | 380 | 370 |
| Example | 16 | 0 | 20 | Steel | Removed | 420 | 3 | 350 | 352 | 342 |
| Example | 17 | 0 | 20 | Steel | Removed | 470 | 3 | 430 | 380 | 370 |
| Example | 18 | 0 | 20 | Steel | Removed | 500 | 3 | 475 | 396 | 386 |
| Comparative Example | 6 | 0 | 20 | Steel | Removed | 520 | 3 | 470 | 394 | 384 |
| Example | 19 | 0.2 | 20 | Steel | Removed | 475 | 3 | 440 | 383 | 373 |
| Example | 20 | 0 | 20 | Steel | Removed | 470 | 3 | 420 | 376 | 366 |
| Comparative Example | 7 | 0 | 20 | Steel | Removed | 530 | 3 | 500 | 404 | 394 |
| Example | 21 | 0.1 | 20 | Steel | Removed | 500 | 3 | 410 | 373 | 363 |
| Example | 22 | 0 | 20 | Steel | Removed | 480 | 3 | 445 | 385 | 375 |
| Example | 23 | 0.2 | 20 | Steel | Not removed | 500 | 3 | 445 | 385 | 375 |
| Example | 24 | 0 | 20 | Steel | Removed | 490 | 3 | 455 | 389 | 379 |
| Comparative Example | 8 | 0.5 | 20 | Steel | Not removed | 500 | 3 | 470 | 394 | 384 |
| Example | 25 | 0.3 | 20 | Steel | Not removed | 480 | 3 | 440 | 383 | 373 |
| Example | 26 | 0 | 20 | Steel | Removed | 500 | 3 | 465 | 392 | 382 |

| | | Production conditions | | | | |
|---|---|---|---|---|---|---|
| | | First cooling process | | | Second cooling process | |
| Classification | No. | Temperature actually measured at the beginning of cooling in first cooling process °C. | Temperature actually measured at the end of cooling in first cooling process °C. | Average cooling rate of plated-metal-layer °C./sec | Temperature actually measured at the end of cooling in second cooling process °C. | Average cooling rate of plated-metal-layer °C./sec |
| Example | 13 | 435 | 375 | 30 | 25 | 325 |
| Example | 14 | 420 | 370 | 25 | 25 | 275 |
| Example | 15 | 435 | 375 | 30 | 25 | 200 |
| Example | 16 | 355 | 345 | 20 | 25 | 225 |
| Example | 17 | 435 | 375 | 30 | 25 | 200 |
| Example | 18 | 480 | 390 | 35 | 25 | 150 |
| Comparative Example | 6 | 475 | 390 | 2,000 | 25 | 2,000 |
| Example | 19 | 445 | 375 | 25 | 25 | 115 |
| Example | 20 | 425 | 370 | 25 | 25 | 175 |
| Comparative Example | 7 | 505 | 400 | 35 | 25 | 200 |
| Example | 21 | 415 | 370 | 30 | 25 | 1,000 |
| Example | 22 | 450 | 380 | 25 | 25 | 1,000 |
| Example | 23 | 450 | 380 | 30 | 25 | 250 |
| Example | 24 | 460 | 385 | 30 | 25 | 175 |
| Comparative Example | 8 | 475 | 395 | 9 | 25 | 150 |
| Example | 25 | 445 | 380 | 25 | 25 | 175 |
| Example | 26 | 470 | 385 | 30 | 25 | 200 |

TABLE 3

| | | | Production conditions | | | | | | | |
|---|---|---|---|---|---|---|---|---|---|---|
| | | | Hot-dip-plating process | | | | | | First cooling process Temperature dependent on chemical composition of plated-metal-layer | |
| | | | | | | | | | | Temperature range in which volume ratio of solid phase becomes 0.3 to 0.8 $T_{solid\text{-}liquid}$ |
| Classification | No. | Oxide in plating bath g/l | Atmospheric oxygen concentration ppm | Material of plating tub | Whether or not dross is removed by a metal pump | Temperature of plating bath $T_{bath}$ °C. | Time to dip steel sheet Sec | Liquidus temperature $T_{melt}$ °C. | Upper limit °C. | Lower limit °C. |
| Example | 27 | 0 | 20 | Steel | Removed | 460 | 3 | 415 | 375 | 365 |
| Comparative Example | 9 | 0 | 20 | Steel | Removed | 510 | 3 | 470 | 394 | 384 |
| Comparative Example | 10 | 0.3 | 20 | Steel | Removed | 470 | 3 | 420 | 376 | 366 |
| Comparative Example | 11 | 0 | 20 | Steel | Removed | 500 | 3 | 460 | 390 | 380 |
| Comparative Example | 12 | 0 | 20 | Steel | Removed | 500 | 3 | 470 | 394 | 384 |
| Example | 28 | 0 | 20 | Steel | Removed | 480 | 3 | 445 | 385 | 375 |
| Example | 29 | 0 | 20 | Steel | Removed | 520 | 3 | 470 | 394 | 384 |
| Example | 30 | 1.1 | 20 | Steel | Not removed | 510 | 3 | 475 | 396 | 386 |
| Example | 31 | 0 | 20 | Steel | Removed | 550 | 3 | 525 | 413 | 403 |
| Comparative Example | 13 | 0 | 20 | Steel | Removed | 500 | 3 | 470 | 394 | 384 |
| Example | 32 | 0 | 20 | Steel | Removed | 550 | 3 | 500 | 404 | 394 |
| Example | 33 | 0 | 20 | Steel | Removed | 540 | 3 | 510 | 408 | 398 |
| Example | 34 | 0 | 20 | Steel | Removed | 550 | 3 | 515 | 410 | 400 |
| Example | 35 | 0 | 20 | Steel | Removed | 510 | 3 | 480 | 397 | 387 |
| Comparative Example | 14 | 0.5 | 20 | Steel | Removed | 520 | 3 | 490 | 401 | 391 |
| Example | 36 | 0.3 | 20 | Steel | Removed | 550 | 3 | 520 | 411 | 401 |
| Example | 37 | 0.1 | 20 | Steel | Not removed | 580 | 3 | 540 | 418 | 408 |

| | | Production conditions | | | | |
|---|---|---|---|---|---|---|
| | | First cooling process | | | Second cooling process | |
| Classification | No. | Temperature actually measured at the beginning of cooling in first cooling process °C. | Temperature actually measured at the end of cooling in first cooling process °C. | Average cooling rate of plated-metal-layer °C./sec | Temperature actually measured at the end of cooling in second cooling process °C. | Average cooling rate of plated-metal-layer °C./sec |
| Example | 27 | 420 | 370 | 25 | 25 | 250 |
| Comparative Example | 9 | 475 | 390 | <u>14</u> | 25 | 1,000 |
| Comparative Example | 10 | 425 | 370 | 25 | 25 | 1,000 |
| Comparative Example | 11 | 465 | 385 | <u>55</u> | 25 | 1,000 |
| Comparative Example | 12 | 475 | 390 | 30 | 25 | 225 |
| Example | 28 | 450 | 380 | 25 | 25 | 250 |
| Example | 29 | 475 | 390 | 25 | 25 | 1,000 |
| Example | 30 | 480 | 390 | 35 | 25 | 125 |
| Example | 31 | 530 | 405 | 35 | 25 | 250 |
| Comparative Example | 13 | 475 | 385 | 30 | 25 | 225 |
| Example | 32 | 505 | 400 | 30 | 25 | 1,000 |
| Example | 33 | 515 | 400 | 35 | 25 | 200 |
| Example | 34 | 520 | 405 | 35 | 25 | 225 |
| Example | 35 | 485 | 395 | 35 | 25 | 125 |
| Comparative Example | 14 | 495 | 395 | 35 | 25 | 1,000 |

TABLE 3-continued

| | | | | | | |
|---|---|---|---|---|---|---|
| Example | 36 | 525 | 405 | 35 | 25 | 1,000 |
| Example | 37 | 545 | 415 | 35 | 25 | 100 |

TABLE 4

Production conditions

| | | Hot-dip-plating process | | | | | | First cooling process Temperature dependent on chemical composition of plated-metal-layer | |
|---|---|---|---|---|---|---|---|---|---|
| | | | | | | | | | Temperature range in which volume ratio of solid phase becomes 0.3 to 0.8 $T_{solid\text{-}liquid}$ |
| Classification | No. | Oxide in plating bath g/l | Atmospheric oxygen concentration ppm | Material of plating tub | Whether or not dross is removed by a metal pump | Temperature of plating bath $T_{bath}$ °C. | Time to dip steel sheet Sec | Liquidus temperature $T_{melt}$ °C. | Upper limit °C. / Lower limit °C. |
| Comparative Example | 15 | 0.5 | 20 | Steel | Removed | 540 | 3 | 505 | 406 / 396 |
| Example | 38 | 0 | 20 | Steel | Removed | 560 | 3 | 530 | 415 / 405 |
| Example | 39 | 0 | 20 | Steel | Removed | 550 | 3 | 520 | 411 / 401 |
| Example | 40 | 0 | 20 | Steel | Removed | 550 | 3 | 520 | 411 / 401 |
| Example | 41 | 0 | 20 | Steel | Removed | 550 | 3 | 515 | 410 / 400 |
| Example | 42 | 0 | 20 | Steel | Removed | 560 | 3 | 510 | 408 / 398 |
| Example | 43 | 1.1 | 20 | Steel | Not removed | 550 | 3 | 520 | 411 / 401 |
| Example | 44 | 0 | 20 | Steel | Removed | 560 | 3 | 530 | 415 / 405 |
| Example | 45 | 0 | 20 | Steel | Removed | 570 | 3 | 535 | 417 / 407 |
| Example | 46 | 0 | 20 | Steel | Removed | 570 | 3 | 540 | 418 / 408 |
| Comparative Example | 16 | 0 | 20 | Steel | Removed | 560 | 3 | 530 | 415 / 405 |
| Example | 47 | 0.1 | 30 | Steel | Removed | 570 | 3 | 535 | 417 / 407 |
| Example | 48 | 0 | 20 | Steel | Removed | 570 | 3 | 540 | 418 / 408 |
| Comparative Example | 17 | 0 | 20 | Steel | Removed | 570 | 3 | 540 | 418 / 408 |
| Example | 49 | 0 | 20 | Steel | Removed | 575 | 3 | 550 | 422 / 412 |
| Example | 50 | 1.1 | 20 | Steel | Not removed | 570 | 3 | 545 | 420 / 410 |
| Example | 51 | 0 | 20 | Steel | Removed | 580 | 3 | 545 | 420 / 410 |

Production conditions

| | | First cooling process | | | Second cooling process | |
|---|---|---|---|---|---|---|
| Classification | No. | Temperature actually measured at the beginning of cooling in first cooling process °C. | Temperature actually measured at the end of cooling in first cooling process °C. | Average cooling rate of plated-metal-layer °C./sec | Temperature actually measured at the end of cooling in second cooling process °C. | Average cooling rate of plated-metal-layer °C./sec |
| Comparative Example | 15 | 510 | 400 | 35 | 25 | 2,000 |
| Example | 38 | 535 | 409 | 35 | 25 | 2,000 |
| Example | 39 | 525 | 405 | 35 | 25 | 150 |
| Example | 40 | 525 | 405 | 35 | 25 | 250 |
| Example | 41 | 520 | 405 | 35 | 25 | 200 |
| Example | 42 | 515 | 405 | 35 | 25 | 1,000 |
| Example | 43 | 525 | 405 | 35 | 25 | 2,000 |
| Example | 44 | 535 | 410 | 40 | 25 | 2,000 |
| Example | 45 | 540 | 410 | 40 | 25 | 150 |
| Example | 46 | 545 | 415 | 40 | 25 | 2,000 |
| Comparative Example | 16 | 535 | 410 | 40 | 25 | 2,000 |
| Example | 47 | 540 | 410 | 40 | 25 | 225 |
| Example | 48 | 545 | 415 | 40 | 25 | 200 |

TABLE 4-continued

| Classification | No. | | | | | |
|---|---|---|---|---|---|---|
| Comparative Example | 17 | 545 | 415 | 40 | 25 | 2,000 |
| Example | 49 | 555 | 415 | 40 | 25 | 120 |
| Example | 50 | 550 | 415 | 40 | 25 | 2,000 |
| Example | 51 | 550 | 415 | 40 | 25 | 2,000 |

TABLE 5

| | | Production conditions | | | | | | | |
|---|---|---|---|---|---|---|---|---|---|
| | | Hot-dip-plating process | | | | | | First cooling process Temperature dependent on chemical composition of plated-metal-layer | |
| | | | | | | | | | Temperature range in which volume ratio of solid phase becomes 0.3 to 0.8 $T_{solid-liquid}$ |
| | | Oxide in plating bath g/l | Atmospheric oxygen concentration ppm | Material of plating tub | Whether or not dross is removed by a metal pump | Temperature of plating bath $T_{bath}$ °C. | Time to dip steel sheet Sec | Liquidus temperature $T_{melt}$ °C. | Upper limit °C. / Lower limit °C. |
| Classification | No. | | | | | | | | |
| Comparative Example | 18 | 0 | 20 | Steel | Removed | 580 | 3 | 550 | 422 / 412 |
| Example | 52 | 0.2 | 20 | Steel | Not removed | 590 | 3 | 550 | 422 / 412 |
| Example | 53 | 0.1 | 20 | Steel | Removed | 585 | 3 | 560 | 425 / 415 |
| Example | 54 | 0 | 20 | Steel | Removed | 585 | 3 | 560 | 425 / 415 |
| Comparative Example | 19 | 0 | 20 | Steel | Removed | 580 | 3 | 560 | 425 / 415 |
| Comparative Example | 20 | 0.1 | 20 | Steel | Removed | 590 | 3 | 565 | 427 / 417 |
| Example | 55 | 0 | 20 | Steel | Removed | 590 | 3 | 560 | 425 / 415 |
| Example | 56 | 0.1 | 20 | Steel | Removed | 595 | 3 | 570 | 429 / 419 |
| Example | 57 | 1.1 | 20 | Steel | Not removed | 580 | 3 | 555 | 424 / 414 |
| Comparative Example | 21 | 0 | 20 | Steel | Removed | 590 | 2 | 550 | 422 / 412 |
| Comparative Example | 22 | 0 | 20 | Steel | Removed | 600 | 3 | 575 | 431 / 421 |
| Example | 58 | 0 | 20 | Steel | Removed | 610 | 3 | 580 | 432 / 422 |
| Comparative Example | 23 | 0 | 20 | Steel | Removed | 610 | 3 | 560 | 425 / 415 |
| Comparative Example | 24 | Commercially available hot dip galvanizing | | | | | | | |
| Comparative Example | 25 | Single-phase amorphous plated steel sheet starting to be submerged at 450° C. | | | | | | | |

| | | Production conditions | | | | |
|---|---|---|---|---|---|---|
| | | First cooling process | | | Second cooling process | |
| | | Temperature actually measured at the beginning of cooling in first cooling process °C. | Temperature actually measured at the end of cooling in first cooling process °C. | Average cooling rate of plated-metal-layer °C./sec | Temperature actually measured at the end of cooling in second cooling process °C. | Average cooling rate of plated-metal-layer °C./sec |
| Classification | No. | | | | | |
| Comparative Example | 18 | 555 | 415 | 40 | 25 | 95 |
| Example | 52 | 555 | 415 | 45 | 25 | 500 |
| Example | 53 | 565 | 420 | 45 | 25 | 110 |
| Example | 54 | 565 | 420 | 45 | 25 | 2,000 |
| Comparative Example | 19 | 565 | 400 | 45 | 25 | 200 |
| Comparative Example | 20 | 570 | 420 | 45 | 25 | 250 |

TABLE 5-continued

|  |  |  |  |  |  |  |
|---|---|---|---|---|---|---|
| Example | 55 | 565 | 420 | 45 | 25 | 100 |
| Example | 56 | 575 | 425 | 45 | 25 | 2,000 |
| Example | 57 | 560 | 420 | 45 | 25 | 105 |
| Comparative Example | 21 | 555 | 440 | 45 | 25 | 1,000 |
| Comparative Example | 22 | 580 | 425 | 45 | 25 | 200 |
| Example | 58 | 585 | 425 | 45 | 25 | 2,000 |
| Comparative Example | 23 | 565 | 420 | 45 | 25 | 1,000 |
| Comparative Example | 24 | Commercially available hot dip galvanizing | | | | |
| Comparative Example | 25 | Single-phase amorphous plated steel sheet starting to be submerged at 450° C. | | | | |

TABLE 6

Production result
Plated-metal-layer
Chemical composition of plated-metal-layer (at %)

| Classification | No. | Zn at % | Al at % | Ca at % | Y at % | La at % | Ce at % | Si at % | Ti at % | Cr at % | Fe at % | Co at % | Ni at % | V at % |
|---|---|---|---|---|---|---|---|---|---|---|---|---|---|---|
| Comparative Example | 1 | 19 | 4 | 1 |  |  | 0.5 |  |  |  | 0.2 |  |  |  |
| Comparative Example | 2 | 20 | 2 |  | 0.8 | 0.3 |  |  |  |  | 0.3 |  |  |  |
| Example | 1 | 20 | 8 |  | 1 |  |  | 0.005 |  |  | 0.3 |  |  |  |
| Example | 2 | 21 | 10 | 0.3 |  |  |  |  |  |  | 0.2 |  |  |  |
| Example | 3 | 21 | 14 |  | 0.9 |  |  |  |  |  | 0.2 |  |  |  |
| Example | 4 | 22 | 3 |  |  | 1.5 |  |  |  |  | 0.1 |  |  |  |
| Example | 5 | 22 | 12 |  |  |  | 1 |  |  | 0.2 | 0.1 |  |  |  |
| Example | 6 | 23 | 2 | 0.5 | 2 |  |  |  |  |  | 0.1 |  |  |  |
| Comparative Example | 3 | 23 | 8 |  |  | 2.1 |  |  |  |  | 0.2 |  |  |  |
| Example | 7 | 24 | 1 |  | 0.1 | 0.1 | 0.2 |  |  |  | 0.1 |  |  |  |
| Example | 8 | 24 | 5.5 |  |  |  |  |  |  |  | 0.2 |  |  |  |
| Example | 9 | 25 | 0.5 | 1.8 |  |  |  |  |  |  | 0.1 |  |  |  |
| Example | 10 | 25 | 5 | 2.6 |  |  |  |  |  |  | 0.2 |  |  |  |
| Example | 11 | 26 | 9 |  |  | 2.3 |  |  |  |  | 0.3 |  |  |  |
| Example | 12 | 26 | 15 | 0.5 |  |  | 0.3 |  |  |  | 0.4 |  |  |  |
| Comparative Example | 4 | 26 | 6 |  |  | 2.9 |  |  |  |  | 0.3 |  |  |  |
| Comparative Example | 5 | 27 | 3 | 3.6 |  |  |  |  |  |  | 0.2 |  |  |  |

TABLE 7

Production result
Plated-metal-layer
Chemical composition of plated-metal-layer (at %)

| classification | No. | Zn at % | Al at % | Ca at % | Y at % | La at % | Ce at % | Si at % | Ti at % | Cr at % | Fe at % | Co at % | Ni at % | V at % |
|---|---|---|---|---|---|---|---|---|---|---|---|---|---|---|
| Example | 13 | 27 | 12 |  |  |  | 1.3 |  |  |  | 0.2 |  |  |  |
| Example | 14 | 28 | 7 |  | 1.6 |  |  |  |  |  | 0.3 |  |  |  |
| Example | 15 | 28 | 10 |  | 1.5 |  |  |  |  |  | 0.3 |  |  |  |
| Example | 16 | 29 | 4 |  |  |  |  | 0.03 |  |  | 0.2 |  |  |  |
| Example | 17 | 29 | 9 |  | 0.6 |  |  |  |  |  | 0.3 |  |  |  |
| Example | 18 | 30 | 15 |  | 1.4 |  |  |  |  |  | 0.3 |  |  |  |
| Comparative Example | 6 | 30 | 2 |  | 1 |  |  | 0.1 |  |  | 0.2 |  |  |  |
| Example | 19 | 31 | 7.5 |  |  | 0.4 | 0.4 |  |  |  | 0.3 | 0.1 |  |  |
| Example | 20 | 31 | 5 |  |  | 0.2 | 0.6 |  |  |  | 0.2 |  |  |  |
| Comparative Example | 7 | 32 | 17 | 0.1 | 2 |  |  |  |  |  | 0.5 |  |  |  |
| Example | 21 | 32 | 2.5 |  |  |  |  |  |  |  | 0.4 |  |  |  |

TABLE 7-continued

| classification | No. | Production result Plated-metal-layer Chemical composition of plated-metal-layer (at %) | | | | | | | | | | | |
|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Example | 22 | 32 | 7 | 1 | | | | | | | 0.3 | | | |
| Example | 23 | 33 | 15 | 0.5 | | | | | | | 0.3 | | | |
| Example | 24 | 33 | 8 | | 1.6 | | 0.2 | | 0.1 | 0.05 | 0.3 | | | |
| Comparative Example | 8 | 33 | 3.6 | | 0.7 | 0.3 | | | | | 0.3 | | | |
| Example | 25 | 34 | 5 | | | | | | | | 0.2 | | | |
| Example | 26 | 34 | 10 | 1.6 | | | | | | | 0.3 | | | |

TABLE 8

| classification | No. | Production result Plated-metal-layer Chemical composition of plated-metal-layer (at %) | | | | | | | | | | | |
|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Example | 27 | 35 | 0.8 | | 0.8 | | 2.1 | | 0.1 | | 0.2 | | | |
| Comparative Example | 9 | 35 | 14 | | | 2 | | | | 0.1 | 0.2 | | | |
| Comparative Example | 10 | 36 | 0 | | | | | | | | 0.2 | | | |
| Comparative Example | 11 | 36 | 10 | | | 1.3 | 0.2 | | | | 0.3 | | | |
| Comparative Example | 12 | 37 | 7 | 0.9 | 0.9 | 1.1 | 4.1 | | | | 0.2 | | | |
| Example | 28 | 37 | 1.5 | | | | | | | | 0.3 | | | |
| Example | 29 | 37 | 10 | | | | | | | | 0.3 | | | |
| Example | 30 | 38 | 5 | | 1.3 | | | | | | 0.3 | | | |
| Example | 31 | 38 | 13 | | 3.3 | | | | | | 0.3 | | | |
| Comparative Example | 13 | 39 | 3 | | 3.7 | | | | | | 0.3 | | | |
| Example | 32 | 39 | 14 | 0.7 | | | | | | | 0.3 | | | |
| Example | 33 | 40 | 8 | | | | 2.2 | | | | 0.3 | | | |
| Example | 34 | 40 | 12 | | | | | | | | 0.3 | | | |
| Example | 35 | 41 | 3 | | | 1.1 | 0.1 | | | | 0.3 | | | |
| Comparative Example | 14 | 41 | 5 | | | | 1.7 | 0.6 | | | 0.2 | | | |
| Example | 36 | 42 | 11 | | 1.5 | | | | | | 0.3 | | | |
| Example | 37 | 42 | 1.8 | 0.4 | | | 0.5 | | | | 0.4 | | | |

TABLE 9

| classification | No. | Production result Plated-metal-layer Chemical composition of plated-metal-layer (at %) | | | | | | | | | | | |
|---|---|---|---|---|---|---|---|---|---|---|---|---|---|
| | | Zn at % | Al at % | Ca at % | Y at % | La at % | Ce at % | Si at % | Ti at % | Cr at % | Fe at % | Co at % | Ni at % | V at % |
| Comparative Example | 15 | 43 | 5 | | | | | 0.3 | | 0.6 | 0.3 | | | |
| Example | 38 | 44 | 10.5 | 3.3 | | | | | | | 0.3 | | | |
| Example | 39 | 44 | 6 | | | 1.8 | | | | | 0.3 | | | |
| Example | 40 | 45 | 0.7 | | 2.6 | | | | 0.005 | | 0.2 | | | |
| Example | 41 | 45 | 5 | | | 1.5 | | | | | 0.3 | | | |
| Example | 42 | 45 | 12 | | | | 1.3 | | | | 0.4 | | | |
| Example | 43 | 46 | 2 | | 1.3 | | | | | | 0.3 | | | |
| Example | 44 | 47 | 4 | | | 0.6 | | | | | 0.3 | 0.5 | | |
| Example | 45 | 47 | 10 | | | | | | | | 0.3 | | | 0.005 |
| Example | 46 | 48 | 9 | | 2.1 | | | | | | 0.3 | | | |
| Comparative Example | 16 | 48 | 16 | | 1.5 | | 0.1 | | | | 0.3 | | | |
| Example | 47 | 49 | 4 | | 0.2 | | | | | | 0.3 | | | |

TABLE 9-continued

| classification | No. | Zn at % | Al at % | Ca at % | Y at % | La at % | Ce at % | Si at % | Ti at % | Cr at % | Fe at % | Co at % | Ni at % | V at % |
|---|---|---|---|---|---|---|---|---|---|---|---|---|---|---|
| Example | 48 | 50 | 3 | | 2.7 | | | | | | 0.3 | | | |
| Comparative Example | 17 | 51 | 1.5 | | | | | | | <u>0.6</u> | 0.3 | | | |
| Example | 49 | 52 | 10 | 3 | | | | | | | 0.3 | | | |
| Example | 50 | 52 | 4.2 | | 0.6 | | | | | | 0.3 | | | |
| Example | 51 | 53 | 1.5 | | | | | | | 0.005 | 0.3 | | | |

TABLE 10

| classification | No. | Zn at % | Al at % | Ca at % | Y at % | La at % | Ce at % | Si at % | Ti at % | Cr at % | Fe at % | Co at % | Ni at % | V at % |
|---|---|---|---|---|---|---|---|---|---|---|---|---|---|---|
| Comparative Example | 18 | 53 | 10 | 1.5 | | | | | | | 0.3 | | | 0.2 |
| Example | 52 | 54 | 9 | | | 0.5 | 1 | | | | 0.2 | | | |
| Example | 53 | 54 | 3 | | 0.4 | | 3 | | | | 0.3 | | | |
| Example | 54 | 55 | 2 | 0.3 | | | | | | | 0.3 | | | |
| Comparative Example | 19 | 55 | 5 | | 0.7 | | | | | | 0.3 | | | |
| Comparative Example | 20 | 56 | 6 | | 0.5 | | | | | | 0.3 | | <u>0.6</u> | |
| Example | 55 | 56 | 1 | | 0.3 | | | | | | 0.3 | | | |
| Example | 56 | 57 | 0.7 | | 0.1 | | | | | | 0.3 | | | 0.1 |
| Example | 57 | 57 | 13 | 1.5 | 2 | 1 | | | | | 0.3 | | | |
| Comparative Example | 21 | 57 | 10 | | | | | | | | 0.3 | | 0.1 | |
| Comparative Example | 22 | 58 | 11 | | | | 1 | | <u>0.6</u> | | 0.3 | | | |
| Example | 58 | 60 | 2 | 0.3 | | | | | | | 0.3 | | | |
| Comparative Example | 23 | <u>61</u> | 15 | | 0.5 | 1 | | | | | 0.4 | | | |
| Comparative Example | 24 | Commercially available hot dip galvanizing | | | | | | | | | | | | |
| Comparative Example | 25 | Single-phase amorphous plated steel sheet starting to be submerged at 450° C. | | | | | | | | | | | | |

TABLE 11

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn + Al at % | Value of Zn/Al at % |
|---|---|---|---|---|---|---|---|---|---|---|---|---|---|
| Comparative Example | 1 | | | | | | | | 75.3 | 1.5 | 0 | <u>23</u> | 4.8 |
| Comparative Example | 2 | | | | | | | | 76.6 | 1.1 | 0 | <u>22</u> | 10.0 |
| Example | 1 | | | | | | | | 70.7 | 1 | 0.005 | 28 | 2.5 |
| Example | 2 | | | | | | | | 68.5 | 0.3 | 0 | 31 | 2.1 |
| Example | 3 | 0.005 | | | | | | | 63.9 | 0.9 | 0 | 35 | 1.5 |
| Example | 4 | | | | | 0.1 | | | 73.3 | 1.5 | 0 | 25 | 7.3 |
| Example | 5 | | | | | | | | 64.7 | 1 | 0.2 | 34 | 1.8 |
| Example | 6 | | | | | | 0.1 | | 72.3 | 2.5 | 0 | 25 | 11.5 |

TABLE 11-continued

Production result
Plated-metal-layer
Chemical composition of plated-metal-layer (at %)

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn + Al at % | Value of Zn/Al at % |
|---|---|---|---|---|---|---|---|---|---|---|---|---|---|
| Comparative Example | 3 | | | | | | 0.6 | | 66.1 | 2.1 | 0 | 31 | 2.9 |
| Example | 7 | | | | | | 0.005 | | 74.5 | 0.4 | 0 | 25 | 24.0 |
| Example | 8 | | | | | | | | 70.3 | 0 | 0 | 29.5 | 4.4 |
| Example | 9 | | | | | | | | 72.6 | 1.8 | 0 | 25.5 | 50.0 |
| Example | 10 | | | | | | | | 67.2 | 2.6 | 0 | 30 | 5.0 |
| Example | 11 | | | | | | | | 62.4 | 2.3 | 0 | 35 | 2.9 |
| Example | 12 | | | | | | | | 57.8 | 0.8 | 0 | 41 | 1.7 |
| Comparative Example | 4 | | | | | | | | 64.8 | 2.9 | 0 | 32 | 4.3 |
| Comparative Example | 5 | | | | | | 0.3 | | 65.9 | 3.6 | 0 | 30 | 9.0 |

TABLE 12

Production result
Plated-metal-layer
Chemical composition of plated-metal-layer (at %)

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn + Al at % | Value of Zn/Al at % |
|---|---|---|---|---|---|---|---|---|---|---|---|---|---|
| Example | 13 | | | | | | | | 59.5 | 1.3 | 0 | 39 | 2.3 |
| Example | 14 | | | | | | | | 63.1 | 1.6 | 0 | 35 | 4.0 |
| Example | 15 | | | | | | | | 60.2 | 1.5 | 0 | 38 | 2.8 |
| Example | 16 | | | | | 0.1 | | | 66.7 | 0 | 0.03 | 33 | 7.3 |
| Example | 17 | | 0.3 | | | | | | 60.8 | 0.6 | 0 | 38 | 3.2 |
| Example | 18 | | | | | | | | 53.3 | 1.4 | 0 | 45 | 2.0 |
| Comparative Example | 6 | | | | | | | | 66.7 | 1 | 0.1 | 32 | 15.0 |
| Example | 19 | | | | | | | | 60.3 | 0.8 | 0 | 38.5 | 4.1 |
| Example | 20 | | 0.2 | 0.2 | | | | | 62.6 | 0.8 | 0 | 36 | 6.2 |
| Comparative Example | 7 | | | | | 0.5 | | | 47.9 | 2.1 | 0 | 49 | 1.9 |
| Example | 21 | | | | | | | 0.1 | 65.0 | 0 | 0 | 34.5 | 12.8 |
| Example | 22 | | | | | | | | 59.7 | 1 | 0 | 39 | 4.6 |
| Example | 23 | | | | | | | | 51.2 | 0.5 | 0 | 48 | 2.2 |
| Example | 24 | | | | | | | | 56.8 | 1.8 | 0.15 | 41 | 4.1 |
| Comparative Example | 8 | | | | | | | | 62.1 | 1 | 0 | 36.6 | 9.2 |
| Example | 25 | | | | | | 0.005 | | 60.8 | 0 | 0 | 39 | 6.8 |
| Example | 26 | | | | | | 0.005 | | 54.1 | 1.6 | 0 | 44 | 3.4 |

TABLE 13

Production result
Plated-metal-layer
Chemical composition of plated-metal-layer (at %)

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn + Al at % | Value of Zn/Al at % |
|---|---|---|---|---|---|---|---|---|---|---|---|---|---|
| Example | 27 | | | | | | | | 61.0 | 2.9 | 0.1 | 35.8 | 43.8 |
| Comparative Example | 9 | | | | | | | | 48.7 | 2 | 0.1 | 49 | 2.5 |

TABLE 13-continued

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn + Al at % | Value of Zn/Al at % |
|---|---|---|---|---|---|---|---|---|---|---|---|---|---|
| Comparative Example | 10 | | | | | | 0.005 | | 63.8 | 0 | 0 | 36 | — |
| Comparative Example | 11 | | | | | | | | 52.2 | 1.5 | 0 | 46 | 3.6 |
| Comparative Example | 12 | | | | | | | | 48.8 | 7 | 0 | 44 | 5.3 |
| Example | 28 | | | 0.4 | | | 0.3 | | 60.5 | 0 | 0 | 38.5 | 24.7 |
| Example | 29 | | | | | | | | 52.7 | 0 | 0 | 47 | 3.7 |
| Example | 30 | | | | | | | | 55.4 | 1.3 | 0 | 43 | 7.6 |
| Example | 31 | | | | | | | | 45.4 | 3.3 | 0 | 51 | 2.9 |
| Comparative Example | 13 | | | | | | | | 54.0 | 3.7 | 0 | 42 | 13.0 |
| Example | 32 | | | | | | | 0.1 | 45.9 | 0.7 | 0 | 53 | 2.8 |
| Example | 33 | | | | | | | | 49.5 | 2.2 | 0 | 48 | 5.0 |
| Example | 34 | | | | | | 0.1 | | 47.6 | 0 | 0 | 52 | 3.3 |
| Example | 35 | | | | | | | | 54.5 | 1.2 | 0 | 44 | 13.7 |
| Comparative Example | 14 | | | | 0.1 | | | | 51.4 | 1.7 | 0.6 | 46 | 8.2 |
| Example | 36 | | | | | 0.1 | 0.1 | | 45.0 | 1.5 | 0 | 53 | 3.8 |
| Example | 37 | 0.1 | | | | | 0.1 | 0.1 | 54.6 | 0.9 | 0 | 43.8 | 23.3 |

TABLE 14

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn + Al at % | Value of Zn/Al at % |
|---|---|---|---|---|---|---|---|---|---|---|---|---|---|
| Comparative Example | 15 | | | | | | | | 50.8 | 0 | 0.9 | 48 | 8.6 |
| Example | 38 | | | | | | | | 41.9 | 3.3 | 0 | 54.5 | 4.2 |
| Example | 39 | | | | | | 0.2 | | 47.7 | 1.8 | 0 | 50 | 7.3 |
| Example | 40 | | | | | | | | 51.5 | 2.6 | 0.005 | 45.7 | 64.3 |
| Example | 41 | | | | 0.1 | | | | 48.1 | 1.5 | 0 | 50 | 9.0 |
| Example | 42 | | | | | | | | 41.3 | 1.3 | 0 | 57 | 3.8 |
| Example | 43 | | | | | | | | 50.4 | 1.3 | 0 | 48 | 23.0 |
| Example | 44 | | | | | | | | 47.6 | 0.6 | 0 | 51 | 11.8 |
| Example | 45 | | | | | | | | 42.7 | 0 | 0 | 57 | 4.7 |
| Example | 46 | | | | | | | | 40.6 | 2.1 | 0 | 57 | 5.3 |
| Comparative Example | 16 | | | | | | | | 34.1 | 1.6 | 0 | 64 | 3.0 |
| Example | 47 | | | | | | | | 46.5 | 0.2 | 0 | 53 | 12.3 |
| Example | 48 | | | | | | | | 44.0 | 2.7 | 0 | 53 | 16.7 |
| Comparative Example | 17 | | | | | | 0.2 | | 46.4 | 0 | 0.6 | 52.5 | 34.0 |
| Example | 49 | | | | | 0.2 | | | 34.5 | 3 | 0 | 62 | 5.2 |
| Example | 50 | | | | | | | | 42.9 | 0.6 | 0 | 56.2 | 12.4 |
| Example | 51 | | | | | | | | 45.2 | 0 | 0.005 | 54.5 | 35.3 |

TABLE 15

Production result
Plated-metal-layer
Chemical composition of plated-metal-layer (at %)

| Classification | No. | Nb at % | Cu at % | Sn at % | Mn at % | Sr at % | Sb at % | Pb at % | Mg at % | Value of Ca + Y + La + Ce at % | Value of Si + Ti + Cr at % | Value of Zn + Al at % | Value of Zn/Al at % |
|---|---|---|---|---|---|---|---|---|---|---|---|---|---|
| Comparative Example | 18 | | | | | | | | 35.0 | 1.5 | 0 | 63 | 5.3 |
| Example | 52 | | | | | 0.1 | 0.1 | 0.1 | 35.0 | 1.5 | 0 | 63 | 6.0 |
| Example | 53 | | | | | | 0.1 | | 39.2 | 3.4 | 0 | 57 | 18.0 |
| Example | 54 | | | | | | | | 42.4 | 0.3 | 0 | 57 | 27.5 |
| Comparative Example | 19 | | 0.2 | | | | | | 38.8 | 0.7 | 0 | 60 | 11.0 |
| Comparative Example | 20 | | | | | | | | 36.6 | 0.5 | 0 | 62 | 9.3 |
| Example | 55 | | | | | | | | 42.4 | 0.3 | 0 | 57 | 56.0 |
| Example | 56 | | | | | | | | 41.8 | 0.1 | 0 | 57.7 | 81.4 |
| Example | 57 | | | | | | 0.1 | | 25.1 | 4.5 | 0 | 70 | 4.4 |
| Comparative Example | 21 | | | | | | | | 32.6 | 0 | 0 | 67 | 5.7 |
| Comparative Example | 22 | | | | | | | | 29.1 | 1 | 0.6 | 69 | 5.3 |
| Example | 58 | | | | | | | | 37.4 | 0.3 | 0 | 62 | 30.0 |
| Comparative Example | 23 | | | | | | | | 22.1 | 1.5 | 0 | 76 | 4.1 |
| Comparative Example | 24 | Commercially available hot dip galvanizing | | | | | | | | | | | |
| Comparative Example | 25 | Single-phase amorphous plated steel sheet starting to be submerged at 450° C. | | | | | | | | | | | |

TABLE 16

Production result
Plated-metal-layer
Metallographic structure of plated-metal-layer

| | | Quasicrystal | | | | | Bimodal structure | | | | |
|---|---|---|---|---|---|---|---|---|---|---|---|
| | | | | | | | | Coarse domain | | | |
| | | | | | | | | Area fraction | | | |
| Classification | No. | Presence or absence | Average equivalent circle diameter μm | Value of Mg/(Zn + Al) | Presence or absence of Mg phase | Presence or absence of bimodal structure | Area fraction in plated-metal-layer % | Area fraction in surface area of plated-metal-layer % | Area fraction in deep area of plated-metal-layer % | Constituent phase Type | Area fraction in coarse domain % |
| Comparative Example | 1 | Absent | — | — | Present | Absent | — | — | — | — | — |
| Comparative Example | 2 | Absent | — | — | Present | Absent | — | — | — | — | — |
| Example | 1 | Present | 3 | 0.64 | Absent | Present | 31 | 35 | 40 | Quasicrystal | 99 |
| Example | 2 | Present | 5.1 | 0.50 | Absent | Present | 49 | 55 | 57 | Quasicrystal | 99 |
| Example | 3 | Present | 5.6 | 0.61 | Absent | Present | 48 | 52 | 55 | Quasicrystal | 99 |
| Example | 4 | Present | 1.5 | 0.70 | Present | Present | 26 | 30 | 35 | Quasicrystal | 99 |
| Example | 5 | Present | 5.2 | 0.65 | Absent | Present | 39 | 39 | 44 | Quasicrystal | 99 |
| Example | 6 | Present | 1.2 | 0.75 | Present | Present | 24 | 26 | 28 | Quasicrystal | 99 |
| Comparative Example | 3 | Absent | — | — | Absent | Absent | — | — | — | — | — |
| Example | 7 | Present | 1.1 | 0.58 | Present | Present | 22 | 48 | 23 | Quasicrystal | 99 |
| Example | 8 | Present | 2.1 | 0.52 | Absent | Present | 26 | 32 | 33 | Quasicrystal | 99 |
| Example | 9 | Present | 1 | 0.70 | Present | Present | 20 | 9 | 26 | Quasicrystal/ MgZn | 97/2 |
| Example | 10 | Present | 3 | 0.77 | Absent | Present | 31 | 25 | 36 | Quasicrystal | 99 |
| Example | 11 | Present | 4.8 | 0.83 | Absent | Present | 42 | 38 | 45 | Quasicrystal | 99 |
| Example | 12 | Present | 5 | 0.67 | Absent | Present | 61 | 57 | 55 | Quasicrystal | 99 |

TABLE 16-continued

Production result
Plated-metal-layer
Metallographic structure of plated-metal-layer

| | | Quasicrystal | | | | Bimodal structure | | | | |
| --- | --- | --- | --- | --- | --- | --- | --- | --- | --- | --- |
| | | | | | | | Coarse domain | | | |
| | | | | | | | Area fraction | | | |
| | | Presence or absence | Average equivalent circle diameter μm | Value of Mg/(Zn + Al) | Presence or absence of Mg phase | Presence or absence of bimodal structure | Area fraction in plated-metal-layer % | Area fraction in surface area of plated-metal-layer % | Area fraction in deep area of plated-metal-layer % | Constituent phase | |
| Classification | No. | | | | | | | | | Type | Area fraction in coarse domain % |
| Comparative Example | 4 | Absent | — | — | Present | Absent | — | — | — | — | — |
| Comparative Example | 5 | Absent | — | — | Absent | Absent | — | — | — | — | — |

TABLE 17

Production result
Plated-metal-layer
Metallographic structure of plated-metal-layer

| | | Quasicrystal | | | | Bimodal structure | | | | |
| --- | --- | --- | --- | --- | --- | --- | --- | --- | --- | --- |
| | | | | | | | Coarse domain | | | |
| | | | | | | | Area fraction | | | |
| | | Presence or absence | Average equivalent circle diameter μm | Value of Mg/(Zn + Al) | Presence or absence of Mg phase | Presence or absence of bimodal structure | Area fraction in plated-metal-layer % | Area fraction in surface area of plated-metal-layer % | Area fraction in deep area of plated-metal-layer % | Constituent phase | |
| Classification | No. | | | | | | | | | Type | Area fraction in coarse domain % |
| Example | 13 | Present | 5.6 | 0.67 | Absent | Present | 47 | 46 | 59 | Quasicrystal | 99 |
| Example | 14 | Present | 4.5 | 0.69 | Absent | Present | 43 | 55 | 50 | Quasicrystal | 99 |
| Example | 15 | Present | 5.9 | 0.66 | Absent | Present | 48 | 70 | 68 | Quasicrystal | 99 |
| Example | 16 | Present | 1.9 | 0.50 | Absent | Present | 22 | 26 | 38 | Quasicrystal | 99 |
| Example | 17 | Present | 5.7 | 0.56 | Absent | Present | 46 | 39 | 57 | Quasicrystal | 99 |
| Example | 18 | Present | 5.8 | 0.71 | Absent | Present | 44 | 59 | 68 | Quasicrystal | 99 |
| Comparative Example | 6 | Absent | — | — | Absent | Absent | — | — | — | — | — |
| Example | 19 | Present | 3.5 | 0.65 | Absent | Present | 39 | 71 | 38 | Quasicrystal | 99 |
| Example | 20 | Present | 2.7 | 0.65 | Absent | Present | 33 | 49 | 56 | Quasicrystal | 99 |
| Comparative Example | 7 | Absent | — | — | Absent | Absent | — | — | — | — | — |
| Example | 21 | Present | 1.3 | 0.56 | Absent | Present | 19 | 29 | 33 | Quasicrystal/MgZn | 98/1 |
| Example | 22 | Present | 4 | 0.65 | Absent | Present | 42 | 65 | 58 | Quasicrystal | 99 |
| Example | 23 | Present | 7.6 | 0.65 | Absent | Present | 50 | 44 | 45 | Quasicrystal | 99 |
| Example | 24 | Present | 3.6 | 0.70 | Absent | Present | 36 | 38 | 65 | Quasicrystal | 99 |
| Comparative Example | 8 | Absent | — | — | Absent | Absent | — | — | — | — | — |
| Example | 25 | Present | 2.1 | 0.54 | Absent | Present | 30 | 45 | 52 | Quasicrystal | 99 |
| Example | 26 | Present | 4 | 0.74 | Absent | Present | 41 | 58 | 65 | Quasicrystal | 99 |

TABLE 18

Production result
Plated-metal-layer
Metallographic structure of plated-metal-layer

| | | | Quasicrystal | | | | Bimodal structure | | | | |
| | | | | | | | | Coarse domain | | | |
| | | | | | | | | Area fraction | | | |
| Classification | No. | Presence or absence | Average equivalent circle diameter μm | Value of Mg/(Zn + Al) | Presence or absence of Mg phase | Presence or absence of bimodal structure | Area fraction in plated-metal-layer % | Area fraction in surface area of plated-metal-layer % | Area fraction in deep area of plated-metal-layer % | Constituent phase Type | Area fraction in coarse domain % |
|---|---|---|---|---|---|---|---|---|---|---|---|
| Example | 27 | Present | 1.2 | 0.80 | Absent | Present | 20 | 28 | 36 | Quasicrystal/MgZn | 98/1 |
| Comparative Example | 9 | Absent | — | — | Absent | Absent | — | — | — | — | — |
| Comparative Example | 10 | Absent | — | — | Absent | Absent | — | — | — | — | — |
| Comparative Example | 11 | Absent | — | — | Absent | Absent | — | — | — | — | — |
| Comparative Example | 12 | Absent | — | — | Absent | Absent | — | — | — | — | — |
| Example | 28 | Present | 1.3 | 0.54 | Absent | Present | 18 | 21 | 26 | Quasicrystal | 99 |
| Example | 29 | Present | 4.1 | 0.60 | Absent | Present | 52 | 60 | 55 | Quasicrystal | 99 |
| Example | 30 | Present | 2.3 | 0.67 | Absent | Present | 44 | 43 | 74 | Quasicrystal | 99 |
| Example | 31 | Present | 4.9 | 0.80 | Absent | Present | 43 | 48 | 70 | Quasicrystal | 99 |
| Comparative Example | 13 | Absent | — | — | Absent | Absent | — | — | — | — | — |
| Example | 32 | Present | 6.5 | 0.68 | Absent | Present | 80 | 86 | 90 | Quasicrystal | 99 |
| Example | 33 | Present | 4.5 | 0.74 | Absent | Present | 44 | 65 | 70 | Quasicrystal | 99 |
| Example | 34 | Present | 5.3 | 0.56 | Absent | Present | 29 | 34 | 33 | Quasicrystal | 99 |
| Example | 35 | Present | 1.8 | 0.66 | Absent | Present | 24 | 28 | 23 | Quasicrystal | 99 |
| Comparative Example | 14 | Absent | — | — | Absent | Absent | — | — | — | — | — |
| Example | 36 | Present | 5.2 | 0.65 | Absent | Present | 42 | 54 | 68 | Quasicrystal | 99 |
| Example | 37 | Present | 2.9 | 0.74 | Absent | Present | 42 | 50 | 63 | Quasicrystal/$MgZn_2$ | 95/4 |

TABLE 19

Production result
Plated-metal-layer
Metallographic structure of plated-metal-layer

| | | | Quasicrystal | | | | Bimodal structure | | | | |
| | | | | | | | | Coarse domain | | | |
| | | | | | | | | Area fraction | | | |
| Classification | No. | Presence or absence | Average equivalent circle diameter μm | Value of Mg/(Zn + Al) | Presence or absence of Mg phase | Presence or absence of bimodal structure | Area fraction in plated-metal-layer % | Area fraction in surface area of plated-metal-layer % | Area fraction in deep area of plated-metal-layer % | Constituent phase Type | Area fraction in coarse domain % |
|---|---|---|---|---|---|---|---|---|---|---|---|
| Comparative Example | 15 | Absent | — | — | Absent | Absent | — | — | — | — | — |
| Example | 38 | Present | 5.5 | 0.79 | Absent | Present | 50 | 48 | 78 | Quasicrystal | 99 |
| Example | 39 | Present | 3.6 | 0.66 | Absent | Present | 48 | 68 | 58 | Quasicrystal | 99 |
| Example | 40 | Present | 1.1 | 0.78 | Absent | Present | 16 | 20 | 18 | Quasicrystal/MgZn | 98/1 |
| Example | 41 | Present | 2.3 | 0.70 | Absent | Present | 38 | 26 | 42 | Quasicrystal | 99 |
| Example | 42 | Present | 5.5 | 0.68 | Absent | Present | 70 | 55 | 75 | Quasicrystal | 99 |
| Example | 43 | Present | 1.8 | 0.71 | Absent | Present | 16 | 20 | 28 | Quasicrystal | 99 |
| Example | 44 | Present | 1.9 | 0.53 | Absent | Present | 18 | 18 | 24 | Quasicrystal | 99 |

TABLE 19-continued

Production result
Plated-metal-layer
Metallographic structure of plated-metal-layer

| Classification | No. | Quasicrystal Presence or absence | Average equivalent circle diameter μm | Value of Mg/(Zn + Al) | Presence or absence of Mg phase | Bimodal structure Presence or absence of bimodal structure | Coarse domain Area fraction Area fraction in plated-metal-layer % | Area fraction in surface area of plated-metal-layer % | Area fraction in deep area of plated-metal-layer % | Constituent phase Type | Area fraction in coarse domain % |
|---|---|---|---|---|---|---|---|---|---|---|---|
| Example | 45 | Present | 4.9 | 0.54 | Absent | Present | 29 | 16 | 56 | Quasicrystal | 99 |
| Example | 46 | Present | 4.6 | 0.78 | Absent | Present | 42 | 35 | 68 | Quasicrystal | 99 |
| Comparative Example | 16 | Absent | — | — | Absent | Absent | — | — | — | — | — |
| Example | 47 | Present | 2 | 0.51 | Absent | Present | 18 | 24 | 33 | Quasicrystal | 99 |
| Example | 48 | Present | 1.4 | 0.78 | Absent | Present | 26 | 24 | 39 | Quasicrystal | 99 |
| Comparative Example | 17 | Absent | — | — | Absent | Absent | — | — | — | — | — |
| Example | 49 | Present | 4.4 | 0.80 | Absent | Present | 42 | 39 | 48 | Quasicrystal | 99 |
| Example | 50 | Present | 1.6 | 0.57 | Absent | Present | 16 | 16 | 26 | Quasicrystal | 99 |
| Example | 51 | Present | 1.3 | 0.56 | Absent | Present | 18 | 19 | 32 | Quasicrystal | 99 |

TABLE 20

Production result
Plated-metal-layer
Metallographic structure of plated-metal-layer

| Classification | No. | Quasicrystal Presence or absence | Average equivalent circle diameter μm | Value of Mg/(Zn + Al) | Presence or absence of Mg phase | Bimodal structure Presence or absence of bimodal structure | Coarse domain Area fraction Area fraction in plated-metal-layer % | Area fraction in surface area of plated-metal-layer % | Area fraction in deep area of plated-metal-layer % | Constituent phase Type | Area fraction in coarse domain % |
|---|---|---|---|---|---|---|---|---|---|---|---|
| Comparative Example | 18 | Absent | — | — | Present | Absent | — | — | — | — | — |
| Example | 52 | Present | 10 | 0.70 | Absent | Present | 63 | 52 | 68 | Quasicrystal/MgZn$_2$ | 98/1 |
| Example | 53 | Present | 1.5 | 0.82 | Absent | Present | 16 | 18 | 32 | Quasicrystal | 99 |
| Example | 54 | Present | 1.2 | 0.53 | Absent | Present | 16 | 17 | 30 | Quasicrystal | 99 |
| Comparative Example | 19 | Absent | — | — | Absent | Absent | — | — | — | — | — |
| Comparative Example | 20 | Absent | — | — | Absent | Absent | — | — | — | — | — |
| Example | 55 | Present | 1.1 | 0.56 | Absent | Present | 15 | 16 | 28 | Quasicrystal | 99 |
| Example | 56 | Present | 1.1 | 0.52 | Absent | Present | 15 | 20 | 24 | Quasicrystal/MgZn$_2$ | 98/1 |
| Example | 57 | Present | 1 | 0.83 | Absent | Present | 17 | 19 | 24 | Quasicrystal | 99 |
| Comparative Example | 21 | Absent | — | — | Absent | Absent | — | — | — | — | — |
| Comparative Example | 22 | Absent | — | — | Absent | Absent | — | — | — | — | — |
| Example | 58 | Present | 1.2 | 0.50 | Absent | Present | 18 | 18 | 19 | Quasicrystal | 99 |
| Comparative Example | 23 | Absent | — | — | Absent | Absent | — | — | — | — | — |
| Comparative Example | 24 | Commercially available hot dip galvanizing | | | | | | | | | |

TABLE 20-continued

Production result
Plated-metal-layer
Metallographic structure of plated-metal-layer

| Classification | No. | Quasicrystal Presence or absence | Average equivalent circle diameter μm | Value of Mg/(Zn + Al) | Presence or absence of Mg phase | Presence or absence of bimodal structure | Bimodal structure — Coarse domain — Area fraction — Area fraction in plated-metal-layer % | Area fraction in surface area of plated-metal-layer % | Area fraction in deep area of plated-metal-layer % | Constituent phase Type | Area fraction in coarse domain % |
|---|---|---|---|---|---|---|---|---|---|---|---|
| Comparative Example | 25 | Single-phase amorphous plated steel sheet starting to be submerged at 450° C. | | | | | | | | | |

TABLE 21

Production result
Plated-metal-layer
Metallographic structure of plated-metal-layer
Bimodal structure
Fine domain

| Classification | No. | Area fraction in plated-metal-layer % | Area fraction in center area of plated-metal-layer % | Constituent phase Type | Area fraction in fine domain % | Thickness D of plated-metal-layer μm | Fe—Al containing alloy layer Presence or absence | Constituent phase contained in Fe—Al containing alloy layer | Thickness of Fe—Al containing alloy layer nm |
|---|---|---|---|---|---|---|---|---|---|
| Comparative Example | 1 | — | — | — | — | 20 | Present | $Fe_5Al_2/Al_{3.2}Fe$ | 15 |
| Comparative Example | 2 | — | — | — | — | 15 | Present | $Fe_5Al_2/Al_{3.2}Fe$ | 20 |
| Example | 1 | 69 | 79 | $Mg_{51}Zn_{20}$ | 90 | 17 | Present | $Fe_5Al_2/Al_{3.2}Fe$ | 30 |
| Example | 2 | 51 | 62 | $Mg_{51}Zn_{20}$ | 90 | 15 | Present | $Fe_5Al_2/Al_{3.2}Fe$ | 40 |
| Example | 3 | 52 | 60 | $Mg_{51}Zn_{20}$ | 90 | 16 | Present | $Fe_5Al_2/Al_{3.2}Fe$ | 30 |
| Example | 4 | 74 | 84 | $Mg_{51}Zn_{20}$/Mg | 97/2 | 17 | Present | $Fe_5Al_2/Al_{3.2}Fe$ | 50 |
| Example | 5 | 61 | 65 | $Mg_{51}Zn_{20}$ | 99 | 18 | Present | $Fe_5Al_2/Al_{3.2}Fe$ | 40 |
| Example | 6 | 76 | 81 | $Mg_{51}Zn_{20}$/Mg | 97/2 | 15 | Present | $Fe_5Al_2/Al_{3.2}Fe$ | 50 |
| Comparative Example | 3 | — | — | — | — | 15 | Present | $Fe_5Al_2/Al_{3.2}Fe$ | 30 |
| Example | 7 | 78 | 98 | $Mg_{51}Zn_{20}$/Mg | 97/2 | 16 | Absent | — | — |
| Example | 8 | 74 | 84 | $Mg_{51}Zn_{20}$ | 99 | 17 | Present | $Fe_5Al_2/Al_{3.2}Fe$ | 50 |
| Example | 9 | 80 | 76 | $Mg_{51}Zn_{20}$/Mg | 97/2 | 18 | Absent | — | — |
| Example | 10 | 69 | 68 | $Mg_{51}Zn_{20}$ | 99 | 14 | Present | $Fe_5Al_2/Al_{3.2}Fe$ | 30 |
| Example | 11 | 58 | 57 | $Mg_{51}Zn_{20}$ | 99 | 15 | Present | $Fe_5Al_2/Al_{3.2}Fe$ | 30 |
| Example | 12 | 39 | 32 | $Mg_{51}Zn_{20}$ | 99 | 18 | Present | $Fe_5Al_2/Al_{3.2}Fe$ | 50 |
| Comparative Example | 4 | — | — | — | — | 16 | Present | $Fe_5Al_2/Al_{3.2}Fe$ | 30 |
| Comparative Example | 5 | — | — | — | — | 18 | Present | $Fe_5Al_2/Al_{3.2}Fe$ | 30 |

TABLE 22

Production result / Plated-metal-layer

| | | Metallographic structure of plated-metal-layer — Bimodal structure — Fine domain — Area fraction | | Constituent phase | | Thickness D of plated-metal-layer μm | Presence or absence | Fe—Al containing alloy layer | |
|---|---|---|---|---|---|---|---|---|---|
| Classification | No. | Area fraction in plated-metal-layer % | Area fraction in center area of plated-metal-layer % | Type | Area fraction in fine domain % | | | Constituent phase contained in Fe—Al containing alloy layer | Thickness of Fe—Al containing alloy layer nm |
| Example | 13 | 53 | 61 | $Mg_{51}Zn_{20}$ | 99 | 17 | present | $Fe_5Al_2/Al_{3.2}Fe$ | 40 |
| Example | 14 | 57 | 71 | $Mg_{51}Zn_{20}$ | 99 | 15 | present | $Fe_5Al_2/Al_{3.2}Fe$ | 40 |
| Example | 15 | 52 | 84 | $Mg_{51}Zn_{20}$ | 99 | 16 | present | $Fe_5Al_2/Al_{3.2}Fe$ | 30 |
| Example | 16 | 78 | 93 | $Mg_{51}Zn_{20}$ | 99 | 15 | present | $Fe_5Al_2/Al_{3.2}Fe$ | 50 |
| Example | 17 | 54 | 57 | $Mg_{51}Zn_{20}$ | 99 | 18 | present | $Fe_5Al_2/Al_{3.2}Fe$ | 30 |
| Example | 18 | 56 | 85 | $Mg_{51}Zn_{20}$ | 99 | 18 | present | $Fe_5Al_2/Al_{3.2}Fe$ | 40 |
| Comparative Example | 6 | — | — | — | — | 18 | present | $Fe_5Al_2/Al_{3.2}Fe$ | 20 |
| Example | 19 | 61 | 84 | $Mg_{51}Zn_{20}$ | 99 | 17 | present | $Fe_5Al_2/Al_{3.2}Fe$ | 40 |
| Example | 20 | 67 | 96 | $Mg_{51}Zn_{20}$ | 99 | 16 | present | $Fe_5Al_2Al_{3.2}Fe$ | 40 |
| Comparative Example | 7 | — | — | — | — | 17 | present | $Fe_5Al_2/Al_{3.2}Fe$ | 30 |
| Example | 21 | 81 | 99 | $Mg_{51}Zn_{20}/MgZn$ | 98/1 | 13 | present | $Fe_5Al_2/Al_{3.2}Fe$ | 20 |
| Example | 22 | 58 | 87 | $Mg_{51}Zn_{20}$ | 99 | 15 | present | $Fe_5Al_2/Al_{3.2}Fe$ | 50 |
| Example | 23 | 50 | 42 | $Mg_{51}Zn_{20}$ | 99 | 20 | present | $Fe_5Al_2/Al_{3.2}Fe$ | 20 |
| Example | 24 | 64 | 87 | $Mg_{51}Zn_{20}$ | 99 | 18 | present | $Fe_5Al_2/Al_{3.2}Fe$ | 30 |
| Comparative Example | 8 | — | — | — | — | 15 | present | $Fe_5Al_2/Al_{3.2}Fe$ | 30 |
| Example | 25 | 70 | 98 | $Mg_{51}Zn_{20}$ | 99 | 18 | present | $Fe_5Al_2/Al_{3.2}Fe$ | 30 |
| Example | 26 | 59 | 90 | $Mg_{51}Zn_{20}$ | 99 | 18 | present | $Fe_5Al_2/Al_{3.2}Fe$ | 40 |

TABLE 23

Production result / Plated-metal-layer

| | | Metallographic structure of plated-metal-layer — Bimodal structure — Fine domain — Area fraction | | Constituent phase | | Thickness D of plated-metal-layer μm | Presence or absence | Fe—Al containing alloy layer | |
|---|---|---|---|---|---|---|---|---|---|
| Classification | No. | Area fraction in plated-metal-layer % | Area fraction in center area of plated-metal-layer % | Type | Area fraction in fine domain % | | | Constituent phase contained in Fe—Al containing alloy layer | Thickness of Fe—Al containing alloy layer nm |
| Example | 27 | 80 | 98 | $Mg_{51}Zn_{20}$ | 99 | 19 | Absent | — | — |
| Comparative Example | 9 | — | — | — | — | 15 | Present | $Fe_5Al_2/Al_{3.2}Fe$ | 30 |
| Comparative Example | 10 | — | — | — | — | 13 | Absent | — | — |
| Comparative Example | 11 | — | — | — | — | 15 | Present | $Fe_5Al_2/Al_{3.2}Fe$ | 30 |
| Comparative Example | 12 | — | — | — | — | 19 | Present | $Fe_5Al_2/Al_{3.2}Fe$ | 40 |
| Example | 28 | 82 | 90 | $Mg_{51}Zn_{20}$ | 99 | 18 | Present | $Fe_5Al_2/Al_{3.2}Fe$ | 40 |
| Example | 29 | 48 | 56 | $Mg_{51}Zn_{20}$ | 99 | 15 | Present | $Fe_5Al_2/Al_{3.2}Fe$ | 30 |
| Example | 30 | 56 | 78 | $Mg_{51}Zn_{20}$ | 99 | 18 | Present | $Fe_5Al_2/Al_{3.2}Fe$ | 30 |
| Example | 31 | 57 | 81 | $Mg_{51}Zn_{20}$ | 99 | 16 | Present | $Fe_5Al_2/Al_{3.2}Fe$ | 30 |

TABLE 23-continued

| | | Production result | | | | | | | |
|---|---|---|---|---|---|---|---|---|---|
| | | Plated-metal-layer | | | | | | | |
| | | Metallographic structure of plated-metal-layer Bimodal structure Fine domain | | | | | | Fe—Al containing alloy layer | |
| | | Area fraction | | | | | | | |
| Classification | No. | Area fraction in plated-metal-layer % | Area fraction in center area of plated-metal-layer % | Constituent phase Type | Area fraction in fine domain % | Thickness D of plated-metal-layer μm | Presence or absence | Constituent phase contained in Fe—Al containing alloy layer | Thickness of Fe—Al containing alloy layer nm |
| Comparative Example | 13 | — | — | — | — | 17 | Present | $Fe_5Al_2/Al_{3.2}Fe$ | 40 |
| Example | 32 | 20 | 32 | $Mg_{51}Zn_{20}$ | 99 | 18 | Present | $Fe_5Al_2/Al_{3.2}Fe$ | 30 |
| Example | 33 | 56 | 91 | $Mg_{51}Zn_{20}$ | 99 | 15 | Present | $Fe_5Al_2/Al_{3.2}Fe$ | 30 |
| Example | 34 | 71 | 78 | $Mg_{51}Zn_{20}$ | 99 | 16 | Present | $Fe_5Al_2/Al_{3.2}Fe$ | 40 |
| Example | 35 | 76 | 78 | $Mg_{51}Zn_{20}$ | 99 | 17 | Present | $Fe_5Al_2/Al_{3.2}Fe$ | 30 |
| Comparative Example | 14 | — | — | — | — | 18 | Present | $Fe_5Al_2/Al_{3.2}Fe$ | 30 |
| Example | 36 | 58 | 87 | $Mg_{51}Zn_{20}$ | 99 | 18 | Present | $Fe_5Al_2/Al_{3.2}Fe$ | 40 |
| Example | 37 | 58 | 80 | $Mg_{51}Zn_{20}/MgZn_2$ | 98/1 | 13 | Present | $Fe_5Al_2/Al_{3.2}Fe$ | 20 |

TABLE 24

| | | Production result | | | | | | | |
|---|---|---|---|---|---|---|---|---|---|
| | | Plated-metal-layer | | | | | | | |
| | | Metallographic structure of plated-metal-layer Bimodal structure Fine domain | | | | | | Fe—Al containing alloy layer | |
| | | Area fraction | | | | | | | |
| Classification | No. | Area fraction in plated-metal-layer % | Area fraction in center area of plated-metal-layer % | Constituent phase Type | Area fraction in fine domain % | Thickness D of plated-metal-layer μm | Presence or absence | Constituent phase contained in Fe—Al containing alloy layer | Thickness of Fe—Al containing alloy layer nm |
| Comparative Example | 15 | — | — | — | — | 15 | Present | $Fe_5Al_2/Al_{3.2}Fe$ | 30 |
| Example | 38 | 50 | 70 | $Mg_{51}Zn_{20}$ | 99 | 18 | Present | $Fe_5Al_2/Al_{3.2}Fe$ | 30 |
| Example | 39 | 52 | 75 | $Mg_{51}Zn_{20}$ | 99 | 16 | Present | $Fe_5Al_2/Al_{3.2}Fe$ | 40 |
| Example | 40 | 84 | 89 | $Mg_{51}Zn_{20}$ | 99 | 17 | Absent | — | — |
| Example | 41 | 62 | 56 | $Mg_{51}Zn_{20}$ | 99 | 18 | Present | $Fe_5Al_2/Al_{3.2}Fe$ | 30 |
| Example | 42 | 30 | 23 | $Mg_{51}Zn_{20}$ | 99 | 20 | Present | $Fe_5Al_2/Al_{3.2}Fe$ | 40 |
| Example | 43 | 84 | 96 | $Mg_{51}Zn_{20}$ | 99 | 16 | Present | $Fe_5Al_2/Al_{3.2}Fe$ | 40 |
| Example | 44 | 82 | 87 | $Mg_{51}Zn_{20}$ | 99 | 18 | Present | $Fe_5Al_2/Al_{3.2}Fe$ | 30 |
| Example | 45 | 71 | 82 | $Mg_{51}Zn_{20}$ | 99 | 17 | Present | $Fe_5Al_2/Al_{3.2}Fe$ | 30 |
| Example | 46 | 58 | 72 | $Mg_{51}Zn_{20}$ | 99 | 18 | Present | $Fe_5Al_2/Al_{3.2}Fe$ | 30 |
| Comparative Example | 16 | — | — | — | — | 16 | Present | $Fe_5Al_2/Al_{3.2}Fe$ | 60 |
| Example | 47 | 82 | 98 | $Mg_{51}Zn_{20}$ | 99 | 17 | Present | $Fe_5Al_2/Al_{3.2}Fe$ | 30 |
| Example | 48 | 74 | 82 | $Mg_{51}Zn_{20}$ | 99 | 16 | Present | $Fe_5Al_2/Al_{3.2}Fe$ | 30 |
| Comparative Example | 17 | — | — | — | — | 15 | Present | $Fe_5Al_2/Al_{3.2}Fe$ | 40 |
| Example | 49 | 58 | 60 | $Mg_{51}Zn_{20}$ | 99 | 17 | Present | $Fe_5Al_2/Al_{3.2}Fe$ | 30 |
| Example | 50 | 84 | 92 | $Mg_{51}Zn_{20}$ | 99 | 16 | Present | $Fe_5Al_2/Al_{3.2}Fe$ | 30 |
| Example | 51 | 82 | 93 | $Mg_{51}Zn_{20}$ | 99 | 15 | Present | $Fe_5Al_2/Al_{3.2}Fe$ | 30 |

TABLE 25

Production result

Plated-metal-layer

Metallographic structure of plated-metal-layer
Bimodal structure
Fine domain

| Classification | No. | Area fraction in plated-metal-layer % | Area fraction in center area of plated-metal-layer % | Constituent phase Type | Area fraction in fine domain % | Thickness D of plated-metal-layer μm | Fe—Al containing alloy layer Presence or absence | Constituent phase contained in Fe—Al containing alloy layer | Thickness of Fe—Al containing alloy layer nm |
|---|---|---|---|---|---|---|---|---|---|
| Comparative Example | 18 | — | — | — | — | 18 | Present | $Fe_5Al_2/Al_{3.2}Fe$ | 30 |
| Example | 52 | 37 | 33 | $Mg_{51}Zn_{20}/Zn$ | 97/2 | 15 | Present | $Fe_5Al_2/Al_{3.2}Fe$ | 30 |
| Example | 53 | 84 | 98 | $Mg_{51}Zn_{20}$ | 99 | 17 | Present | $Fe_5Al_2/Al_{3.2}Fe$ | 30 |
| Example | 54 | 84 | 95 | $Mg_{51}Zn_{20}$ | 99 | 15 | Present | $Fe_5Al_2/Al_{3.2}Fe$ | 30 |
| Comparative Example | 19 | — | — | — | — | 18 | Present | $Fe_5Al_2/Al_{3.2}Fe$ | 30 |
| Comparative Example | 20 | — | — | — | — | 18 | Present | $Fe_5Al_2/Al_{3.2}Fe$ | 40 |
| Example | 55 | 85 | 96 | $Mg_{51}Zn_{20}/Zn$ | 95/4 | 17 | Absent | — | — |
| Example | 56 | 85 | 96 | $Mg_{51}Zn_{20}/Zn$ | 95/4 | 18 | Absent | — | — |
| Example | 57 | 83 | 90 | $Mg_{32}(Zn,Al)_{49}$ | 99 | 16 | Present | $Fe_5Al_2/Al_{3.2}Fe$ | 40 |
| Comparative Example | 21 | — | — | — | — | 18 | Present | $Fe_5Al_2/Al_{3.2}Fe$ | 30 |
| Comparative Example | 27 | — | — | — | — | 17 | Present | $Fe_5Al_2/Al_{3.2}Fe$ | 30 |
| Example | 58 | 82 | 83 | $Mg_{51}Zn_{20}/Zn$ | 95/4 | 16 | Present | $Fe_5Al_2/Al_{3.2}Fe$ | 40 |
| Comparative Example | 23 | — | — | — | — | 17 | Present | $Fe_5Al_2/Al_{3.2}Fe$ | 30 |
| Comparative Example | 24 | Commercially available hot dip galvanizing | | | | | | | |
| Comparative Example | 25 | Single-phase amorphous plated steel sheet starting to be submerged at 450° C. | | | | | | | |

TABLE 26

Evaluation result

Evaluation of corrosion resistance

| Classification | No. | Corrosion loss | Evaluation of red rust | Evaluation of occurrence of white rust | Evaluation of red rust Processed portion (bulging) | Evaluation of sacrificial protection | Antiglare effect | Evaluation of appearance (storage test) | Evaluation of adherence | Evaluation of corrosion resistance after powdering |
|---|---|---|---|---|---|---|---|---|---|---|
| Comparative Example | 1 | Poor | Poor | Poor | Poor | Poor | Poor | Poor | Good | Poor |
| Comparative Example | 2 | Poor | Poor | Poor | Poor | Poor | Poor | Poor | Good | Poor |
| Example | 1 | Excellent | Excellent | Excellent | Good | Excellent | Poor | Poor | Excellent | Excellent |
| Example | 2 | Excellent | Excellent | Good | Good | Excellent | Poor | Poor | Excellent | Excellent |
| Example | 3 | Excellent | Excellent | Good | Good | Excellent | Poor | Poor | Excellent | Excellent |
| Example | 4 | Excellent | Excellent | Good | Good | Excellent | Excellent | Poor | Excellent | Good |
| Example | 5 | Excellent | Excellent | Excellent | Good | Excellent | Poor | Poor | Excellent | Excellent |
| Example | 6 | Very Good | Excellent | Good | Good | Excellent | Excellent | Poor | Excellent | Good |
| Comparative Example | 3 | Poor | Poor | Poor | Poor | Poor | Excellent | Poor | Good | Poor |
| Example | 7 | Very Good | Excellent | Good | Good | Excellent | Excellent | Poor | Very Good | Good |
| Example | 8 | Excellent | Good | Good | Good | Excellent | Poor | Poor | Excellent | Good |
| Example | 9 | Very Good | Excellent | Good | Good | Very Good | Poor | Poor | Good | Good |
| Example | 10 | Excellent | Excellent | Good | Excellent | Excellent | Poor | Poor | Excellent | Excellent |
| Example | 11 | Excellent | Excellent | Good | Good | Excellent | Poor | Poor | Excellent | Excellent |
| Example | 12 | Excellent | Excellent | Good | Good | Excellent | Poor | Good | Very Good | Excellent |
| Comparative Example | 4 | Poor | Poor | Poor | Poor | Poor | Poor | Poor | Good | Poor |

TABLE 26-continued

| | | Evaluation result | | | | | | | | |
|---|---|---|---|---|---|---|---|---|---|---|
| | | Evaluation of corrosion resistance | | | | | | | | |
| Classification | No. | Corrosion loss | Evaluation of red rust | Evaluation of occurrence of white rust | Evaluation of red rust Processed portion (bulging) | Evaluation of sacrificial protection | Antiglare effect | Evaluation of appearance (storage test) | Evaluation of adherence | Evaluation of corrosion resistance after powdering |
| Comparative Example | 5 | Poor | Poor | Poor | Poor | Poor | Excellent | Good | Good | Poor |

TABLE 27

| | | Evaluation result | | | | | | | | |
|---|---|---|---|---|---|---|---|---|---|---|
| | | Evaluation of corrosion resistance | | | | | | | | |
| Classification | No. | Corrosion loss | Evaluation of red rust | Evaluation of occurrence of white rust | Evaluation of red rust Processed portion (bulging) | Evaluation of sacrificial protection | Antiglare effect | Evaluation of appearance (storage test) | Evaluation of adherence | Evaluation of corrosion resistance after powdering |
| Example | 13 | Excellent | Excellent | Good | Good | Excellent | Poor | Poor | Excellent | Excellent |
| Example | 14 | Excellent | Excellent | Good | Excellent | Excellent | Poor | Good | Excellent | Excellent |
| Example | 15 | Excellent | Excellent | Good | Good | Excellent | Poor | Poor | Excellent | Excellent |
| Example | 16 | Very Good | Good | Excellent | Excellent | Excellent | Excellent | Good | Excellent | Good |
| Example | 17 | Excellent | Excellent | Good | Excellent | Excellent | Poor | Good | Excellent | Excellent |
| Example | 18 | Excellent | Excellent | Good | Good | Excellent | Poor | Good | Excellent | Excellent |
| Comparative Example | 6 | Very Good | Poor | Poor | Poor | Poor | Poor | Good | Good | Poor |
| Example | 19 | Excellent | Excellent | Good | Excellent | Excellent | Poor | Good | Excellent | Excellent |
| Example | 20 | Very Good | Excellent | Good | Excellent | Excellent | Poor | Good | Excellent | Good |
| Comparative Example | 7 | Poor | Poor | Poor | Poor | Poor | Excellent | Good | Good | Poor |
| Example | 21 | Very Good | Good | Good | Good | Excellent | Excellent | Good | Very Good | Good |
| Example | 22 | Excellent | Excellent | Good | Excellent | Excellent | Poor | Good | Excellent | Excellent |
| Example | 23 | Excellent | Excellent | Good | Good | Excellent | Poor | Excellent | Very Good | Excellent |
| Example | 24 | Excellent | Excellent | Excellent | Excellent | Excellent | Poor | Excellent | Excellent | Excellent |
| Comparative Example | 8 | Poor | Poor | Poor | Poor | Poor | Poor | Excellent | Good | Good |
| Example | 25 | Excellent | Good | Good | Excellent | Excellent | Excellent | Excellent | Excellent | Good |
| Example | 26 | Excellent | Excellent | Good | Excellent | Excellent | Excellent | Excellent | Excellent | Excellent |

TABLE 28

| | | Evaluation result | | | | | | | | |
|---|---|---|---|---|---|---|---|---|---|---|
| | | Evaluation of corrosion resistance | | | | | | | | |
| Classification | No. | Corrosion loss | Evaluation of red rust | Evaluation of occurrence of white rust | Evaluation of red rust Processed portion (bulging) | Evaluation of sacrificial protection | Antiglare effect | Evaluation of appearance (storage test) | Evaluation of adherence | Evaluation of corrosion resistance after powdering |
| Example | 27 | Very Good | Excellent | Excellent | Good | Excellent | Poor | Excellent | Very Good | Good |
| Comparative Example | 9 | Poor | Poor | Poor | Poor | Poor | Poor | Excellent | Good | Poor |
| Comparative Example | 10 | Poor | Poor | Poor | Poor | Excellent | Excellent | Excellent | Poor | Poor |
| Comparative Example | 11 | Poor | Poor | Poor | Poor | Poor | Poor | Excellent | Good | Poor |
| Comparative Example | 12 | Poor | Poor | Poor | Poor | Poor | Poor | Excellent | Good | Poor |
| Example | 28 | Very Good | Good | Good | Good | Very Good | Excellent | Excellent | Very Good | Excellent |

TABLE 28-continued

| | | Evaluation result | | | | | | | | |
|---|---|---|---|---|---|---|---|---|---|---|
| | | Evaluation of corrosion resistance | | | | | | | | |
| Classification | No. | Corrosion loss | Evaluation of red rust | Evaluation of occurrence of white rust | Evaluation of red rust Processed portion (bulging) | Evaluation of sacrificial protection | Antiglare effect | Evaluation of appearance (storage test) | Evaluation of adherence | Evaluation of corrosion resistance after powdering |
| Example | 29 | Excellent | Good | Good | Good | Excellent | Poor | Excellent | Excellent | Excellent |
| Example | 30 | Very Good | Excellent | Good | Excellent | Excellent | Poor | Excellent | Excellent | Excellent |
| Example | 31 | Excellent | Excellent | Good | Good | Excellent | Poor | Excellent | Excellent | Excellent |
| Comparative Example | 13 | Very Good | Poor | Poor | Poor | Poor | Poor | Excellent | Good | Poor |
| Example | 32 | Excellent | Excellent | Good | Good | Excellent | Excellent | Excellent | Very Good | Excellent |
| Example | 33 | Excellent | Excellent | Good | Excellent | Excellent | Poor | Excellent | Excellent | Excellent |
| Example | 34 | Excellent | Good | Good | Good | Excellent | Excellent | Excellent | Excellent | Excellent |
| Example | 35 | Very Good | Excellent | Good | Good | Excellent | Poor | Excellent | Excellent | Good |
| Comparative Example | 14 | Excellent | Poor | Poor | Poor | Poor | Excellent | Excellent | Good | Poor |
| Example | 36 | Excellent | Excellent | Good | Good | Excellent | Excellent | Excellent | Excellent | Excellent |
| Example | 37 | Excellent | Excellent | Good | Good | Excellent | Excellent | Excellent | Excellent | Good |

TABLE 29

| | | Evaluation result | | | | | | | | |
|---|---|---|---|---|---|---|---|---|---|---|
| | | Evaluation of corrosion resistance | | | | | | | | |
| Classification | No. | Corrosion loss | Evaluation of red rust | Evaluation of occurrence of white rust | Evaluation of red rust Processed portion (bulging) | Evaluation of sacrificial protection | Antiglare effect | Evaluation of appearance (storage test) | Evaluation of adherence | Evaluation of corrosion resistance after powdering |
| Comparative Example | 15 | Very Good | Poor | Poor | Poor | Poor | Poor | Excellent | Good | Poor |
| Example | 38 | Excellent | Excellent | Good | Good | Excellent | Poor | Excellent | Excellent | Excellent |
| Example | 39 | Excellent | Excellent | Good | Excellent | Excellent | Excellent | Excellent | Excellent | Excellent |
| Example | 40 | Very Good | Excellent | Excellent | Good | Very Good | Poor | Excellent | Very Good | Good |
| Example | 41 | Excellent | Excellent | Good | Excellent | Excellent | Poor | Excellent | Excellent | Excellent |
| Example | 42 | Excellent | Excellent | Good | Good | Excellent | Poor | Excellent | Very Good | Excellent |
| Example | 43 | Very Good | Excellent | Good | Good | Very Good | Poor | Excellent | Excellent | Good |
| Example | 44 | Very Good | Excellent | Excellent | Good | Very Good | Poor | Excellent | Excellent | Good |
| Example | 45 | Excellent | Good | Good | Good | Excellent | Poor | Excellent | Excellent | Excellent |
| Example | 46 | Excellent | Excellent | Good | Good | Excellent | Poor | Excellent | Excellent | Excellent |
| Comparative Example | 16 | Poor | Poor | Poor | Poor | Poor | Poor | Excellent | Good | Poor |
| Example | 47 | Very Good | Good | Good | Good | Very Good | Poor | Excellent | Very Good | Good |
| Example | 48 | Very Good | Excellent | Good | Good | Excellent | Poor | Excellent | Excellent | Good |
| Comparative Example | 17 | Excellent | Poor | Poor | Poor | Poor | Excellent | Excellent | Good | Poor |
| Example | 49 | Excellent | Excellent | Good | Good | Excellent | Excellent | Excellent | Excellent | Excellent |
| Example | 50 | Excellent | Excellent | Good | Good | Very Good | Poor | Excellent | Very Good | Good |
| Example | 51 | Very Good | Excellent | Excellent | Good | Very Good | Poor | Excellent | Very Good | Good |

TABLE 30

| | | Evaluation result | | | | | | | | |
|---|---|---|---|---|---|---|---|---|---|---|
| | | Evaluation of corrosion resistance | | | | | | | | |
| Classification | No. | Corrosion loss | Evaluation of red rust | Evaluation of occurrence of white rust | Evaluation of red rust Processed portion (bulging) | Evaluation of sacrificial protection | Antiglare effect | Evaluation of appearance (storage test) | Evaluation of adherence | Evaluation of corrosion resistance after powdering |
| Comparative Example | 18 | Poor | Poor | Poor | Poor | Poor | Poor | Poor | Good | Poor |
| Example | 52 | Excellent | Excellent | Good | Good | Excellent | Excellent | Excellent | Very Good | Excellent |
| Example | 53 | Very Good | Excellent | Good | Good | Very Good | Excellent | Excellent | Very Good | Excellent |
| Example | 54 | Very Good | Excellent | Good | Good | Very Good | Poor | Excellent | Good | Good |
| Comparative Example | 19 | Poor | Poor | Poor | Poor | Poor | Poor | Excellent | Good | Poor |
| Comparative Example | 20 | Poor | Poor | Poor | Poor | Poor | Poor | Excellent | Good | Poor |
| Example | 55 | Very Good | Excellent | Good | Good | Very Good | Poor | Excellent | Good | Good |
| Example | 56 | Very Good | Good | Excellent | Good | Very Good | Poor | Excellent | Good | Good |
| Example | 57 | Very Good | Good | Good | Good | Excellent | Excellent | Excellent | Very Good | Excellent |
| Comparative Example | 21 | Poor | Poor | Poor | Poor | Poor | Poor | Excellent | Good | Poor |
| Comparative Example | 22 | Poor | Poor | Poor | Poor | Poor | Poor | Excellent | Good | Poor |
| Example | 58 | Very Good | Excellent | Good | Good | Very Good | Poor | Excellent | Very Good | Good |
| Comparative Example | 23 | Poor | Poor | Poor | Poor | Poor | Poor | Poor | Very Good | Poor |
| Comparative Example | 24 | Poor | Poor | Poor | Poor | Poor | Poor | Excellent | Excellent | Poor |
| Comparative Example | 25 | Poor | Poor | Poor | Poor | Good | Poor | Excellent | Good | Poor |

INDUSTRIAL APPLICABILITY

According to the above aspects of the present invention, it is possible to provide the plated steel sheet which is further excellent in the corrosion resistance requested for applying building materials, automobiles, consumer electronics or the like. Therefore, it is possible to prolong the useful life of the materials as compared with the conventional surface-treated steel sheets. Accordingly, the present invention has significant industrial applicability.

BRIEF DESCRIPTION OF THE REFERENCE SYMBOLS

1: STEEL SHEET
2: PLATED-METAL-LAYER
2a: COARSE DOMAIN
2b: FINE DOMAIN
2a1, 2b1: LOCAL AREA

The invention claimed is:

1. A plated steel sheet with a quasicrystal, comprising a steel sheet and a plated-metal-layer arranged on a surface of the steel sheet,
wherein:
the plated-metal-layer comprises:
as a chemical composition, by atomic %,
20% to 60% of Zn,
0.3% to 15% of Al,
0% to 3.5% of Ca,
0% to 3.5% of Y,
0% to 3.5% of La,
0% to 3.5% of Ce,
0% to 0.5% of Si,
0% to 0.5% of Ti,
0% to 0.5% of Cr,
0% to 2% of Fe,
0% to 0.5% of Co,
0% to 0.5% of Ni,
0% to 0.5% of V,
0% to 0.5% of Nb,
0% to 0.5% of Cu,
0% to 0.5% of Sn,
0% to 0.2% of Mn,
0% to 0.5% of Sr,
0% to 0.5% of Sb,
0% to 0.5% of Pb, and
a balance of Mg and impurities; where
a zinc content and an aluminum content expressed in atomic % in the chemical composition satisfy $25\% \leq Zn+Al$; and
as a metallographic structure, a quasicrystal phase which is defined as a phase in which a magnesium content, a zinc content, and an aluminum content expressed in atomic % satisfy $0.5 \leq Mg/(Zn+Al) \leq 0.83$; and
an average equivalent circle diameter of the quasicrystal phase is larger than 1 μm and equal to or smaller than 200 μm.

2. The plated steel sheet with a quasicrystal according to claim 1,
wherein a calcium content, an yttrium content, a lanthanum content, and a cerium content expressed in atomic % in the chemical composition of the plated-metal-layer satisfy $0.3\% \leq Ca+Y+La+Ce \leq 3.5\%$.

3. The plated steel sheet with a quasicrystal according to claim 1,
wherein a silicon content, a titanium content, and a chromium content expressed in atomic % in the chemical composition of the plated-metal-layer satisfy $0.005\% \leq Si+Ti+Cr \leq 0.5\%$.

4. The plated steel sheet with a quasicrystal according to claim 1,
wherein a zinc content and an aluminum content expressed in atomic % in the chemical composition of the plated-metal-layer satisfy 30%≤Zn+Al≤50%, and 3≤Zn/Al≤12.

5. The plated steel sheet with a quasicrystal according to claim 1, wherein:
when viewed in a cross section, whose cutting direction is parallel to a thickness direction of the plated-metal-layer,
the metallographic structure of the plated-metal-layer is a bimodal structure which comprises a fine domain, which is a domain comprising a grain having an equivalent circle diameter of 1 μm or smaller, and a coarse domain, which is a domain comprising a grain having an equivalent circle diameter of larger than 1 μm;
the coarse domain comprises the quasicrystal phase; and
the fine domain comprises at least one selected from a $Mg_{51}Zn_{20}$ phase, a $Mg_{32}(Zn, Al)_{49}$ phase, a MgZn phase, a $MgZn_2$ phase, and a Zn phase.

6. The plated steel sheet with a quasicrystal according to claim 5,
wherein: an area fraction of the coarse domain in the metallographic structure is equal to or more than 5% and equal to or less than 80%; and
an area fraction of the fine domain in the metallographic structure is equal to or more than 20% and equal to or less than 95%.

7. The plated steel sheet with a quasicrystal according to claim 5,
wherein: an area fraction of the quasicrystal phase included in the coarse domain is equal to or more than 80% and less than 100% in the coarse domain; and
an area fraction in total of the $Mg_{51}Zn_{20}$ phase, the $Mg_{32}(Zn, Al)_{49}$ phase, the MgZn phase, the $MgZn_2$ phase, and the Zn phase included in the fine domain is equal to or more than 80% and less than 100% in the fine domain.

8. The plated steel sheet with a quasicrystal according to claim 5,
wherein, when viewed in the cross section and when a thickness of the plated-metal-layer is regarded as D, an area from a surface of the plated-metal-layer toward the steel sheet in the thickness direction to 0.3×D is regarded as a surface area of the plated-metal-layer, and an area from an interface between the steel sheet and the plated-metal-layer toward the plated-metal-layer in the thickness direction to 0.3×D is regarded as a deep area of the plated-metal-layer,
an area fraction of the coarse domain in the surface area of the plated-metal-layer is equal to or more than 10% and less than 100% and an area fraction of the coarse domain in the deep area of the plated-metal-layer is equal to or more than 10% and less than 100%, and
wherein, when an area except for the surface area and the deep area in the plated-metal-layer is regarded as a center area of the plated-metal-layer,
an area fraction of the fine domain in the center area of the plated-metal-layer is equal to or more than 50% and less than 100%.

9. The plated steel sheet with a quasicrystal according to claim 1,
wherein a Mg phase is absent in the metallographic structure of the plated-metal-layer.

10. The plated steel sheet with a quasicrystal according to claim 1 further comprising a Fe—Al containing alloy layer,
wherein: the Fe—Al containing alloy layer is arranged between the steel sheet and the plated-metal-layer;
the Fe—Al containing alloy layer comprises at least one selected from $Fe_5Al_2$ and $Al_{3.2}Fe$; and
a thickness of the Fe—Al containing alloy layer is equal to or more than 10 nm and equal to or less than 1000 nm.

11. A method of producing the plated steel sheet with the quasicrystal according to claim 1, the method comprising:
a hot-dip-plating process comprising dipping a steel sheet into a hot-dip-plating bath having an adjusted composition in order to form a plated-metal-layer on a surface of the steel sheet;
a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and
a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

12. The method of producing the plated steel sheet with the quasicrystal according to claim 11, wherein:
in the hot-dip-plating process, an oxide in the hot-dip-plating bath is 1 g/l or less;
an oxygen concentration of an atmosphere at dipping the steel sheet is 100 ppm or less in volume ratio;
a plating tub to hold the hot-dip-plating bath is a steel tub;
a dross in the hot-dip-plating bath is removed by a metal pump;
$T_{bath}$ which is a temperature of the hot-dip-plating bath is equal to or higher than 10° C. and equal to or lower than 100° C. higher than the $T_{melt}$; and
a time for dipping the steel sheet into the hot-dip-plating bath is equal to or longer than 1 sec and equal to or shorter than 10 sec.

13. A method of producing the plated steel sheet with the quasicrystal according to claim 2, the method comprising:
a hot-dip-plating process comprising dipping a steel sheet into a hot-dip-plating bath having an adjusted composition in order to form a plated-metal-layer on a surface of the steel sheet;
a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

14. A method of producing the plated steel sheet with the quasicrystal according to claim 3, the method comprising:

a hot-dip-plating process comprising dipping a steel sheet into a hot-dip-plating bath having an adjusted composition in order to form a plated-metal-layer on a surface of the steel sheet;

a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

15. A method of producing the plated steel sheet with the quasicrystal according to claim 4, the method comprising:

a hot-dip-plating process comprising dipping a steel sheet into a hot-dip-plating bath having an adjusted composition in order to form a plated-metal-layer on a surface of the steel sheet;

a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

16. A method of producing the plated steel sheet with the quasicrystal according to claim 5, the method comprising:

a hot-dip-plating process comprising dipping a steel sheet into a hot-dip-plating bath having an adjusted composition in order to form a plated-metal-layer on a surface of the steel sheet;

a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

17. A method of producing the plated steel sheet with the quasicrystal according to claim 6, the method comprising:

a hot-dip-plating process comprising dipping a steel sheet into a hot-dip-plating bath having an adjusted composition in order to form a plated-metal-layer on a surface of the steel sheet;

a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

18. A method of producing the plated steel sheet with the quasicrystal according to claim 7, the method comprising:

a hot-dip-plating process comprising dipping a steel sheet into a hot-dip-plating bath having an adjusted composition in order to form a plated-metal-layer on a surface of the steel sheet;

a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

19. A method of producing the plated steel sheet with the quasicrystal according to claim 8, the method comprising:
a hot-dip-plating process comprising dipping a steel sheet into a hot-dip-plating bath having an adjusted composition in order to form a plated-metal-layer on a surface of the steel sheet;
a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and
a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

20. A method of producing the plated steel sheet with the quasicrystal according to claim 9, the method comprising:
a hot-dip-plating process comprising dipping a steel sheet into a hot-dip-plating bath having an adjusted composition in order to form a plated-metal-layer on a surface of the steel sheet;
a first cooling process comprising cooling the steel sheet after the hot-dip-plating process such that an average cooling rate of the plated-metal-layer is equal to or faster than 15° C./sec and equal to or slower than 50° C./sec in a temperature range where a temperature of the plated-metal-layer is from $T_{melt}$ to $T_{solid-liquid}$ in unit of ° C., when the $T_{melt}$ is regarded as a liquidus temperature of the plated-metal-layer and when the $T_{solid-liquid}$ is a temperature range where the plated-metal-layer is in a coexistence state of a solid phase and a liquid phase and where a volume ratio of the solid phase to the plated-metal-layer is equal to or more than 0.3 and equal to or less than 0.8; and
a second cooling process comprising cooling the steel sheet after the first cooling process such that an average cooling rate of the plated-metal-layer is equal to or faster than 100° C./sec and equal to or slower than 3000° C./sec in a temperature range where a temperature of the plated-metal-layer is from a temperature at finishing the first cooling process to 250° C.

* * * * *